United States Patent
Tonisson

(10) Patent No.: US 7,554,689 B2
(45) Date of Patent: Jun. 30, 2009

(54) DOCUMENT LAYOUT METHOD

(75) Inventor: Alan Valev Tonisson, Baulkham Hills (AU)

(73) Assignee: Canon Kabushiki Kaisha, Tokyo (JP)

( * ) Notice: Subject to any disclaimer, the term of this patent is extended or adjusted under 35 U.S.C. 154(b) by 1084 days.

(21) Appl. No.: 10/891,025

(22) Filed: Jul. 15, 2004

(65) Prior Publication Data
US 2005/0094206 A1   May 5, 2005

(30) Foreign Application Priority Data
Oct. 15, 2003   (AU)   ............... 2003905658

(51) Int. Cl.
*G06K 15/00*   (2006.01)
*G06F 17/00*   (2006.01)

(52) U.S. Cl. ................... 358/1.18; 715/235

(58) Field of Classification Search ............... 358/1.18, 358/448, 1.15, 461, 1.9, 1.1, 1.16, 1.17, 3.29; 715/235, 246, 247, 205, 234, 209, 762; 382/103, 382/154, 218, 294; 705/5, 14, 40, 401, 408; 709/206, 226
See application file for complete search history.

(56) References Cited

U.S. PATENT DOCUMENTS 6,826,727 B1 *   11/2004   Mohr et al. ................ 715/235

FOREIGN PATENT DOCUMENTS

| JP | 06-96177 | 4/1994 |
|---|---|---|
| JP | 06-203130 | 7/1994 |
| JP | 11-250271 | 9/1999 |
| JP | 2001-76163 | 3/2001 |
| JP | 2001-101179 | 4/2001 |
| JP | 2003-241359 | 8/2003 |

OTHER PUBLICATIONS

U.S. Appl. No. 10/890,197, filed Jul. 14, 2004.
Japanese Official Action dated Mar. 19, 2007, regarding Japanese Counterpart Patent Application No. 2004-290545.

* cited by examiner

*Primary Examiner*—Saeid Ebrahimi Dehkordy
(74) *Attorney, Agent, or Firm*—Fitzpatrick, Cella, Harper & Scinto

(57) ABSTRACT

Methods and apparatus for variable document printing are disclosed in which a graphical user interface is configured to allow user manipulation of layout rules associated with content containers within a template for variable document generation. One method involves laying out (626) container objects (407, 408) forming part of a template (624) intended for a variable data document. The objects each have a rectangular boundary in two-dimensional space, and the method comprises detecting an operation (628, 2800) to modify a position of at least one edge of at least one of the objects. Then, rules of association between edges of the objects having a corresponding orientation to the one edge are identified. A position of at least the one edge is then modified whilst observing the rules of association between all the correspondingly oriented edges. Finally an objective function derived from the rules of association between the correspondingly oriented edges is minimized (3009) to thereby balance a layout of the objects in at least the dimension of modification. Other methods involve maintaining the objective function for a group of edges, the addition and removal of constraints in respect of correspondingly oriented edges, the removal, addition and then removal of constraints in modifying the width of a container, the calculation of text container sizes, and the creation of tables, particularly for text containers.

34 Claims, 48 Drawing Sheets

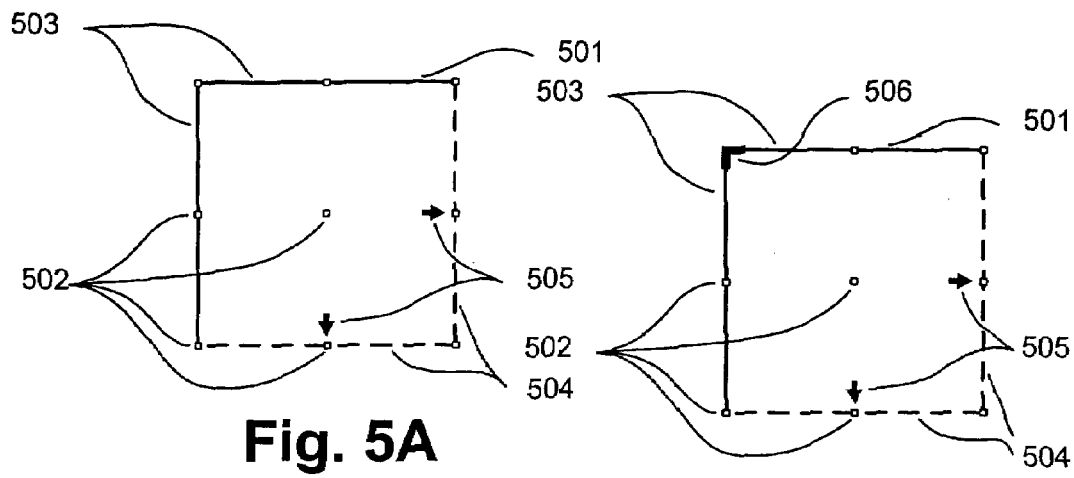
Fig. 5A
Fig. 5B
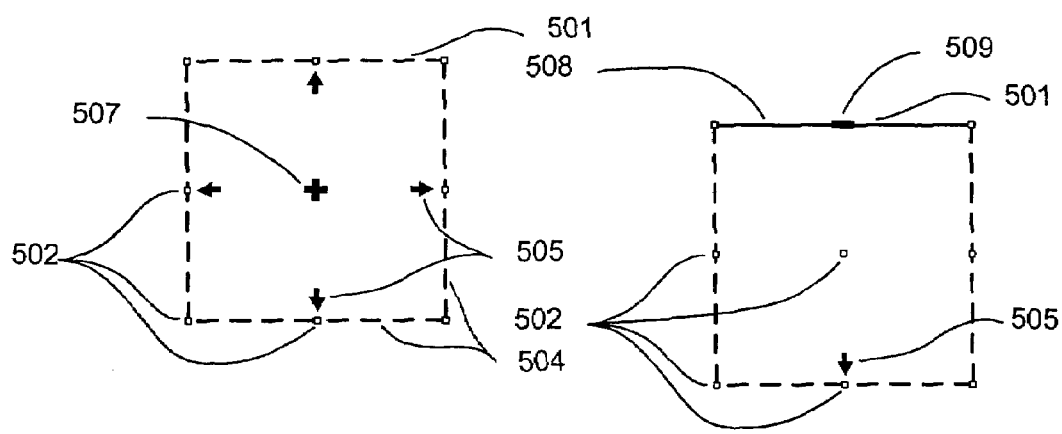
Fig. 5C
Fig. 5D

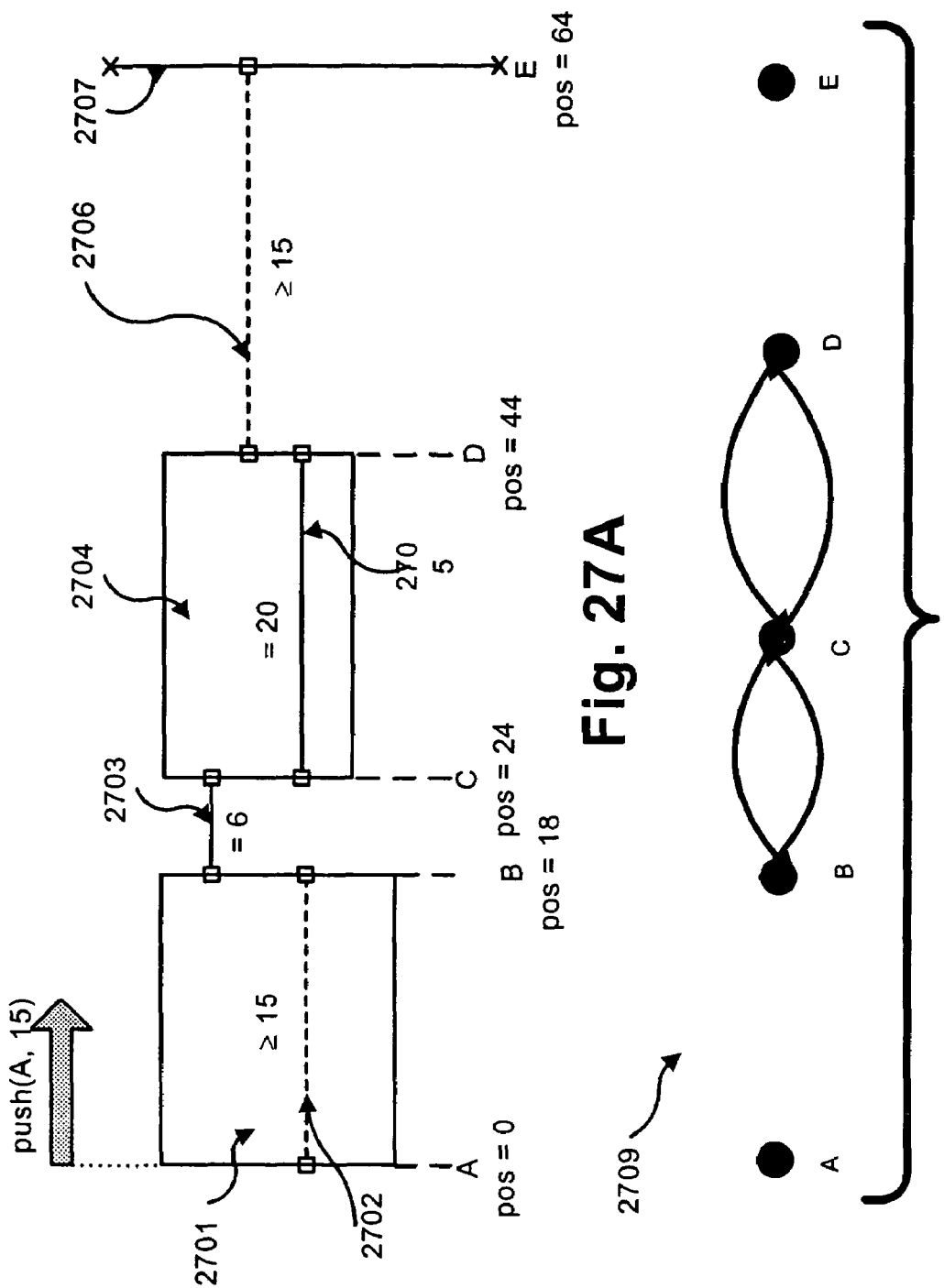

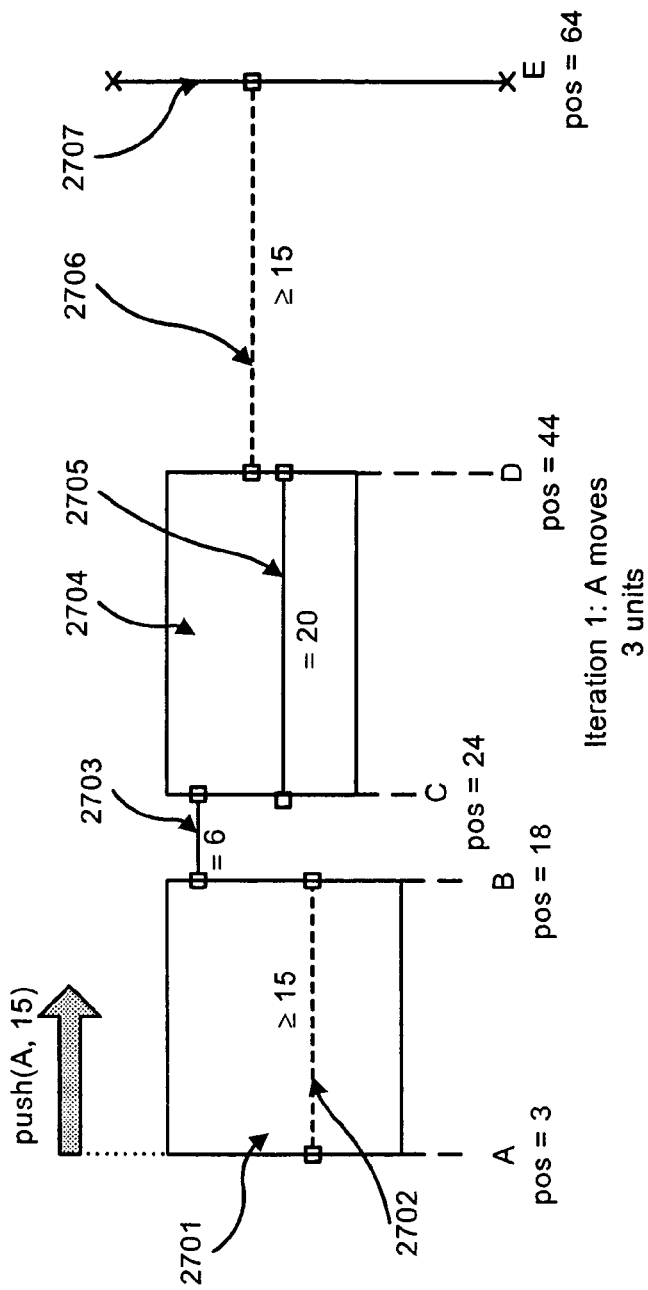
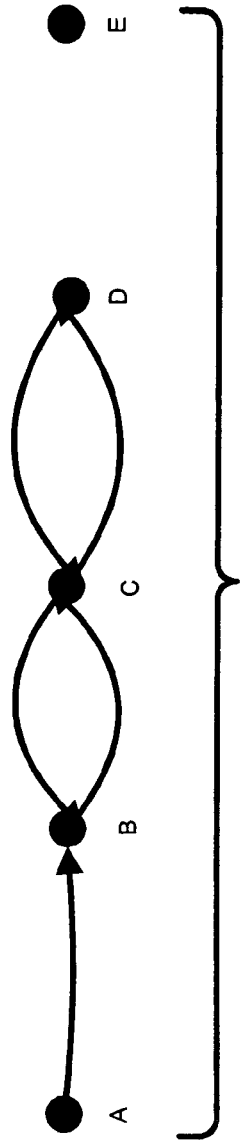
Fig. 27C
Fig. 27D

Iteration 2: A,B, C and D move 5 units

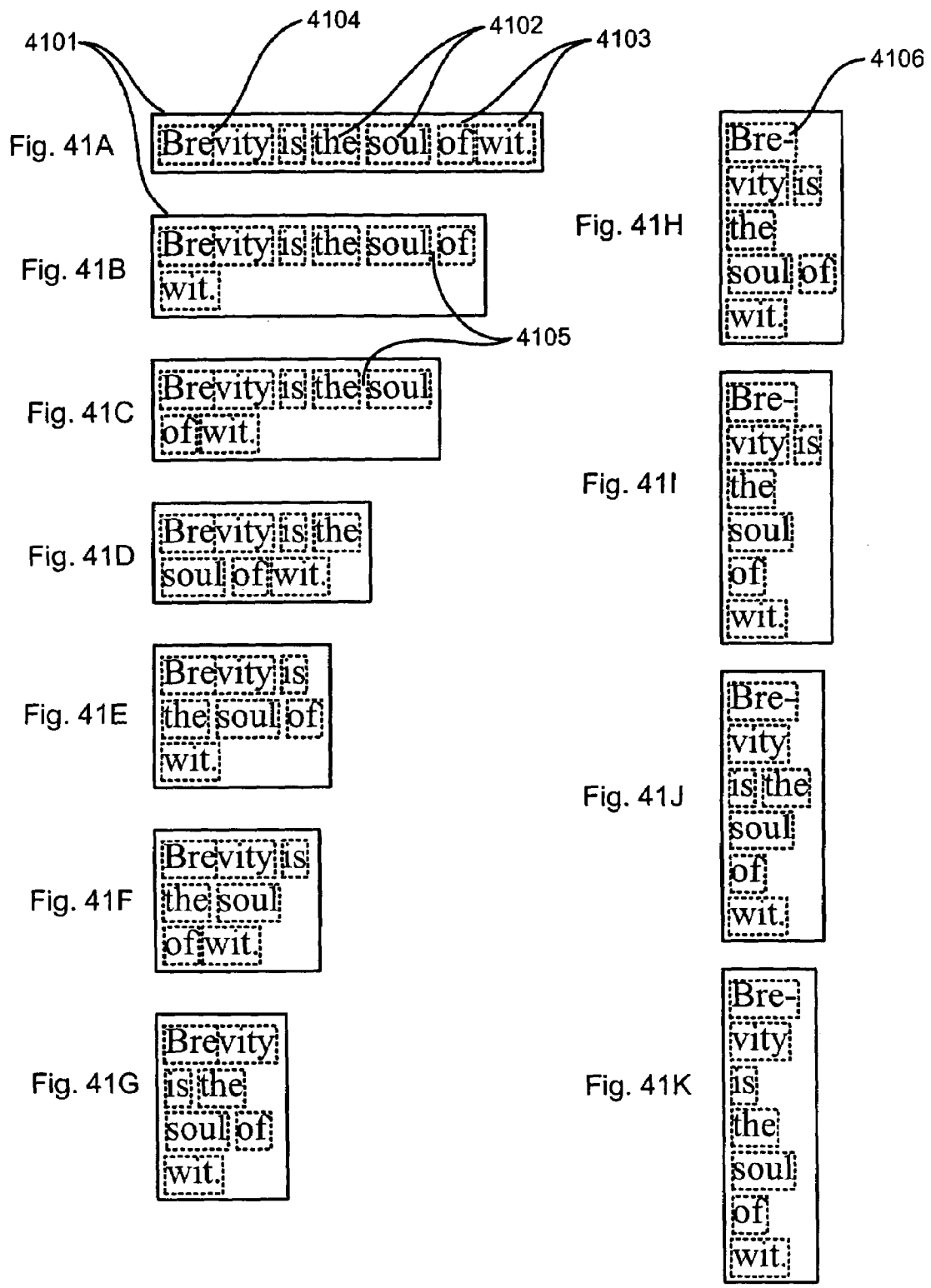

DOCUMENT LAYOUT METHOD

CROSS-REFERENCE TO RELATED PATENT APPLICATIONS

This application claims the right of priority under 35 U.S.C. § 119 based on Australian Patent Application No. 2003905658, filed 15 Oct. 2003, which is incorporated by reference herein in its entirety as if fully set forth herein.

FIELD OF INVENTION

The present invention relates to software implemented methods and processes for creation, editing, and printing of documents composed of text and graphics and, in particular, to the creation, editing and printing of variable data documents.

BACKGROUND

Variable Data Printing

Traditionally, when printing large numbers of documents, the printing processes used have been analogue processes that required physical representations of the documents. These included bromides and/or printing plates that had to be created before printing. This has meant that it was expensive to produce customized documents and large runs of documents typically involved printing multiple copies of exactly the same document.

Customized documents may be produced using digital printing processes where a physical copy of the document does not have to be prepared before printing. Until recently, digital processes have either been expensive or the results have been of poorer quality than those produced by traditional analogue printing processes.

In the last five years, however, advances in digital printing have significantly reduced the cost to create high quality customized documents. These advances have lead to the growing popularity of variable data printing. Variable data printing software is becoming available that allows document authors to create not just single documents, but families of related documents, where each document is customized for its intended readers.

Several problems need to be solved to make high quality customized printing feasible. One problem is the quality of the printed output. Only recently have digital processes been able to approach the resolution of traditional print processes. Another problem is that typically large amounts of data are required to represent a high quality document in digital form, particularly if the document contains a number of high-resolution images. This makes it impractical to electronically transmit large numbers of customized documents to a digital printer via a computer network. A third problem is that customized documents typically require more effort and skill to create and maintain than simple documents. Customized documents are created by inserting variable data into a document template. A document template is a document that has slots for inserting variable data. A document template may include some data that is common to many documents and information defining how to lay out each custom document produced by inserting data into the variable data slots of the template. Authoring a variable data template is more difficult than authoring a simple document because the layout of the pages needs to be defined in a way that can cope with differing sizes of data or missing data items. In addition, the relationship between the template and the data needs to be defined and maintained. As such, database skills are often required in order to be able to create customized documents using variable data printing technology.

The quality of digital printing hardware has improved to the point where results are comparable to those produced by high-end analogue printing while the cost has come down dramatically. New standards such as PPML allow groups of related documents to be sent to a printer via a network without sending large amounts of repeated data. This reduces the network bandwidth required for variable data printing.

There is no easy solution to the problem of the complexity of authoring and management of variable data documents. Customized printing has been available in a crude form in word processing software for many years in the form of "mail-merge", but mail merge only supports very crude control over the layout of the individual output documents. The most recent variable data printing software allows the creation of sophisticated, flexible layouts that adjust to the sizes and shapes of data items that may be different in each document, but these applications are still complicated and difficult to use.

Layout Models

Typically, a document containing both text and graphics is organized as a collection of items of different types. Items may be text, graphics, or other kinds of abstract objects such as groups, which are collections of items. The layout items typically have a rectangular shape or have a rectangular extent. The rules allowed by each application for defining how to lay out items represent a layout model. In variable data printing applications, the rules must define how the layout is calculated as the sizes of items change.

Hierarchical Layout Models

Current variable data printing solutions typically use hierarchical models to define layouts. These models are similar to those used for HTML and XML documents. Examples of such models are the CSS box model and XSL:FO. In such layout models, rectangular items are laid out in a rectangular layout area by stacking them vertically or horizontally inside a layout area.

In addition to horizontal and vertical stacking, another more general alternative supported by some applications is to allow items to be stacked in vertical columns or horizontal rows, like rows of words on a page. In this form of layout, if there are too many items to fit in a row or column, a new row or column is started and the excess items "wrap" to the next row of column. This is analogous to word wrapping in word processors. This way of laying out items is most useful for applications where the size of the page or layout area may vary widely, such as in web applications. Stacking is less useful for variable data printing applications, because in variable data printing applications, the quality of the layout is usually important, and when the items wrap to the next row or column, the layout often does not look pleasant.

In hierarchical layout models, complex layouts may be defined by using groups of items. A group is a rectangular layout item that contains other items and is a layout in itself. The items inside a group are laid out inside the bounding rectangle of the group.

The positions of items in a layout may be controlled by alignment options for example an item in a vertical stack may be left aligned so that the item is always as far to the left of the rectangle that contains the vertical stack as possible. Alignment may be associated with the group so all items in the group will have the same alignment, or each item in the group may have corresponding associated alignment options. Various alignment options are commonly supported including centering, left alignment and right alignment.

Positions of items may also be controlled by margins associated either with the individual items or associated with the containing layout or group. Margins define the minimum allowed distance between two adjacent items.

Constraint Based Models

Current hierarchical layout models are simpler to understand than more general constraint-based models developed previously. Constraint-based models have been used for computer aided design (CAD) applications, user interface construction and window management. In user interface construction applications, the objects to be laid out are widgets such as buttons and input fields. In window management applications, the objects to be laid out are windows that are used to represent views of data as part of a user interface for a computer operating system.

In user interface construction applications, dynamic layout constraints are used to allow a graphical user interface (GUI) to adapt to different screen resolutions and changes such as the use of different fonts and text sizes. Dynamic layout simplifies the process of building a user interface for multiple platforms.

In window management applications, the user can apply dynamic constraints to create relationships between windows that are preserved as windows are added or removed, or as windows change size or position.

CAD applications involve very general geometric constraints, and the layout models are more complex, more difficult to use, and layouts are slower to calculate than document layout models. For example, some constraint solvers used for CAD applications support specifying that two lines are parallel, which cannot be expressed using linear equations.

Constraint based layout models used for user interface (UI) and window management applications need to be fast enough to be used interactively often if the layout may need to be updated many times per second during graphical editing operations, so the layout method needs to be fast enough to support such operation. These applications typically use a specialized constraint solver to perform layout calculations. The constraint solvers used for these applications typically support linear constraints, expressed as linear equations (i.e. linear equalities), or linear inequalities, or both. Typically, these constraint solvers also have an objective function that defines the quality of a solution. The aim of the constraint solver is to minimize (or maximize) the value of the objective function without violating any of the constraints. If the objective function is also linear, then this type of problem is called a linear program. These types of problems are well-understood optimization problems and there are known algorithms for solving them. Typically, an algorithm called the simplex algorithm is used to solve problems of this type.

Given a layout problem defined by a set of constraints and an objective function, the problem may be over-constrained, such that there are no solutions. The problem may alternatively be under-constrained, such that there are many solutions, or there may be one solution. To be able to calculate a layout, a layout model needs to ensure that layouts have exactly one solution. One way to achieve this is to report the fact that there are no solutions or too many solutions to the user and allow the user to correct the problem. This is generally not an acceptable solution because it is not easy to present meaningful information to the user about why the problem is over-constrained or under-constrained. If the system is over-constrained, many constraints may be simultaneously inconsistent with each other. If the system is under-constrained, it may not be obvious how to prevent the user from adding inconsistent constraints. This is particularly difficult when the constraints are being edited using a graphical interface.

One known way to avoid having no solutions is to prioritize constraints into what is called a constraint hierarchy. If there is no solution to the constraints, constraints are ignored in reverse order of priority until a solution is possible.

A known way to avoid under-constrained problems is to use a non-linear objective function. If a suitable strictly convex function is used, the problem will always have a unique solution. Typically, a quadratic objective function is used, because there are well-known techniques for solving optimization problems with linear constraints and a quadratic objective function. The simplest of these are modifications of the simplex algorithm.

Another problem with the generation of variable data documents is that of previewing the documents being generated. Word processors and desk top publishing application often use a "print preview" function to assist the user in overall assessment of the work before committing to printing. This can be laborious where a large number of documents need to be previewed.

SUMMARY OF THE INVENTION

It is an object of the present invention to substantially overcome or at least ameliorate one or more problems associated with variable document printing.

In accordance with one aspect of the present invention, there is disclosed a method of laying out objects forming part of a template intended for a variable data document, said objects each having a rectangular boundary in two-dimensional space, the method comprising the steps of:

setting a link between at least two objects for defining cooperative movement thereof;

allotting variable input data to each object; and performing a dynamic layout for determining a size and a position of each object allotted in said allotting step based on the link setting set in the setting step, wherein, in the dynamic layout step, the size and the position of each object is determined by the effect that the each object, to which variable data is input, pushes each against the set link.

Other aspects of the present invention are also disclosed.

BRIEF DESCRIPTION OF THE DRAWINGS

At least one embodiment of the present invention will now be described with reference to the drawings in which:

FIGS. 5A-5D illustrate a first exemplary container rules;

FIGS. 27A-27F show an example of the push operation in use, in which FIGS. 27A and 27B show the starting position of an example of the push operation, FIGS. 27C and 27D show an intermediate stage of an example of the push operation, and FIGS. 27E and 27F show the result of an example of the push operation;

FIGS. 41A to 41K depict the laying out of text within a container and how such may be influenced by container shape.

DETAILED DESCRIPTION INCLUDING BEST MODE

1. Overview

Figure 1A:
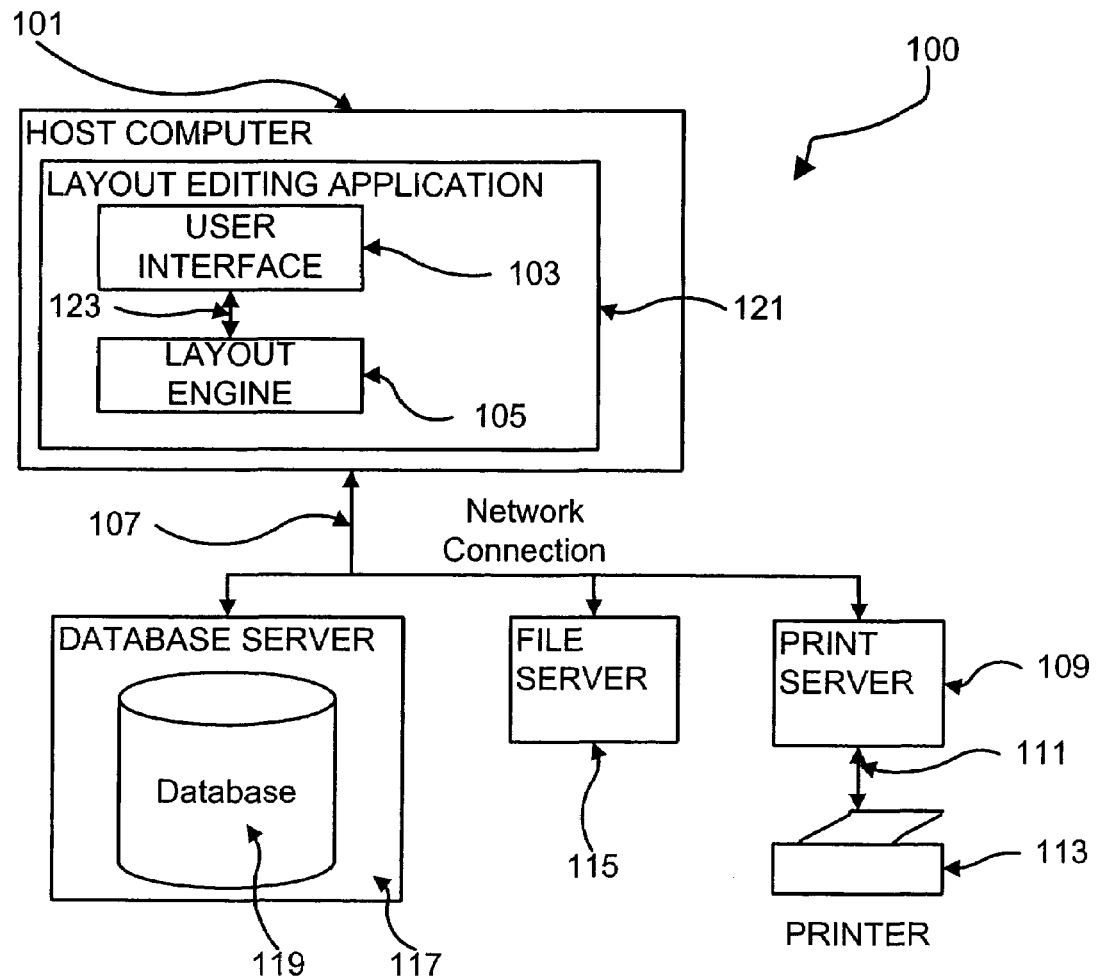
FIG. 1A illustrates a computer system configuration for variable data printing.

A variable data document creation and printing system is disclosed which is preferably implemented as a software application. The application allows a plurality of documents to be created that have a similar form yet whose contents may differ. This is achieved by the creation and editing of a document template, and the association of areas on the document template with various data.

A document template may contain a plurality of containers, each of which is configured to hold content, such as text or image data. Containers can be fixed in position and size, or may vary in dimensions or position from document to document in accordance with user specified rules. The content of these containers can be static or variable (ie. dependent on some data source, such as a database).

Users may specify various types of data sources from which to obtain data. A data source contains a plurality of data records. The application provides a mechanism for associating the data with containers in the document template.

The document template and the data from the data source are then "merged" to produce a number of documents, based on the association between the data source and the containers in the document template. Typically, one document is produced for each record, or group of records, in the data source. The documents can then be saved to disk, or printed as required.

These arrangements afford several independent advantages over the prior art. For example, unlike the prior art, when editing the document template, the user may choose to always see one of the merged documents. This is because the document template and the data are merged dynamically. As a consequence it is possible to see at least what one of the resulting documents will look like while editing the template, unlike the prior art where it is necessary to go to a special preview area to see what a document will look like (instead of the document template).

The constraints on the containers (which determines which way containers can move and change size) are shown in place, and can be edited in place by clicking on various positions on the containers without having to go to a separate screen or area, unlike the prior art. This simplifies the creation of the document template compared with the prior art.

2. Overview of Implementations

The fundamental implementation is a variable data document creation and printing application comprising at least a user interface and a layout engine. One specific implementation is software executable on a personal computer together with a printer. In another implementation, the application is incorporated as software executable on a processor embedded in a printer or print controller that supports printing of variable data document sets. In yet another implementation, the application is incorporated as software executable on a web server that can serve up documents customized for the viewer. These implementations also incorporate such software when executing upon an appropriate hardware arrangement.

Variable data printing refers to printing sets of related documents. In non-variable data printing, documents are printed individually and the data for each document is typically sent to the printer separately. In variable data printing, a print job comprising multiple related documents is sent to the printer. Typically, the documents in a variable data print job contain shared elements that occur in multiple documents. This data is typically sent to the printer only once per job instead of being repeated for each document. When a variable data print job is printed, the shared data is inserted into each document. This may require calculation of the layout of the pages of the document as the pages are printed. In this case, the layout method may be part of the software in the printer or print server. More typically, the layout of each document is calculated on a client machine and the layout is sent to the printer as part of the print job, in this case the layout method is performed on the client machine.

3. System Description

Figure 1B:
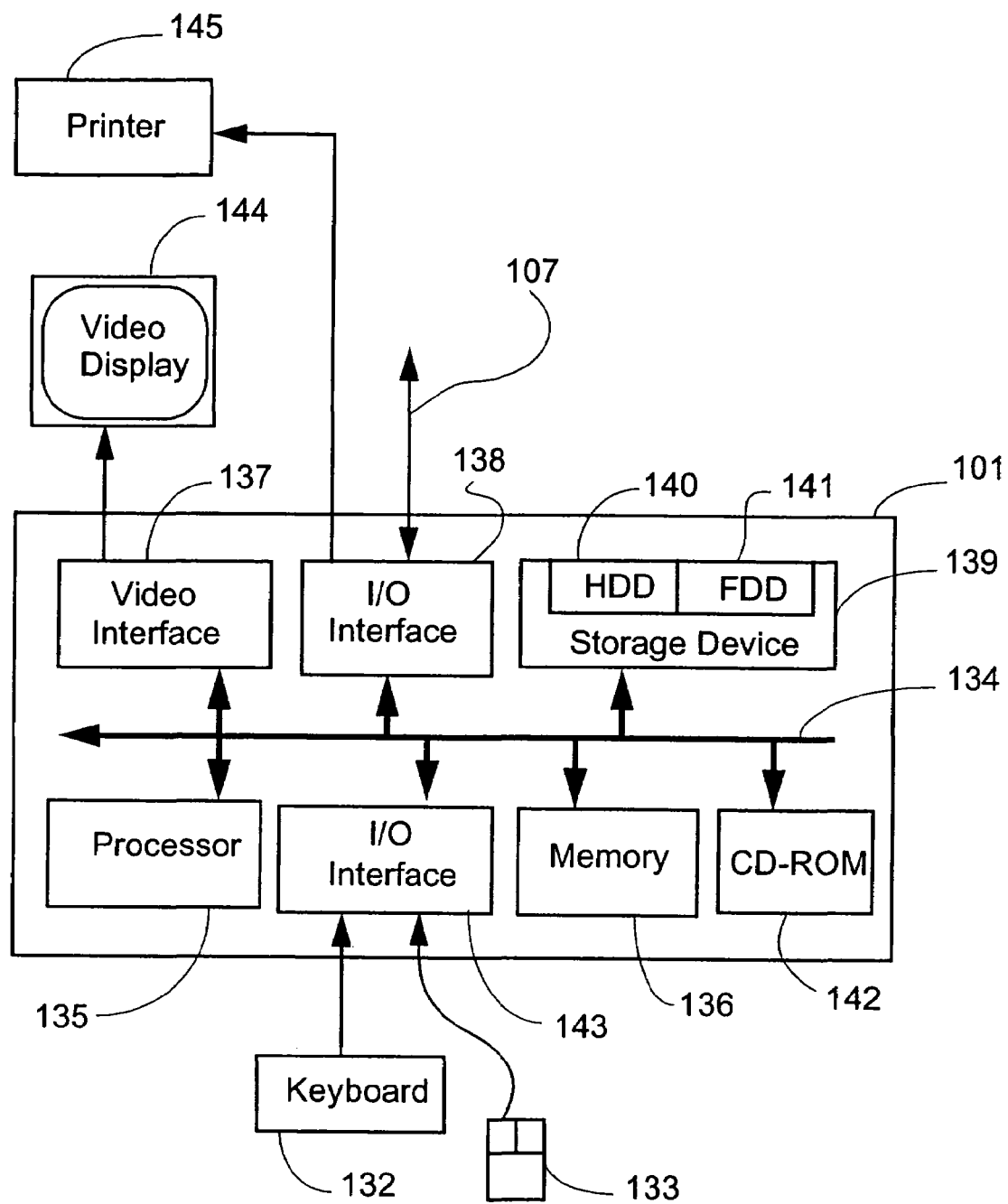
FIG. 1B is a schematic block diagram representation of the computer module of FIG. 1A.

FIG. 1A illustrates a system 100 for printing variable data documents. The methods described herein may be practiced within a general-purpose computer module 101, depicted in detail in FIG. 1B, wherein the processes described may be implemented in whole or in part as software, such as a layout editing application program 121 executing within the computer module 101 and being operable over the system 100. In particular, the layout editing and consequential printing steps may be implemented by instructions in the software that are carried out by the computer 101. The software may be stored in a computer readable medium, including the storage devices described below, for example. The software is loaded into the computer from the computer readable medium, and then executed by the computer 101. A computer readable medium having such software or computer program recorded on it is a computer program product. The use of the computer program product in the computer preferably results in an advantageous apparatus for document layout editing and variable document printing.

The computer module 101 couples to input devices such as a keyboard 132 and a pointing device such as a mouse 133, and to output devices including a display device 144 and optionally a local printer 145. An input/output interface 138 enables coupling the computer module 101 to other computing devices of the system 100 via a network connection 107. The network connection 107 is typically a Local Area Network (LAN) or a Wide Area Network (WAN).

The computer module 101 typically includes at least one processor unit 135, a memory unit 136, for example formed from semiconductor random access memory (RAM) and read only memory (ROM), input/output (I/O) interfaces including a video interface 137, and an I/O interface 143 for the keyboard 132 and mouse 133. A storage device 139 is provided and typically includes a hard disk drive 140 and a floppy disk drive 141. A magnetic tape drive (not illustrated) may also be used. A CD-ROM drive 142 is typically provided as a non-volatile source of data. The computer module 101 utilizes an operating system, such as GNU/Linux or Microsoft Windows, and the components 135 to 143 of the computer module 101, typically communicate via an interconnected bus 134 according to the operating system and in a manner which results in a conventional mode of operation of the computer system formed thereby, known to those in the relevant art. Examples of computers on which the described arrangements can be practiced include IBM-PC's and compatibles, Sun Sparcstations or alike computer systems evolved therefrom.

Typically the layout editing application program 121 is resident on the hard disk drive 140 and read and controlled in its execution by the processor 135. Intermediate storage of the program 121 and any data fetched from the network 1020 may be accomplished using the semiconductor memory 136, possibly in concert with the hard disk drive 140. In some instances, the application program 121 may be supplied to the user encoded on a CD-ROM or floppy disk and read via the corresponding drive 142 or 141, or alternatively may be read by the user from the network connection 107. Still further, the software can also be loaded into the computer module 101 from other suitably sized computer readable media including magnetic tape, a ROM or integrated circuit, a magneto-optical disk, a radio or infra-red transmission channel between the computer module 101 and another device, a computer readable card such as a PCMCIA card, and the Internet and Intranets including email transmissions and information recorded on websites and the like. The foregoing is merely exemplary of relevant computer readable media. Other computer readable media may be used.

The application 121, whilst named for layout editing, also operates to perform variable data printing (VDP) and includes two software components. The first of these components is a layout engine 105, this being a software component for calculating the positions of rectangles and lines with given constraints and sizes within a rectangular area. Secondly, a user interface 103 component provides a mechanism for allowing the user to construct a document template, and to associate regions in the document template with data sources. The user interface 103 and layout engine 105 communicate via a communications channel 123. A data source for document generation is typically a database 119 that is hosted on a database server 117, generally formed by another computer upon which is running a database application. The host computer 101 communicates with the database server 117 by means of the network connection 107. The variable data printing application 121 generates document templates that can be saved to the host computer 101 or to a file server 115, generally formed by another computer. The variable data printing application 121 also produces documents, formed by the document template merged with data. These documents can be saved to the local file system on the host computer 101, saved on the file server 115 or sent to the print server 109 or printer 113 directly for printing. The print server 109 is a computer which provides a network capability to printers that cannot be networked directly. The print server 109 and the printer 113 are connected via a typical communications channel 111.

Figure 2:
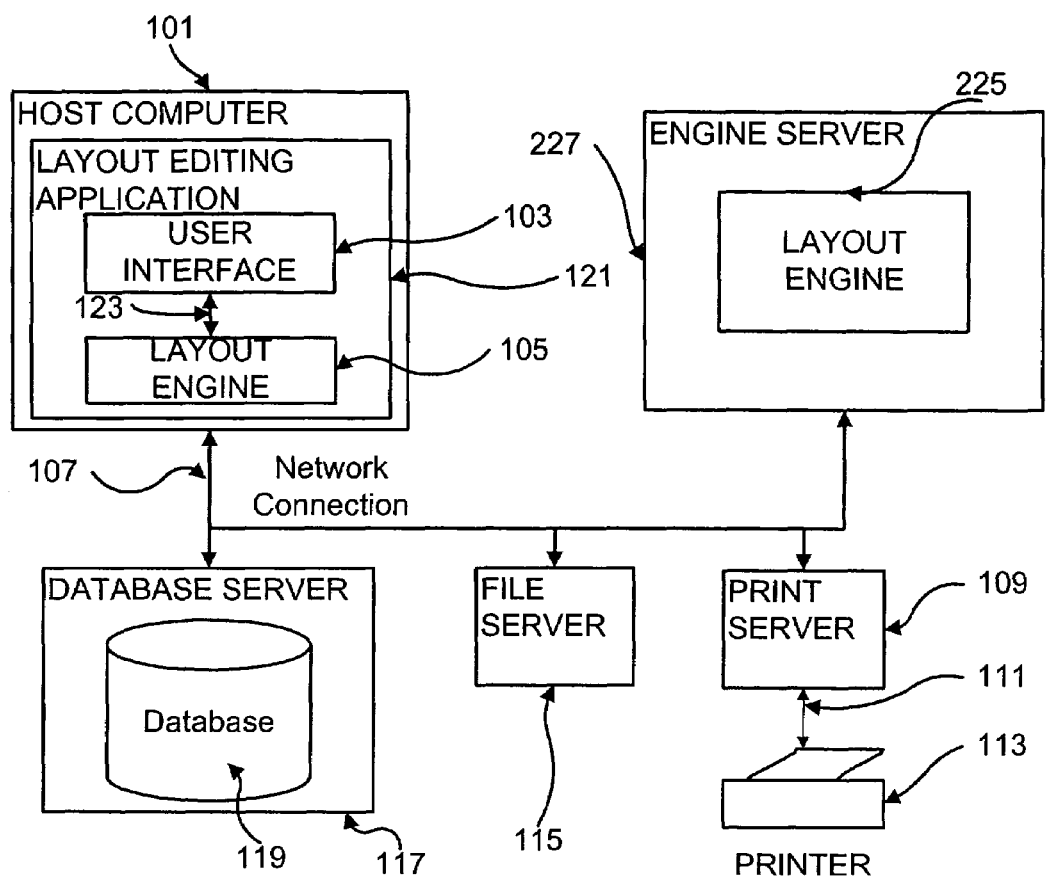
FIG. 2 illustrates an alternative computer system configuration for variable data printing.

FIG. 2 is similar to FIG. 1 except for the addition of the engine server 227 containing a separate version 225 of the layout engine 105. The engine server 227 is another typical computer. Document templates stored on the file server 115 are able to be combined with data stored in the database 119 to generate documents for printing or other purposes by the layout engine 225. Such operation may be requested via the user interface 103, or just to request a specific record to be printed.

4. Main Window

Figure 3:
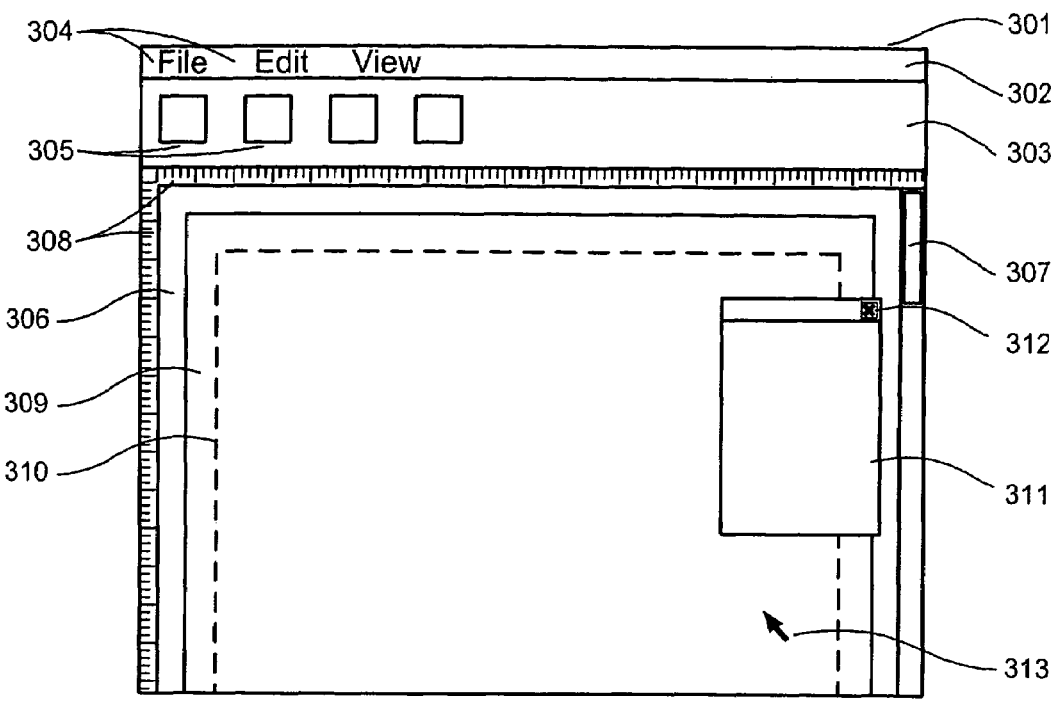
FIG. 3 illustrates an example of the application main window including menu bars, toolbars, work area and floating palette.

Referring to FIG. 3, the user interface 103 includes a graphical user interface formed by an application window 301 which, when operating, is displayed on the video display 144. The window 301 features a menu bar 302, a toolbar area 303 that in some implementations may be detached and moved to various locations on the screen, a work area 306, an optional floating palette 311 and a cursor/pointer device 313, whose location is typically associated with a position or movement of the mouse 133.

The menu bar 302 has a number of menu items 304 which, when activated, expand into a hierarchy of menu options as is common in the present art.

The toolbar 303 has a number of tool buttons or widgets 305, each of which may be hidden or shown depending on the particular mode of the application.

Optional rulers 308 may be used to indicate the position of the pointer, pages, lines, margins guides, containers or other objects in the work area. The rulers 308 may show numerical indication of the units used, for example inches, millimeters or pixels.

The floating palette 311 can be used to access additional functions such as the variable data library. The palette 311 has its own window controls 312 allowing it to be moved, resized or closed. The palette 311 may optionally remain in front of the work area at all times, or may be hidden behind other objects. The palette 311 may be constrained to appear only within the extents of the application window 301, or can be allowed to appear partially or wholly outside of the application window 301.

Figure 4:
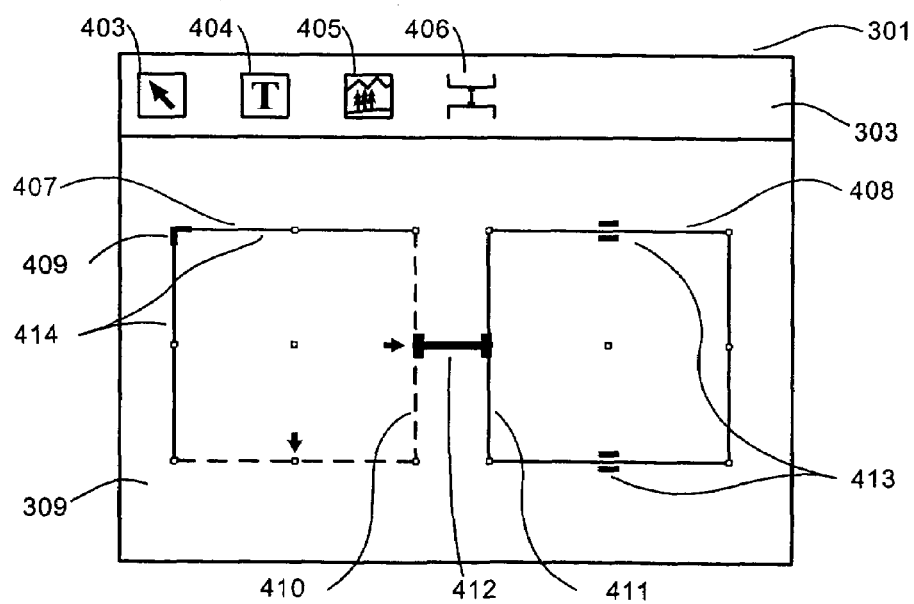
FIG. 4 illustrates a screen, tools and icons to show aspects of the present disclosure including exemplary container creation, a first type of struts between containers, anchors and sliders.

Referring to FIG. 4, the toolbar area 303 is shown having at least the following user selectable iconic "buttons":

- Selection Tool button 403: used to select, move, scale, resize and lock/unlock container edges. Containers can also be multiple selected by dragging a selection box around containers or holding down the CTRL key whilst selecting containers.
- Image Container Tool button 405: used to create containers for holding static or variable images.
- Text Container Tool button 404: used to create containers for holding static or variable text.
- Strut tool button 406: used to control the distance between containers.

These buttons can be implemented with context sensitive tool tips, as is well known in the art.

5. Document Template

The work area 306 is used to view and edit the design of a document template. This allows the user to design the printed appearance of the documents under preparation and understand how each merged document varies based on the amount and size of variable data being merged with the document template.

If an external data source has been linked to the template, variable text and images are displayed in their containers so that users can preview the current document as they work.

Visual clues that describe the structure of a document and the behavior of its variable data containers are displayed whenever the user rolls the cursor over or selects a container.

The work area 306 features a scroll bar 307, optional rulers 308 and the document template 309. The document template 309 can show a plurality of pages.

The page size for a given document template is specified by the user as is well known in the art. The actual number of pages in each document may vary depending on the variable data. Additional pages may be automatically created to display data if all doesn't fit onto one page.

Within each page boundary is an optional page margin 310 indicating the maximum extents of printable objects on the page.

Also illustrated in FIG. 4 is an example of a plurality of objects that could appear on a page of document template 309, those being: a multiplicity of containers 407, 408, featuring optional anchor icon 409, unfixed edges 410, strut 412 and sliders 413.

6. Containers

A container is a space within a document template into which static or dynamic content such as text, images, and other containers or objects may be placed. Containers may be moved, scaled and reshaped by manipulation of the container as depicted in the user interface using a pointing device 313, and control via the mouse 133.

More precisely, a container has a collection of settings, visual appearances, and interaction and editing behaviors. The following are all part of the definition of a container:

- A container may have static and/or dynamic content. Dynamic content is dynamic in the sense that it comes from a data source and may differ for different documents. Dynamic content is not intended to include animated or content otherwise changing with time, as such are not adapted for printing. Similarly static content will appear the same in all documents produced using this container, although due to the action of dynamic content, static content may be placed differently for each document.
- A container may have cosmetic features, such as a background color, a border, and text settings such as fonts and styles, which apply to content of the container.
- A container may be merged with data from a data source when producing a document. The cosmetic features are typically visible in printed output, as are any static content. Dynamic content will result in the appearance of particular data from the data source. This representation of a container could be printed, for example, or displayed on the screen 144, or both.
- A container may also have a user interface, for example an interactive graphical user interface for editing and viewing settings of the container. The interface elements typically appear on the screen 144 but not in printed documents. The user interface 103 may display some of the cosmetic features of the container, such as background color or font, and may also add features to allow editing and viewing of the settings of the container. Examples of special-purpose user interface features are borders or corner icons for displaying and changing the size or position of a container interactively, or overlaid numbers, lines, icons or text to indicate the behaviour of the container when the container is merged with data from a data source.

One aspect of the present disclosure is a set of new direct manipulation techniques, and methods of display involving the graphical user interface component of a container.

6.1 Container Constraints

According to the present disclosure, a container may have several constraints which control how associated content may be displayed in each document. These constraints, together with a means of associating static and dynamic content with the container, are the primary method by which a user controls the generation of multiple documents from a single document template. An example of a constraint is "this container's content may be a maximum of four inches tall". Another constraint might be "the left edge of this container's content must appear in the same horizontal location in each document". Described herein is a set of methods for displaying and editing such constraints using a graphical user interface.

Content placeholders that specify the locations of static content, such as an image having some defined location on a page, are well known in the digital printing arts. In the following discussion it may be assumed that containers may have a position and size and these may be displayed and edited in manners similar to those known in the art. Instead, the present discussion focuses on the display and editing methods particular to variable data printing.

Containers allow a user to specify the size and position of content in documents. Since several documents may be generated from a single document template, a container must have a user interface for specifying and displaying a multitude of possibilities and constraints.

The edges of a container define a virtual boundary within which associated content will appear in documents. Thus, in this patent specification, discussing the left edge of a container may be equivalent to discussing the left-most edge of where the associated content can be displayed in any documents produced. Similarly, discussing the height of a container may be understood as discussing the constraint on the height of the associated content in any documents produced. Where this patent specification discusses the edge or size of a container with reference to the user interface 103, this distinction will be made clear.

In the following discussion, the term 'fixed' defines that some value used to control the appearance of content is the same in all documents:

- If a width of a container is fixed, this means the width allowed for associated content will be the same in all documents.
- If a height of a container is fixed, this means the height allowed for associated contents will be the same in all documents.
- If a distance constraint is fixed, then the specified distance is constant for all documents.
- If a left or right edge of a container is fixed, this means the horizontal position of that edge is the same for all documents relative to the page, but the height or vertical position of the container may change. For example, if the left edge of a container is fixed, associated content can appear near the top the page in one document and near the bottom of the page in another, but the left edge will have the same horizontal position in all cases.
- If a top or bottom edge of a container is fixed, this means the vertical position of the edge is the same for all documents relative to the page, but its width or horizontal position of the container may change.
- The vertical axis of a container is an imaginary vertical line positioned halfway between and parallel to the left and right edges of the container. If the vertical axis of a container is fixed, then the average of the horizontal positions of the left and right edges of the container will be the same for all documents. With this constraint, a container's width may vary, thus both the left and right edges may be farther from or closer to the vertical axis in different documents, but the axis remains in the same horizontal position for all documents. The container's height and vertical position are unaffected by this constraint.
- Similarly, if the horizontal axis is fixed, this constrains where the top and bottom edges of a container are vertically positioned, although the height is unaffected by this constraint.
- If both the horizontal and vertical axes are fixed, this means the central point of a container is fixed, but its width and height are unaffected by this constraint.
- If a corner of a container, mid-point of an edge of the container, or the central point of the container is fixed, this mean that point appears in the same location in all documents and in the same location relative to the container. For example, if the top-left corner of a container is fixed, this means the top-left point of where its contents may be placed is the same for all documents.
- A vertical edge or axis may be fixed relative to the left hand edge of the page, or the right, or the left page margin, or the right page margin, or some other horizontal position. Similarly, a horizontal edge or axis may be fixed relative to the top or bottom edges or margins of the page, or some other vertical position. These refinements of the term 'fixed' are only significant if page sizes may vary between documents, since if the page size is the same for all documents these possibilities yield no difference in the documents produced.

The opposite of 'fixed' is 'unfixed' which means the edge, axis, corner, mid-point, or distance constraint may vary between documents, but might not necessarily do so in a particular set of documents. For example, there may be other external constraints, which actually prevent the position of an edge from varying, but the fact that the edge position could vary if those external constraints didn't apply means that the edge is still labeled unfixed.

6.2 Container States

The 'edge state' of a container is defined as a set of 8 properties that can be 'fixed' or 'unfixed' as described above: left edge, right edge, vertical axis, top edge, bottom edge, horizontal axis, width and height. The edge state may not fully constrain the position of an edge, since edges may also be affected by other constraints, such as minimum or maximum container size settings, or the positions of other containers. Thus 'edge state' refers to only a portion of the full set of states, which a container may have.

Edge state is significant in most implementations, because the graphical user interface for a container is derived in part from mapping edge states onto graphical representations, and from mapping direct manipulation of edges and container representations onto adjustments to edge state.

Preferably, a container's full state includes more than the edge state. Containers may have minimum and maximum settings for width and height, which further control edge positions. Internal margins control where associated content may be displayed, which may in turn affect where container edges can be placed. Text font, style, size and alignment settings as well as image cropping, scaling, etc may also be a part of the state of a container, and may affect content positions, sizes and appearances. Cosmetic settings such as background and border colors, border line weights, styles and so on are also part of each container's state. Whilst such aspects might not affect the positions of content in documents, they will affect the appearance.

In some implementations, edge state includes the above-mentioned 8 properties that can be either fixed or unfixed. Page sizes cannot vary, so the term 'fixed' here has no further qualifiers. These 8 properties lead to $2^8$ distinct edge states, which is 256 possibilities.

Not all these 256 edge states need be used. For example, consider the state where the left edge of a container is fixed, the vertical axis is fixed and the right edge is unfixed. Since the vertical axis is fixed, the distance from the left edge to the vertical axis must equal the distance from the right edge to the vertical axis for all documents. Since the left edge is also fixed, the distance of the left edge from the vertical axis is constant for all documents, which implies the right edge is also fixed.

Certain implementations model a subset of edge states, each of which exhibits unique behavior. The edge state described above is not used in all implementations since its behavior is identical to several other states. An alternate implementation might employ such states and represent them in the user interface, as a means of modeling and editing whether edges are fixed, instead of modeling unique container behaviors.

One specific implementation uses 36 container states, formed as the product of 6 unique horizontal constraints and 6 unique vertical constraints.

The horizontal constraints on a container are:
1. the left and right edges, the vertical axis and the width are unfixed;
2. the left edge only is fixed;
3. the right edge only is fixed;
4. both the left and right edges are fixed;
5. the vertical axis only is fixed; and
6. the width is fixed, but the left and right edges and vertical axis are unfixed.

The vertical constraints on a container are:
1. the top and bottom edges, the horizontal axis and the height are unfixed;
2. the top edge only is fixed;
3. the bottom edge only is fixed;
4. both the top and bottom edges are fixed;
5. the horizontal axis only is fixed;
6. the height is fixed, but the top and bottom edges and horizontal axis are unfixed.

If the term 'fixed' has qualifiers, for example if each edge or axis could be fixed relative to either the left or right edge of the page, this would lead to more than 36 unique edge states.

Note that the constraint in the above list labeled "Both the left and right edges are fixed" has the same behavior as "The left and right edges, the vertical axis and width are all fixed", and "The left edge and vertical axis are fixed", and indeed several other similar constraints. The simpler, symmetrical constraint is generally preferred since an implementation which uses visual cues to represent various notions of 'fixed' can use fewer such cues if edge states employ fewer 'fixed' constraints, which may in turn produce less visual clutter than would otherwise be the case.

One aspect of the present disclosure associates edge states with graphical representations and editing methods for containers, as described below.

6.3 Displaying and Editing a Container

6.3.1 Method for Creating New Containers

Two classes of container are described: text containers and image containers. A text container holds text and/or embedded images. An image container only holds images.

Referring to FIG. 4, new text containers and image containers can be created in the document template 309 by clicking on the text container tool 404 or image container tool 405 respectively, using the mouse 133, and then dragging a rectangle in the template 309.

Alternatively a container may be created simply by clicking in the document template 309 after activating the appropriate tool 404, 405. Either a container of a default size is inserted, or a dialog box or other prompt is provided for entering the dimensions of the new container. Some containers may be automatically created and placed according to some pre-defined or calculated scheme. Other alternatives may be devised.

6.3.2 Method for Displaying Containers

Preferably, each of the 36 edge states described earlier is mapped onto a graphical representation. There may be fewer than 36 graphical representations, since some edge states may share a representation in some circumstances.

FIGS. 5A-5D illustrate first exemplary edge rules for a container.

The application 121 draws edges as solid lines (see item 503) or dashed lines (see 504) and also features anchors (drawn on or near an edge and composed of lines, shapes and/or icons as shown by 506, 507, 509), handles (control points drawn on or near an edge or shape to allow it to be moved or modified, see 502), sliders (short parallel lines drawn on either side of an edge, see FIG. 4, the items labeled 413), growth icons (see 505), and colors, to represent edge state.

The rules for the container display method of FIGS. 5A-5D are, in order:
1. for each fixed edge, draw that edge solid;
2. if the width is fixed, draw the left and right edges solid;
3. if the height is fixed, draw the top and bottom edges solid;
4. axes are not drawn;
5. all edges not yet drawn are drawn dashed with a growth icon drawn near each edge;
6. for each pair of perpendicular edges and/or axes, at their intersection draw an anchor if both are fixed;
7. for each fixed edge, draw a slider at the centre of the edge if no anchors have been drawn anywhere on that edge; and
8. for each pair of perpendicular edges and/or axes, at their intersection draw, a handle if no anchor or slider has been drawn in that location.

Rules 1, 2 and 3 ensure lines are drawn solid if they are fixed or constrained. Rule 5 ensures unfixed edges are drawn dashed. Rules 6, 7 and 8 ensure that fixed points display anchors, some fixed edges display sliders and others display handles.

In the above, edges need only be drawn once so if a rule causes an edge to be drawn then later rules will not cause that edge to be drawn again. Icons may be drawn differently or omitted if it is convenient to do so, for example if the container is very small and the icons would overlap each other or obscure other features of the representation.

The exact location where unfixed edges are drawn may depend on the content of the container content. As described later, 'live proofing' is used, which means content is merged with the document template and may be visible in the user interface. An alternate implementation can use the container's content area averaged over all documents, or some other means of deciding where unfixed edges should be placed in the user interface.

These representations of containers provide a graphical method of displaying container edge states. The interpretation of the representations is as follows:

A dashed line means the position of that edge in documents depends on the content of the container. In FIG. 4, such an edge is labeled 410.

A solid line means the edge is constrained, either because the edge is fixed (such as edges 414) or the width or height of the container is fixed (both are fixed in container 408).

An anchor means the edges and/or axes which intersect that anchor are fixed. Hence, the anchor point will appear in the same horizontal and vertical position in all documents. An anchor is therefore, by definition, fixed. Icon 409 in FIG. 4 is an example of an anchor icon which indicates the intersecting edges 414 are fixed.

A slider means the associated edge is fixed but the container may be located in many positions 'sliding lengthways' along the edge. For example, in FIG. 4, the sliders 413 indicate the contents of container 408 may appear in a document to the left or right of the position seen in that particular diagram.

Some or all of these icons or edges may be drawn or not drawn depending on which tool or which containers are selected, highlighted or otherwise activated. Container edges and icons are, in general, not drawn in a printed document since they are an aid to the design of a document template.

Settings such as minimum and maximum width and height can be displayed in a secondary dialog window.

In FIG. 5A, container 501 is unfixed in both width and height. Fixed edges 503 are represented by solid lines. Unfixed edges 504 are represented by broken lines. Growth icons 505 are additional or alternative indicators that the adjacent edges 504 are unfixed.

In FIG. 5B, container 501 is unfixed in both width and height. Anchor icon 506 additionally or alternatively indicates that both edges 503 intersecting at the icon are fixed.

In FIG. 5C, container 501 is unfixed in both width and height, with expansion or contraction of the container occurring equally around the center point as indicated by optional anchor icon 507.

In FIG. 5D, container 501 is unfixed in both width and height, except that the top edge 508 is fixed. Anchor icon 509 indicates that the top edge 508, in the center of which the icon is located, is fixed, and also indicates that the container's left and right edges expand or contract around a central axis line drawn vertically through the icon (the vertical axis).

6.3.3 Method for In-Place Editing of Container Properties

By clicking on or in the proximity of any edge 503 or 504 with the mouse 133 and pointing device 313, the edge 503/504 is swapped between the fixed and unfixed state, and the graphical representation in the user interface 301 is updated accordingly.

Control points 502 may be dragged using the combination of the mouse 133 and the pointing device 133, causing the corresponding edge or edges to follow the position of the control point 502. On releasing the control point 502 from selection with the mouse 133/pointer 313, a fixed edge remains in the position to which it has been dragged, assuming there are no external constraints causing the new position to be invalid, while an unfixed edge will return to its calculated position, which is determined by factors such as the size and shape of the content inside the container and any other constraints that may apply to the container or edge. See later for a full description of the algorithms used to determine the position of unfixed edges and containers.

Control points located at the centre of an unfixed edge or at the intersection of two unfixed edges may be fixed or may be not shown at all, and control points located on either end of one unfixed edge may be restricted to movement in the direction parallel to the edge.

Additionally, anchors may be added to a vertex or edge of a container by clicking with the pointing device 133 in the proximity of that vertex or edge, or on the control point located at that vertex, or in the centre of the edge. Anchors may also be removed by clicking in the proximity of the anchor icon, or alternatively by selecting the anchor then activating a menu item, button or other control in the interface.

Adding an anchor in this way will result in the edge, edges, axis or axes intersecting the anchor becoming fixed.

It is desirable for containers to have at least one point that is fixed, unless otherwise externally constrained, since without this requirement it would be possible to create containers for which the horizontal or vertical position is poorly defined. For example, the content of a container which has no fixed edges or axes could logically appear anywhere on a page if the container has no external constraints otherwise operative. This would make it difficult for the user to predict where content of such a container would appear in documents. Consequently, this possibility is prevented some implementations by disallowing transitions that would place containers into such a poorly defined state.

A container may have a fixed width or height without having corresponding edges fixed, providing the container has an external constraint, as described above. For example, a container could have a fixed width despite having its left and right edges unfixed, provided its horizontal position of the container can be ascertained by some horizontal constraint. Such external constraints are discussed below and are called "struts".

Provided an external constraint strut is attached to a container, the width or height can be fixed by clicking on edges in a manner similar to that described above for fixing edges. In this circumstance, clicking on or near an unfixed left or right edge will fix the width of the container if there is a horizontal strut connected to the container, and clicking on or near an unfixed top or bottom edge will fix the height if there is a vertical strut connected to the container.

Manipulating edge, axis, width and height fixedness correspond to a transition between edge states for the container. Other manipulations, such as changing the position of a fixed edge or corner, modify other container state information.

Preferably, in order to ensure each container always has a valid edge state, a set of rules is applied each time a constraint is added or removed from a container, and necessary adjustments are made to other constraints so as to resolve any problems. Adjustments are immediately indicated to the user by updating the screen display to show the new constraint configuration. This causes the user interface 103 to prevent containers attaining an undesired state.

Rules are applied individually to the horizontal and vertical dimensions of each container as follows:

1. If any edge becomes fixed or acted upon by an external constraint, the axis parallel to that edge becomes unfixed.
2. If an axis becomes unfixed, at least one parallel edge must become fixed or acted upon by an external constraint.
3. If opposite edges become unfixed and all external constraints on those edges are removed, the axis parallel to those edges becomes fixed.
4. If an axis becomes fixed, edges parallel to the axis become unfixed and external constraints acting upon those edges are removed.
5. If the width becomes fixed, the left and right edges and vertical axis become unfixed.
6. If the height becomes fixed, the top and bottom edges and horizontal axis become unfixed.

6.3.4 Alternative Container User Interface: Separate Constraints

An alternate (second) implementation of the container user interface may display and allow editing of containers in a way that divides the edge state of a container into visually distinct and separately editable constraints.

In this implementation, width and height constraints are indicated by bars across the content area of a container. Edges only indicate the fixed or unfixed nature of an edge.

The rules for the second implementation according to container display method are, in order:

1. for each edge or axis, if that line is fixed, draw it solid, otherwise draw it dashed;
2. if the width is fixed, draw a width bar across the content area, otherwise draw it dashed;
3. if the height is fixed, draw a solid height bar down the content area, otherwise draw it dashed; and
4. for each pair of perpendicular edges and/or axes, at their intersection draw an anchor if both are fixed, otherwise draw a handle.

There is no need for sliders, as previously described, in the second implementation, since a solid line already indicates the same behaviour a slider would. This is not true for the previous implementation, since that implementation uses solid lines to indicate width and height constraints in addition to the fixedness of an edge.

Figure 38:
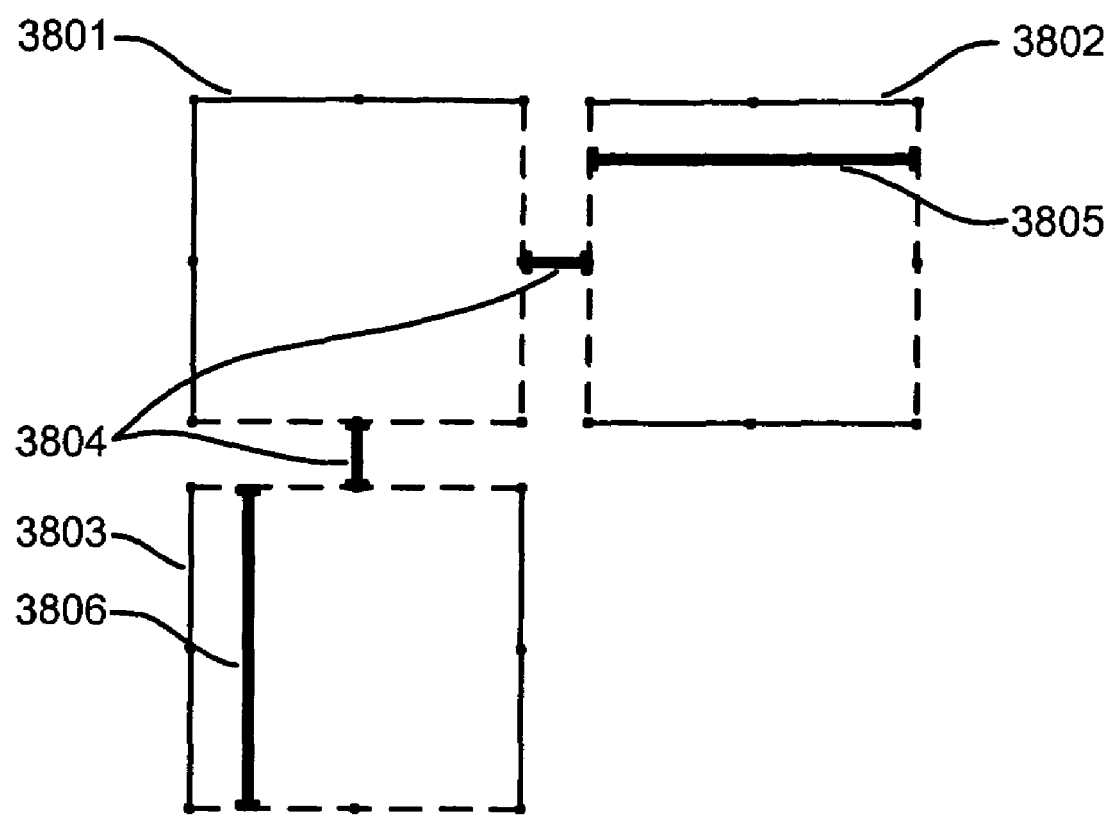
FIG. 38 illustrates the use of height and width bars to represent container constraints in second container rules.

The width and height bars of the second implementation are a graphical means of displaying and editing width and height constraints on the container, respectively. The bars may look like edges, having solid or dashed appearances to indicated fixedness and un-fixedness respectively. In FIG. 38, a width bar 3805 and a height bar 3806 are shown spanning two containers 3802 and 3803, whose horizontal and vertical positions respectively are determined by the size of container 3801 and the length of the connecting struts 3804. Optionally, the bars might be inactive or not drawn if other constraints, such as fixed edges, would make fixing the width or height meaningless. For example if the left edge of a container is fixed and the right edge is unfixed, it may be desirable to prevent the user from fixing the width, since this would take the container to an edge state which is outside the set of 36 preferred edge states discussed earlier. In that situation, the width bar might not be shown.

To edit containers in this second implementation, clicking on an edge, axis, or width or height bar, using the mouse 133 and pointer 313, changes the edge from fixed to unfixed, or vice versa. Dragging an edge, handle or anchor works in a similar manner as described, and the clicking on an anchor fixes any unfixed edges or axes which intersect it, or if both intersecting lines are already fixed, both become unfixed. If this leaves the container with either its horizontal or vertical positions poorly defined, fixing either or both of the central axes may correct this problem. For example, if clicking on an anchor leaves the container with all edges unfixed, there may be multiple possible content locations, and hence to correct this problem the container's mid-point could be anchored by fixing both its vertical and horizontal axes. Other external constraints or rules might make this step unnecessary or fixing only one axis might be sufficient.

6.3.5 Alternative Container User Interface: Size Frames

In another (third) implementation, the behaviour of the container is controlled by direct manipulation of the minimum and the maximum extents, each of which is represented by a separate rectangular frame.

Figure 6A:
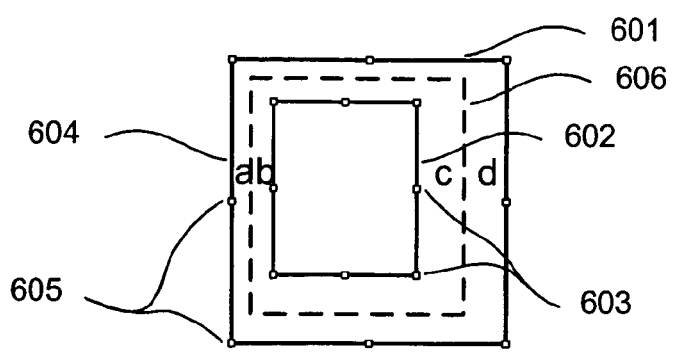
FIGS. 6A-6C illustrate a third container rules.
Figure 6B:
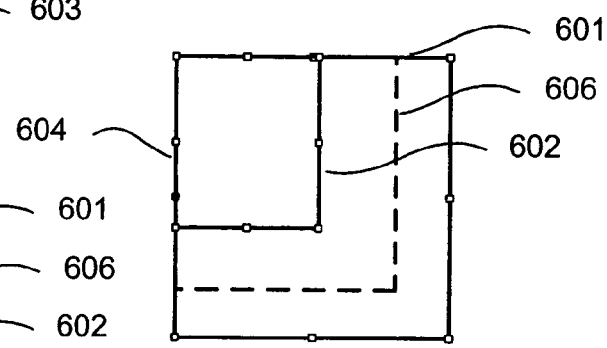
Figure 6C:
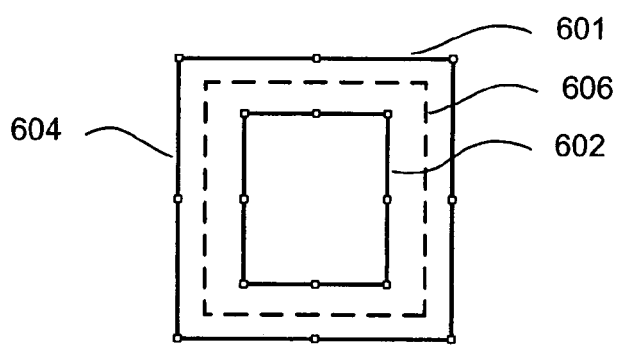

FIGS. 6A-6C illustrate third exemplary rules for a container.

Referring to FIG. 6A, a container 601 comprises a minimum extents frame 602 with control points 603 placed at each vertex and optionally at the center of each edge, and a maximum extents frame 604 with control points 605 placed at each vertex and optionally at the center of each edge.

The minimum extents frame 602 always appears inside, or coinciding with, the maximum extents frame 604 in both the horizontal and vertical dimensions.

A third frame 606 represents the actual extents of the content inside the container. The content frame 606 always appears inside, or coinciding with, the maximum extents frame, and always appears outside, or coinciding with, the minimum extents frame. The preferred size of the content frame is determined by factors such as the size and shape of the content inside the container and any other constraints that may apply to the container.

In order for the user to easily distinguish the three frames from one another, each frame and its control points may optionally be represented by different line weights, styles or colors.

In order to reduce visual clutter when viewing a document template comprising one or more containers, the minimum and maximum extents frames and their associated control points 602, 603, 604, 605 and the content frame 606 may optionally be hidden unless the particular container to which they relate is made 'active', for example by placing the pointer within the area occupied by the container or by clicking over the container with a mouse.

Both the minimum extents frame 602 and the maximum extents frame 604 can be resized by direct manipulation of their respective control points 603, 605 using the pointing device 133. By resizing the minimum extents frame 602 the user can determine the minimum possible size of the content frame 606 regardless of what content may appear inside the container. By resizing the maximum extents frame 604 the user can determine the maximum possible size of the content frame 606 regardless of what content may appear inside the container.

When resizing the minimum extents frame 602, should the position of any vertex or edge of the frame be dragged outside of the maximum extents frame 604, either the vertex or edge will be automatically moved so that it is equal with the corresponding vertex or edge of the maximum extents frame after the control point is released, or the vertex or edge will cease to move any further after it has reached the corresponding vertex or edge of the maximum extents frame 604, or the corresponding vertex or edge of the maximum extents frame 604 will be automatically expanded so as to be coinciding with or outside the vertex or edge being dragged.

When resizing the maximum extents frame 604, should the position of any vertex or edge of the frame be dragged inside of the minimum extents frame 602, either the vertex or edge will be automatically moved so that it is equal with the corresponding vertex or edge of the minimum extents frame after the control point is released, or the vertex or edge will cease to move any further after it has reached the corresponding vertex or edge of the minimum extents frame 602, or the corresponding vertex or edge of the minimum extents frame 602 will be automatically contracted to as to be coinciding with or inside the vertex or edge being dragged.

The position of the content frame 606 within the maximum extents frame 604 is determined according to the relative position of the minimum extents frame 602 within the maximum extents frame 604.

The minimum extents frame 602 can be moved to any position within the maximum extents frame 604 by dragging it with the pointing device 133.

Optionally, the minimum extents frame 602 may be programmed to 'snap' to the closest of a selection of preferred positions within the maximum extents frame 604 including left, right and centered in the horizontal dimension and top, bottom and centered in the vertical dimension whilst it is being dragged with the pointing device 133.

The horizontal dimensions a, b, c and d in FIG. 6A indicate the distances between the respective vertical edges of the maximum extents frame 604, the content frame 606 and the minimum extents frame 602.

Given any size of the content frame 606 as determined by the content inside the frame at any particular time, the dimensions a, b, c and d will always conform to the following equation:

$$a:b=d:c$$

A corresponding equation applies to the corresponding vertical dimensions, which are not labeled in the figures.

Thus, the position of the content frame 606 within the maximum extents frame 604 is determined according to the resolved horizontal dimensions a, b, c and d and the corresponding vertical dimensions.

FIG. 6B illustrates one particular case whereby the minimum extents frame 602 is located at the top and to the left of the maximum extents frame 604 and therefore the content frame 606 is also located at the top and to the left of the maximum extents.

FIG. 6C illustrates another particular case whereby the minimum extents frame 602 is located centrally within the maximum extents frame 604 in both the horizontal and the vertical dimensions, and therefore the content frame 606 is also located centrally within maximum extents in both the horizontal and the vertical dimensions.

Figure 6D:
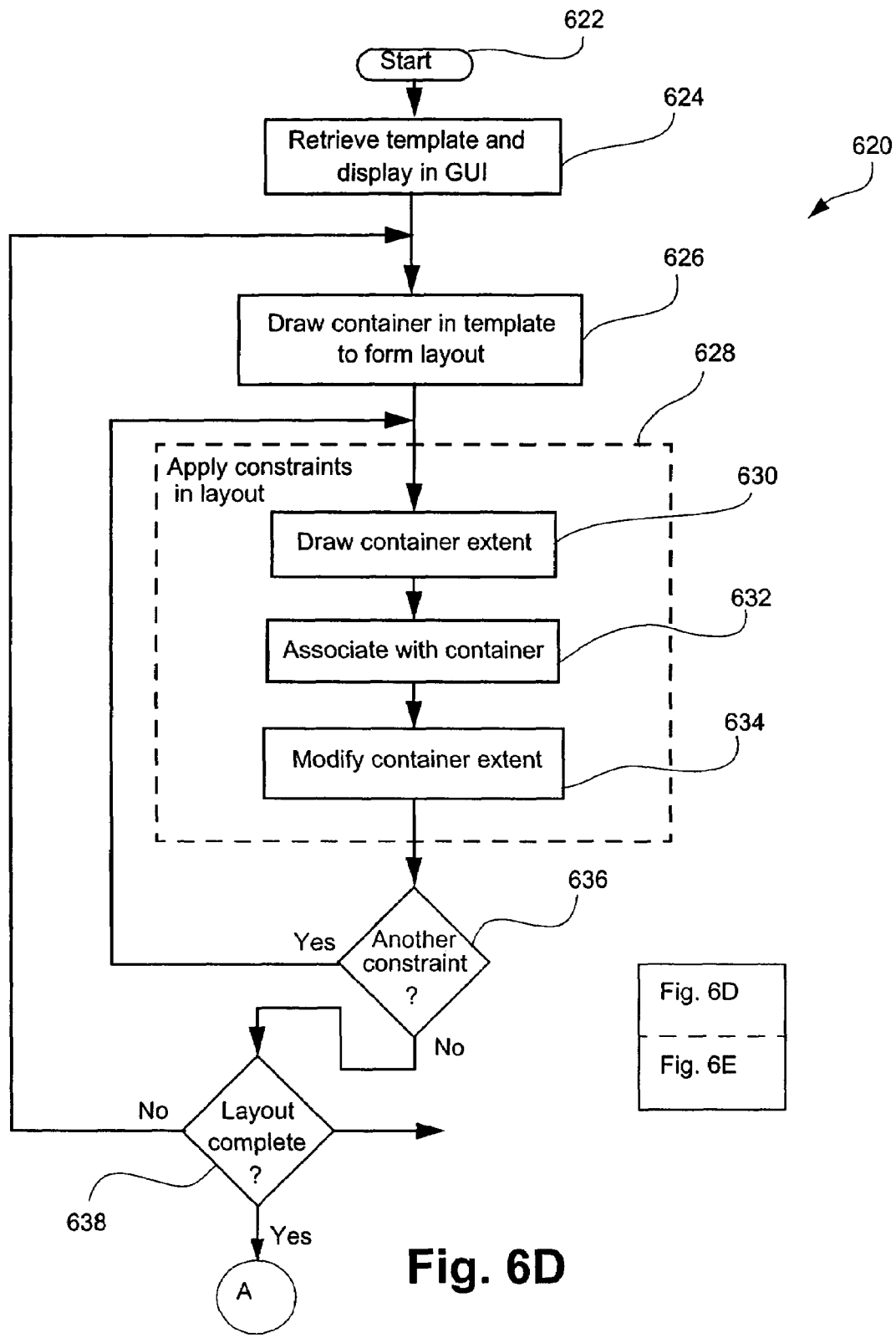
FIGS. 6D and 6E are a flowchart depicting the creation of container extents.
Figure 6E:
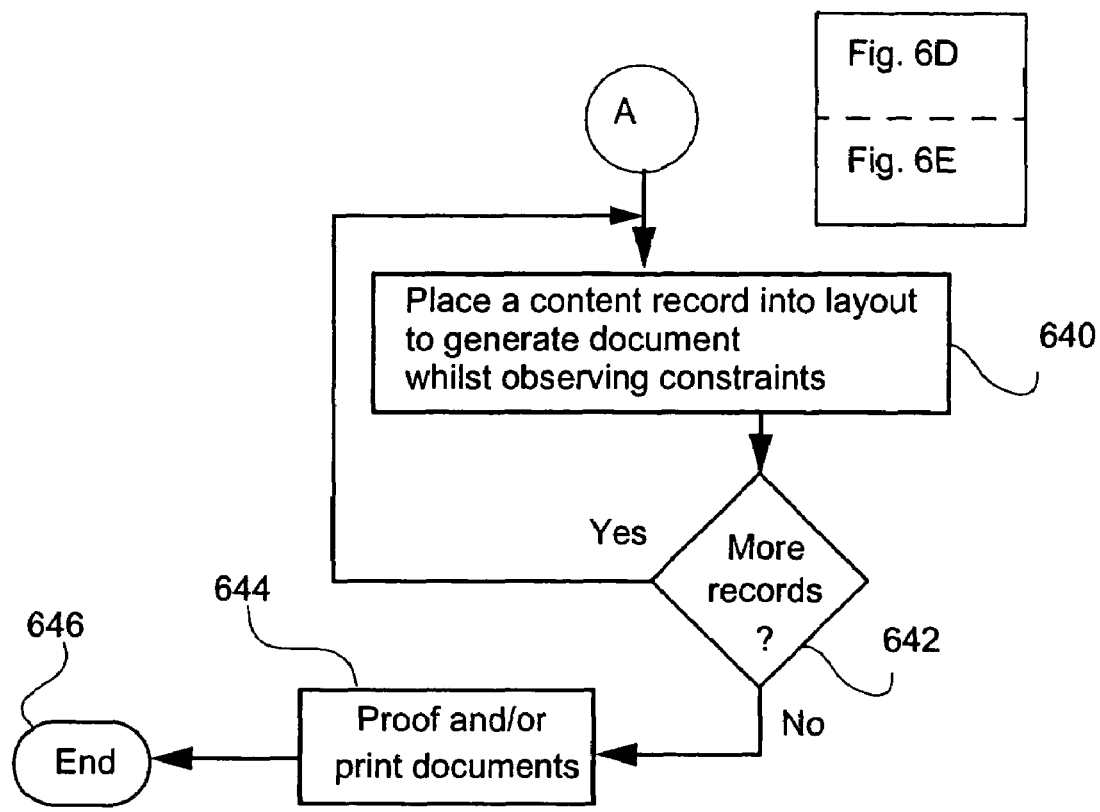

FIGS. 6D and 6E show a method 620 of generating variable data documents in which container extents are used. The method 620 is implemented within the application 121 and has a start point 622 after which in step 624 a document template is retrieved and displayed within the GUI 301 on the display 144. Step 626 detects the drawing of a container by the user, typically via movement of the mouse 133 and the corresponding pointer 313.

The container when drawn has, by default, two constraints being minimum container extents and maximum container extents such as those shown in FIGS. 6A-6C. In the initial state of the container, the minimum container extents coincide with the maximum container extents. In step 634, the control points of either extent may be manipulated to thereby modify the container extent.

The container is represented in the template to form a layout after which various constraints may be applied in step 628. Step 628 may include to incorporation of numerous types of constraints as described herein amongst containers in the layout. In the presently discussed implementation, the constraint being applied is that of a container extent such as those shown in FIGS. 6A-6C. In step 630, a container extent is drawn, again using the mouse 133 and pointer 313 and, in step 632, associated with a container in the layout. In step 634, the control points of the extent may be selected and manipulate to thereby modify the container extent. Such modification may include setting one or more edges of the extent to coincide with edges of the container (FIG. 6B), and moving or positioning the extents frame relative to the associated container.

Step 636 follows where the user may apply further constraints, by returning to step 628. The further constraint may include a further extents frame, thereby affording the opportunity to construct both minimum and maximum extents frames. Other constraints may also be applied. For example, a strut may be applied between a maximum extents frame a further container not associated with the maximum extents frame. Such may allow the extents frame to dynamically move according to changes of the further container, whilst continuing to constrain the size of the container associated with the maximum extents frame.

After step 636, through operation of step 638, the user may add further containers to the layout until such time as the layout is complete. Once the layout is complete, step 640 places a record of content into the layout to generate a document. Step 642 enables this process to be repeated for all records of content thereby creating a set of variable data documents. Once all records have been consumed and documents generated, such may be proofed (see Sections 11.10-11.13) and/or printed as required in step 644. The method 620 ends at step 646.

7. Image Containers

An image container is a particular type of container the purpose of which is to contain an image such as a photo, illustration, logo or diagram.

Desirably, image containers can have one of a selection of behaviors to control scaling of the image to be contained thereby, those including:

'Fit entire image', whereby the image is scaled up or down so that the entire image fits within the container and the aspect ratio of the image is maintained 'Fit image to size of box', whereby the image is scaled up or down so that the entire container is filled by the image and the aspect ratio of the image is maintained, with any remaining portions of the image cropped from view 'Stretch to fit', whereby the image is scaled up or down to exactly fit the size of the container in both the horizontal and vertical dimensions, ignoring original aspect ratio of the image 'Do not scale', whereby no scaling is applied to the image and any portions of the image that fall outside of the container are cropped from view.

Additionally, image containers can be set so that any image that is inside the container and smaller than the container is aligned to a particular direction, being any combination of left, center or right in the horizontal dimension and top, center or bottom in the vertical dimension.

8. Text Containers

A text container is a particular type of container the purpose of which is to contain a range of text which may be formatted with various font and paragraph styles and may be aligned or justified to various edges of the text container.

Text containers contain either static text, variable text, or a combination of both. Other objects such as images can also be inserted into text containers and will flow in the same way text flows.

Static text is entered by typing directly into the container. Variable text is added by dragging a variable data object from the library into the container as described in more detail in Section 11. More than one variable text object can be displayed in a single text container.

Formatting of static text can be applied to individual letters, words or entire paragraphs, however formatting options can only be applied to the entire instance of a variable text item.

8.1 Text Formatting

Text formatting includes the following options:

Font
Font Size
Bold

Italic
Underline
Color
Line Spacing
Force Capitalization
Automatic Hyphenation

8.2 Alignment

The following text alignment options are allowed in some specific implementations:

Horizontal Alignment: Left (default), Horizontally Centered, Right or Justify.

Vertical Alignment: Top (default), Vertically Centered, Bottom.

Other options may be appropriate in different implementations, such as vertically justified text.

8.3 Columns

Text in a text container may be arranged either in a single column, or in two or more vertical columns, with a space known as a 'gutter' separating the left and right edges of each column from each adjacent column.

While it is common in the prior art for column widths to be adjustable by dragging a dividing line between adjacent columns, gutters have previously been set by altering a value in a property sheet or dialog box or by a similar non-direct method.

Figure 7A:
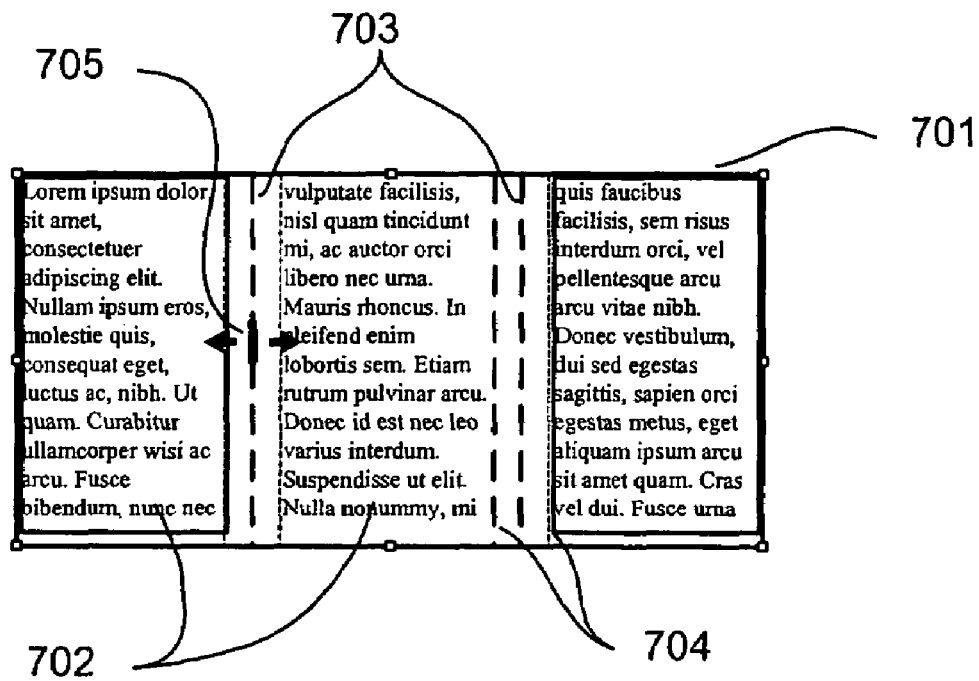
FIGS. 7A-7B illustrate a text container with three columns and a method by which both the column and gutter widths can be resized by direct manipulation using a pointing device.
Figure 7B:
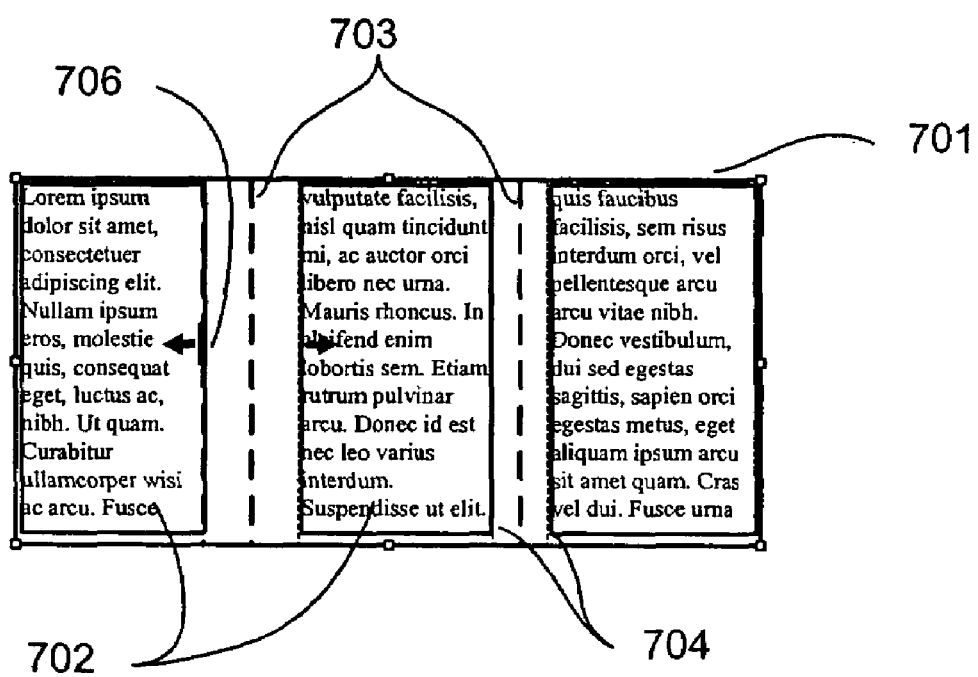

FIGS. 7A-7B illustrate a text container 701 with three columns and a method by which both the column and gutter widths can be resized by direct manipulation using a pointing device such as the mouse 133 and the pointer 313.

Referring to FIG. 7A, the text container 701 is divided into three columns 702 of text. As illustrated, lines 703 represent the central dividing lines between adjacent columns, and lines 704 represent the gutter boundaries between adjacent columns 702.

By dragging the central dividing line 703 with a mouse 133 and pointing device 133, the width of the adjacent columns can be adjusted. A special pointer 705 is displayed during the drag function in place of the default pointer, to indicate that the column drag function is active.

As illustrated in FIG. 7B, by dragging a gutter boundary line 704 with a pointing device, the width of the gutter can be adjusted. A special pointer 706 is displayed during the drag function in place of the default pointer, to indicate that the gutter drag function is active.

Both gutter boundary lines within the same inter-column space are adjusted simultaneously so that equal spacing is always maintained between each of the gutter boundary lines and the central dividing line.

As also seen in FIG. 7B, where there are more than two columns, each gutter is able to be manipulated independently.

8.4 Variable Font Size

The font size of the text inside a text container may be varied to allow various volumes of text to fit inside the container by shrinking or growing to fit, and to allow the size of the container to vary according to external constraints, whilst still allowing the text to fit wholly inside the container. A minimum and a maximum font size may be set for each text container, constraining the possible range of font sizes. A binary search algorithm may be used to determine the optimal font size to use in order to fit all text within the container. If the font size reaches the minimum size, and the text still does not fit within the container, an error can be shown to the user.

8.5 Font Size Synchronization Between Containers

A constraint may be created between two or more text containers specifying that the font size must be equal in all containers regardless of whether the font size of any of the containers is altered to allow certain text content to fit properly within it.

Preferably, if the text containers selected for this synchronization have different font sizes prior to the addition of the constraint, the font sizes are first averaged and applied to each selected container. An alternate implementation may use the font size of the first selected container and apply that font size to all other containers. A further alternative is to apply an external font size setting to each container.

Figure 8:
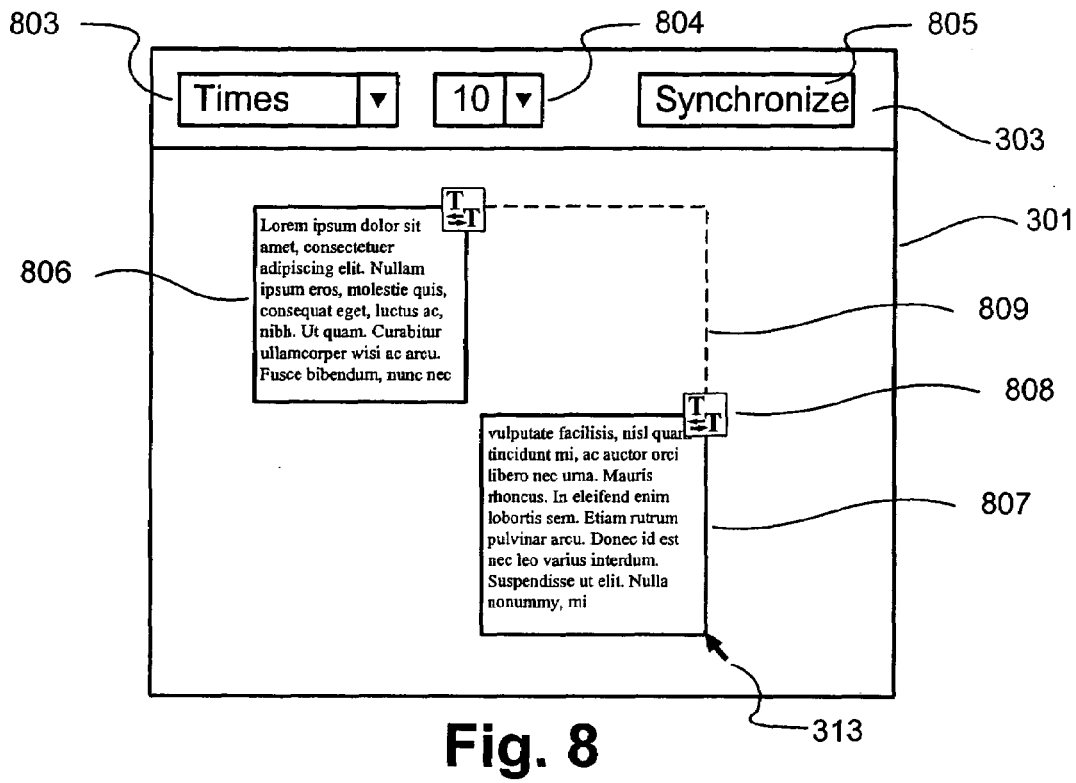
FIG. 8 illustrates a screen, tools and icons to show the operation of character size synchronization.

Referring to FIG. 8, the application window 301 has a toolbar area 303 as described previously. The toolbar area 303 contains at least a font selector 803, a font size selector 804 and a button 805 for adding the font size synchronization constraint. The font selector 803 and the font size selector 804 may be used to change the properties of the text in a text container. Clicking on the font size synchronization button 805 when several text containers are selected will synchronize the font sizes of all selected containers.

A plurality of text containers 806, 807 have been previously placed in the document template 309. The containers may be selected by operating the mouse 133 by clicking on the containers with the pointer 313, by dragging a selection rectangle around them or by another method. A visual means may be used to indicate that the text containers are currently selected, such as by showing control points on the containers.

The constraint is added by selecting two or more text containers 806, 807 and by activating the synchronize button 805. In other implementations, the font size synchronization constraint may be applied by pull a down menu, keyboard command or other means.

The constraint may optionally be indicated in the user interface by way of an icon 808 or other graphical representation on or near the respective text containers 806, 807. Additionally a joining line 809 may optionally be drawn between the respective icons of the text containers linked by constraints to indicate which text containers are linked to each other.

In other implementations, a separate area of the video display screen 144 may be provided for displaying various properties of selected objects, and this area may be used to indicate that a selected text container has a font size synchronization constraint applied to it, and to identify which other containers are linked by the constraint.

A font size constraint may be deleted by selecting one or more of the text containers linked by the constraint and repeating the command or sequence used to apply the constraint initially. This may be achieved by activating a synchronize button 805, by selecting one or more of the text containers linked by the constraint and applying an additional command or sequence specifically provided for the purpose, or by clicking on a representative icon 808 or joining line 809 and applying a command or sequence such as actuation of a 'delete' key on the keyboard 132 or from within a menu command shown on the display 144.

If the user applies the font size constraint to two or more text containers that already contain text with different font sizes, either the largest, the smallest or the average font size will be applied to all of the text containers. Alternatively the user can be prompted to choose the font size with a pop up dialog box or similar.

If the user manually changes the font size for any of the containers already linked by a font size constraint, for example by selecting a new font size from the font size selector 804, the new font size is applied to all of the containers linked by the constraint.

8.6 Automatic Application of Internal Margins

The internal margin of a text container may automatically be set based on whether the text container has a visible border and/or a visible background.

Figure 9:
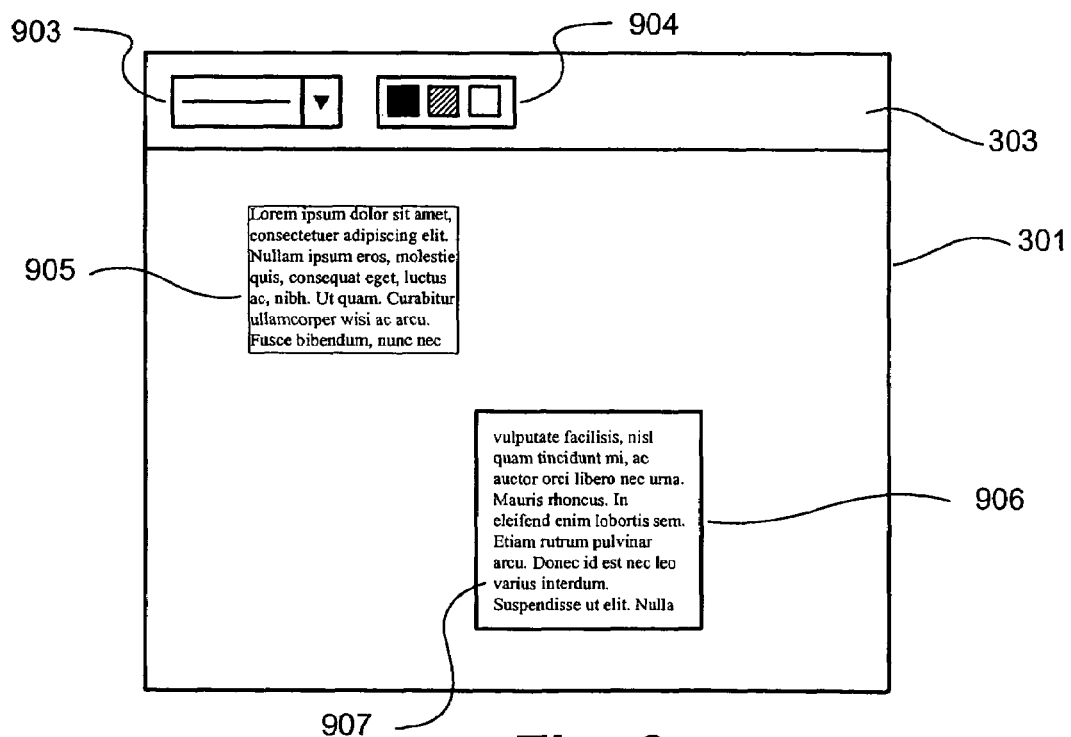
FIG. 9 illustrates a screen, tools and icons to show the operation of the automatic application of internal margins.

Referring to FIG. 9, the application window 301 has a toolbar area 303 as described previously. The toolbar area 303 contains at least a border selector 903 and a background color selector 904.

A text container 905 has no visible border or background color, and there is also no margin between the edges of the container and the text inside the container.

A text container 906 has a visible border, and has a margin 907 between the edges of the container and the text inside the container on all four sides.

In events preceding the state of the system as illustrated in FIG. 9, text container 906, in a state similar to text container 905 with no visible border or background and no internal margin, is selected by clicking on the container 906 with the pointer 133, by dragging a selection rectangle around it or by another method. A visual means may be used to indicate that the text container is currently selected, such as by showing control points on the container.

A visible border is then applied using a border selector 903, or alternatively a background color is applied using a background color selector 904.

At the time the visible border or background is applied to the text container, if there is no internal margin set, a predetermined internal margin 907 is automatically applied to the text container on all four sides. An internal margin may be automatically added whenever there is a visual distinction between the background color of a text container and the predominant surrounding background color of the template.

Another situation in which an internal margin might be automatically set for a container is if the container's background color differs from the page color. In this case, an internal margin might be added to provide a visual separation between content and the page background, rather than allow content to flow up to the edge of the container. If the container's background color is fully transparent, then by definition its contents will be drawn on the same background as the page and so no internal margin need be added.

8.7 Text Flow Between Containers

Two or more text containers may be linked together in a sequence in order to allow text to flow from one container to the next, should the volume of text exceed the size of the preceding container.

When the text does not fit in the combined area of all such linked containers, it is necessary to find a font size for each container that allows the text to fit, while trying to maintain the relationship between the font sizes of the different containers.

One desirable method to achieve this for a set of linked containers is to use a binary search algorithm to scale the font sizes for each container until the text just fits, or all linked containers would reach a font size smaller than their respective minimum font size (at which point there is an error or other indication to the user that the operation could not complete). Note that if one container reaches its minimum font size before the other, this does not necessarily cause the algorithm to terminate. In such circumstances the algorithm attempts to maintain the font size relationships between containers, but does not guarantee to do so.

An alternate method to achieve this is to use a similar method to the above, but terminate with an error or other notification if any of the linked containers reach a font size smaller than its minimum font size. This alternate method preserves the relative font sizes between linked containers, but may produce errors and fail to produce a solution in more cases than with the binary search algorithm. The alternate method would be used to implement text flow where font size synchronization between all the linked containers is also desired.

Another method to achieve text flow with font shrinking is to simply reduce the font size of the first container in the linked set until either the text fits within the set of containers, or that first container reaches its minimum font size. If the latter, continue by shrinking the second container, and so on, until either the text fits or all containers are at their minimum font size. If the text still does not completely fit, indicate this somehow, possibly with an error notification. In this method, the ordering of the containers is significant and is defined as the order in which the text flows, so if the text begins in container A and continues in container B, then A is the first container and B is the second container.

9. Guides

A guide is a vertical or horizontal line spanning the width or height of a page to aid the positioning of containers and other guides. There are two kinds of guide, fixed and unfixed (or floating). Guides may be connected to other guides or containers via struts (distance constraints, described later). Guides do not appear in documents, only in the document template 309 as an aid to design. Guides may be created by dragging a pointing device from a ruler area into a work area.

9.1 Fixed Guides

A fixed guide is fixed to the page, or to some part of the page, such as the printable area. A fixed guide is fixed in the sense that it has the same position for all documents. Such a guide may be fixed relative to a particular edge of the page or printable part of the page, for example relative to the left edge. In this example, if the page was resized (for example to print on a different paper size) the guide would remain the same distance from that left edge, but not necessarily the same distance from any other edge.

9.2 Unfixed Guides

An unfixed or floating guide may have a different position in different documents, or when the data within a document changes, for example when a document template is merged with a record from a data source. In this example, when data is merged with a document template, one or more containers may hold data from the data source which could cause the position of an unfixed guide to be determined through the action of struts. Until such data is merged with the document template, the position of an unfixed guide might be unknown, or it might be given an initial (possibly arbitrary) position for the purposes of editing and design. In certain implementations, a floating guide always has a position that can be edited by the user or changed by the layout engine 105 when data from a data source is merged with the document template.

9.3 Guide Implementations

In specific implementations, both fixed and unfixed guides are represented by a solid line which may extend up to the rulers at the edge of a work space, page boundary or page printable area. Color is used to distinguish fixed and unfixed guides. Alternatively, a fixed guide may be represented by a solid line while an unfixed guide could be represented by a dashed or dotted line.

Figure 12:
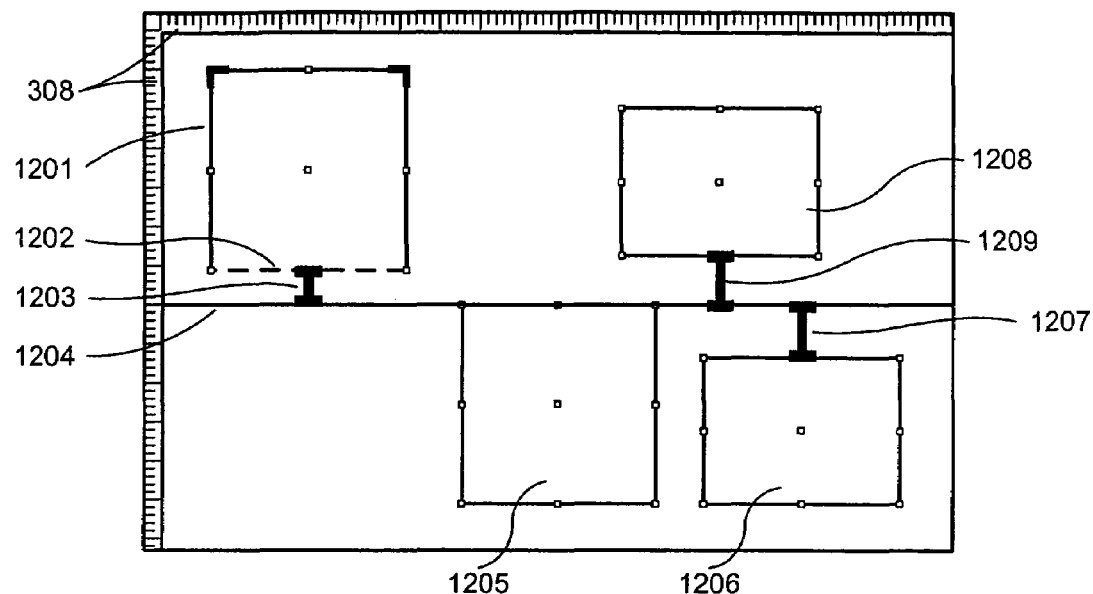
FIG. 12 illustrates a screen to show the operation of the unfixed guides.

Referring to FIG. 12, an unfixed guide 1204 has been previously created in the GUI 301 by dragging with the pointer 133 from the horizontal section of the ruler 308. A first container 1201 has an unfixed edge 1202. A strut 1203 has been created from the edge 1202 to the unfixed guide 1204. A second container 1205 is attached directly to the guide 1204, by virtue of the top edge of the container 1205 being aligned directly on the guide 1204. A third container 1206 is connected to the guide 1204 by a strut 1207. A fourth container 1208 is also connected to the guide 1204 by a strut 1209.

As the unfixed edge 1202 moves as a result of a change in the height of container 1201, the guide 1204 will change its vertical position to maintain the strut constraint 1203. Containers 1205, 1206 and 1208 will consequently move in order to maintain their constraints in relation to the guide 1204. Similarly, if as the result of merging data with the document template, container sizes are determined or changed, the action of struts may cause unfixed guides to attain positions based on contents within those containers.

The method for adding a strut constraint between a container and a guide is similar to the method for adding a strut between containers, described in other sections of the description.

One preferred method for adding a constraint whereby an edge of a container is attached directly to a guide, for example container 1205 in FIG. 12, is either by the container or container edge being dragged to a position within a pre-defined distance of a guide, at which point it will visually 'snap' onto the guide; or similarly by a guide being dragged within a pre-defined distance of a container edge, at which point it will snap to the container edge. If the container, edge or guide is released from the drag operation while in the snapped state, the constraint will be created.

10. Struts

Struts are a type of constraint used to maintain a fixed distance between particular edges of containers, and other objects such as guides and margins.

Preferably, each strut applies to exactly two parallel edges belonging to two different containers within the same document template, or to one edge of a container and a parallel guide, or between two parallel guides. Other implementations may restrict what struts may connect, or allow struts to connect edges of a single container as a way of specifying its width or height constraints, or allow struts to connect edges or guides with parallel page margins or edges.

Struts are symmetric, in the sense that neither of the edges attached by a strut has priority over the other edge in terms of placement.

The length of a strut may be represented either visually or numerically or by a combination of both. In certain implementations, all struts display their current length visually by the length of the graphical representation (the strut icon), while other properties are visible as numbers or visual settings within a dialog box.

Returning to FIG. 4, edge 410 of a first container 407 is connected to edge 411 of a second container 408 by a strut constraint. The strut constraint is indicated by strut icon 412 which may optionally be hidden in various modes of the application, for example in a preview mode.

Strut icons are usually hidden in the normal mode of operation, and are revealed when the pointer 313 associated with the mouse 133 is in the vicinity of the strut or the containers or edges or guides connected to the strut. The vicinity can include any other strut, container, edge or guide which is connected to the strut either directly or indirectly via any number of struts.

Since a strut only has length in one dimension, the strut position in that dimension can be derived from the current positions of the edges to which the strut is connected. Hence, the strut 412 is drawn between edges 410 and 411. A strut's position in the perpendicular dimension can be calculated in various ways. One approach averages the mid-points of the connected edges and locates the mid-point of the strut at the average. Hence, the mid-point of strut 412 is exactly half-way between the mid-points of edges 410 and 411.

The contents of a container may vary between documents and hence any unfixed edges of the container may be in various positions relative to the page for different documents. The action of a strut constraint is to maintain distances between edges or guides, thus edges or guides connected by struts may have a restricted range of possible positions within documents.

Referring to FIG. 4, should a first edge 410 of the container 407 move, for example if the user manipulates an edge via the user interface using the pointing device 313, the second connected edge 411 may be 'pushed' or 'pulled' in order to maintain the strut constraint (412) between the two edges. Although the user may perceive the operation of struts as pushing or pulling connected edges or guides, the actual operation in the user interface is the same as that used in producing documents.

In another implementation, while the strut tool is activated, the method described above by which struts are revealed may be modified, such that all struts are revealed whenever the strut tool is activated. Alternatively, the struts are only revealed when the pointer is directly over the strut, with no other struts being revealed at that time.

Although, as illustrated in FIG. 4, the edges 410 and 411 connected by strut 412 are adjacent and opposite to each other, struts can be applied to any two parallel edges of separate containers regardless of whether the edges are adjacent to or opposite each other or neither.

Figure 11:
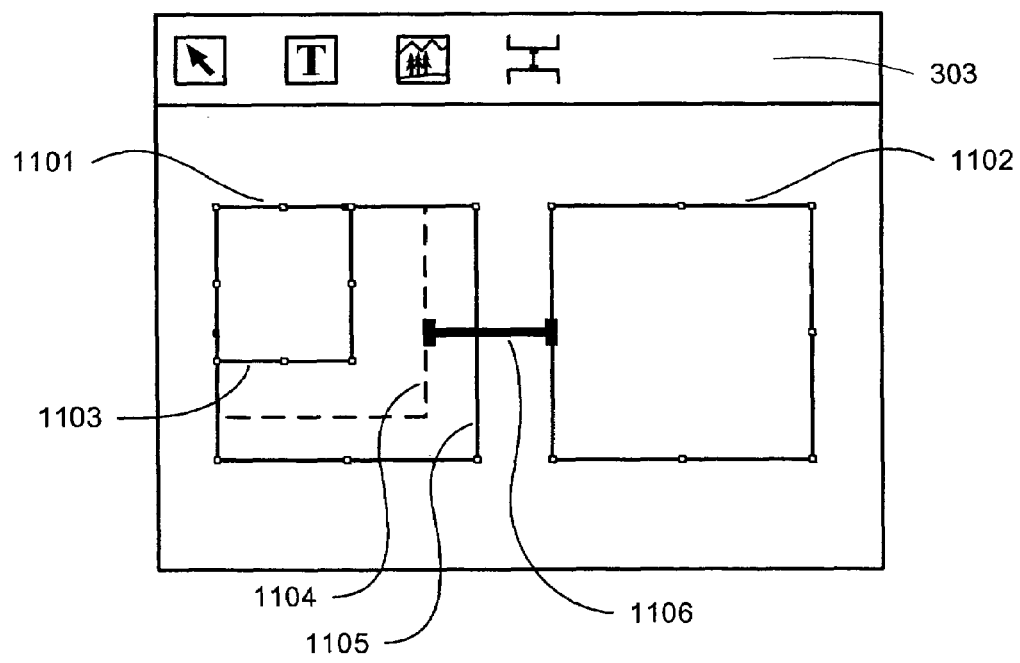
FIG. 11 illustrates a screen, tools and icons to show the operation of several features of the user interface including struts between the second exemplary containers.

FIG. 11 illustrates a strut between containers, illustrated using the third set of exemplary rules for a container described earlier with reference to FIGS. 6A-6C. A first container 1101 has a minimum extents frame 1103, a maximum extents frame 1105 and a content frame 1104. A strut 1106 is connected to the respective edge of the content frame 1104. A second container 1102 is shown whereby the minimum and maximum extents are equal. Therefore the container 1102 has a fixed size in this configuration. The strut 1106 acts on the entire container 1102 which, as a result, may be pushed or pulled in a horizontal direction.

Accordingly, struts may be created between any edge of the content frame of a first container and a parallel edge of either the maximum extents frame or the content frame of a second container, or a parallel guide, margin or other object.

10.2 Creating Struts Between Containers

Figure 10:
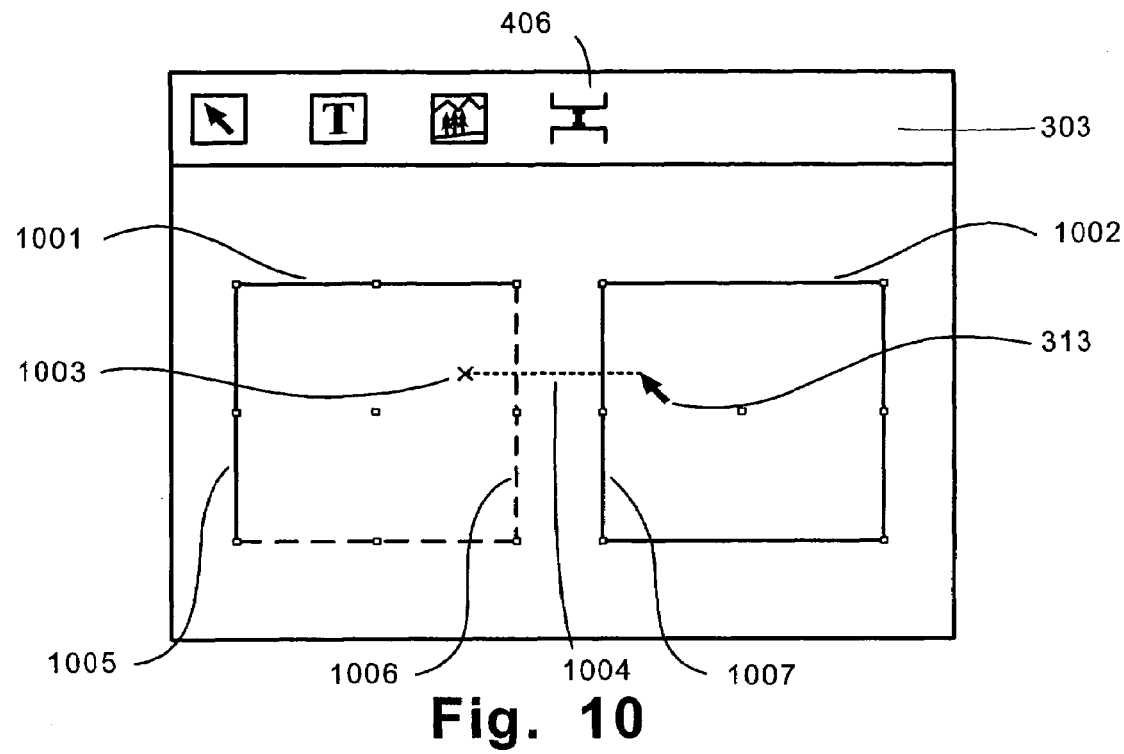
FIG. 10 illustrates the method by which a strut may be added between the edges of two containers in order to describe a distance constraint.

Referring to FIG. 10, a new strut can be created first by activating a strut tool by clicking on a strut tool button 406 in the toolbar area 303 using the mouse 133 and pointer 313. Then, one of two operations may be performed to link two containers. Firstly a path 1004 can be dragged by depressing and holding the mouse 133 at any point 1003 inside the first container 1001 and dragging the pointer 313 to end at any point inside the second container 1002, at which point the press of the mouse 133 is released. This is illustrated by the position of the pointer 313 in the FIG. 10. Alternatively, a strut between the containers 1001 and 1002 may be formed by clicking (ie. depress and release) the mouse 133 first at any point 1003 inside the first container 1001 and then a second clicking at any point inside the second container 1002, as illustrated by the position of the pointer 313 in FIG. 10.

In a specific implementation, the strut creation process described, as well as selecting the two containers to be connected, also selects the connected edges of the containers on the basis of the closest proximity of the starting and ending points of the path 1004 to the various edges of the respective containers. For example, the starting point 1003 is closer to right hand edge 1006 than it is to left hand edge 1005 of first container 1001, therefore right hand edge 1006 will be connected. Similarly, the left hand edge 1007 of second container 1002 will be connected.

In an alternate implementation, edges selected may be the closest pair of parallel adjacent edges from both containers, for example edges 1006 and 1007 respectively of containers 1001 and 1002 as shown in FIG. 10.

In yet another implementation, edges selected may be the edge that is first crossed by the path of the pointer as it moves from the inside to the outside of the first container, and the edge that is first crossed by the path of the pointer as it moves from the outside to the inside of the second container.

In order to aid the user in selecting an appropriate second edge, after the first point 1003 of the strut has been defined, potential second edges may be graphically indicated as the pointer moves into proximity, such as by varying the line style of the edge or by displaying an icon in the vicinity of the edge. Only edges that will potentially create a valid strut will be indicated, including parallel edges on containers other than the container defined by the first point.

Additionally, if struts are non-symmetric, for example if a strut were to treat each of its connected edges differently for some reason, the strut creation process described can indicate this graphically. For example, since starting point 1003 is inside first container 1001, and the ending point is inside second container 1002, edge 1006 of the first container may be treated differently from edge 1007 by the operation of the strut, and the strut may graphically indicate that fact.

10.3 Creating Struts Between Guides

The creation of struts between guides is similar to that of creating struts between edges of containers described above. Since guides do not have width and height in the way that containers do, there are fewer possible user interfaces. Another approach allows a strut tool 406 to be selected and then the first guide is selected and the pointing device is dragged to attach the strut so created to a second guide.

Another implementation allows two guides to be selected and then a strut creation button (icon) is selected which creates a non-directional strut between the guides. A directional strut may be created by another implementation by considering the order in which the guides were selected as a way to distinguish which is the driving edge and which is the driven edge.

10.4 Creating Struts Between Guides and Containers

In one implementation, dragging a guide onto an edge of a container creates a distance constraint, typically specifying a zero-distance between the guide and the edge. This distance constraint may be represented by a strut, hence, such a method of dragging a guide (either during construction of the guide or container or while editing) might actually create a strut.

Desirably struts can be created between guides and container edges in a similar fashion to how struts may be created between container edges (select tool, click edge or guide, drag, release).

10.5 Creating Struts to Margins

It may also be desirable for distance constraints to exist between a page margin and guides or container edges. Struts can be used for this purpose. In some implementations this is not necessary, since guides and container edges may be fixed in position relative to an edge of the page, which has the same effect as a strut. A strut between a page margin and a guide or container edge is also unnecessary since a guide may be created which is fixed relative to the desired page margin, and other guides and container edges may then be linked via struts to it. Hence, there is no need for struts to be able to link page margins to guides or container edges.

In another implementation, guides and container edges might not have the ability to be fixed relative to a page margin. In this situation, it may be desirable to use struts to represent distance constraints to page margins.

10.6 Interactions Between Struts and Containers

Struts interact with containers in many ways. The simplest operation of a strut is to restrict where edges of containers and guides may be positioned, as a way of determining where content will be placed in documents. However, the connection of a strut to a container may also modify the state of the container, in particular its edge state, in keep the container within the set of allowed states.

Rules governing the attachment of struts to containers in a specific implementation are:

1. If a strut is connected between two fixed edges, the selected edges become unfixed.
2. If a strut is connected between two fixed edges, the second selected edge becomes unfixed and if the length of the container in a dimension corresponding to the orientation of the strut is fixed, then both edges perpendicular to the strut are unfixed, while the length of the container in said dimension remains fixed. For example, if the second selected edge is a vertical edge of a fixed width container, then both vertical edges of the container will be unfixed so that the container becomes movable horizontally while its width remains fixed.
3. If both container edges and/or guides attached to a strut become fixed, remove that strut.
4. If a fixed container edge or guide is moved by the user, the length settings of any strut attached to it may be modified such that the other edge or guide connected to the strut remains unchanged.

11. Variable Data

The user interface 103 allows the user to associate a data source with a variable document template and design the template to produce valid documents upon merging of the data source with the template. Merging is performed interactively, in the background, or on demand by the layout engine 105 component of the software application 121.

Preferably the data source is associated with the variable document template interactively and the layout engine 105 merges and lays out pages of the document on demand as the user interactively navigates the merged document. Another implementation may merge data with a template and print the merged document without requiring an interactive user interface during the merging process. Another implementation may merge data with a template, producing a merged document, in the background and alert the user to problems in the merging process by messages which appear asynchronously with respect to the user's navigation of a merged document.

11.1 Data Source Selection

To merge a variable document template with a data source it is necessary for an appropriate data source to be associated with the template. One method for achieving such an association is through the use of a data source selection window, as illustrated in FIG. 13, and which forms part of the user interface 103.

Figure 13:
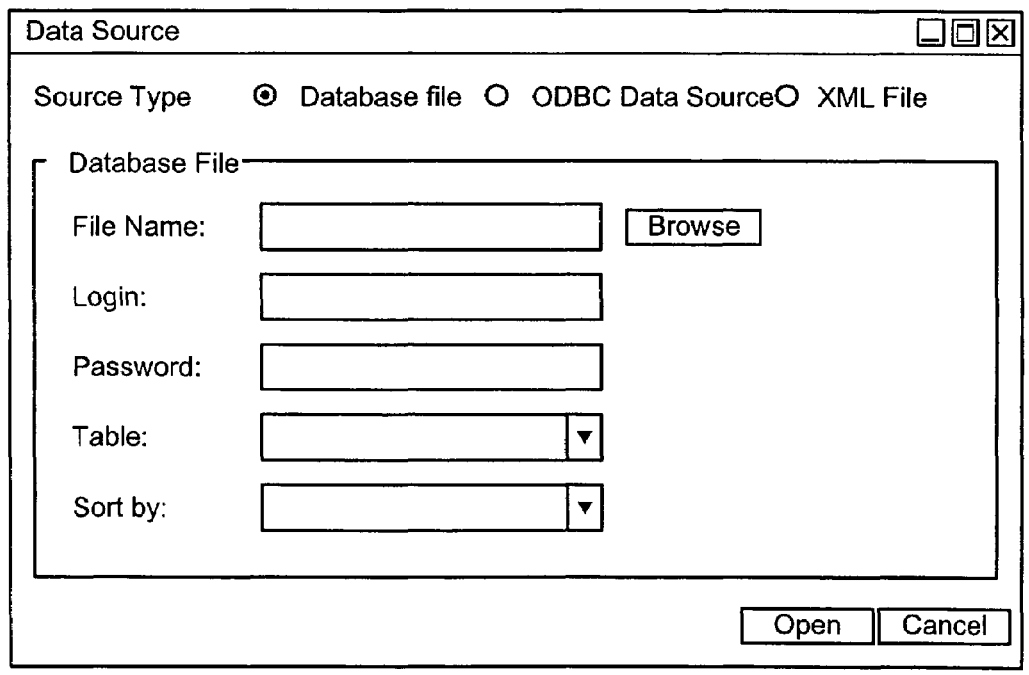
FIGS. 13 and 14 illustrate a data source selection method.
Figure 14:
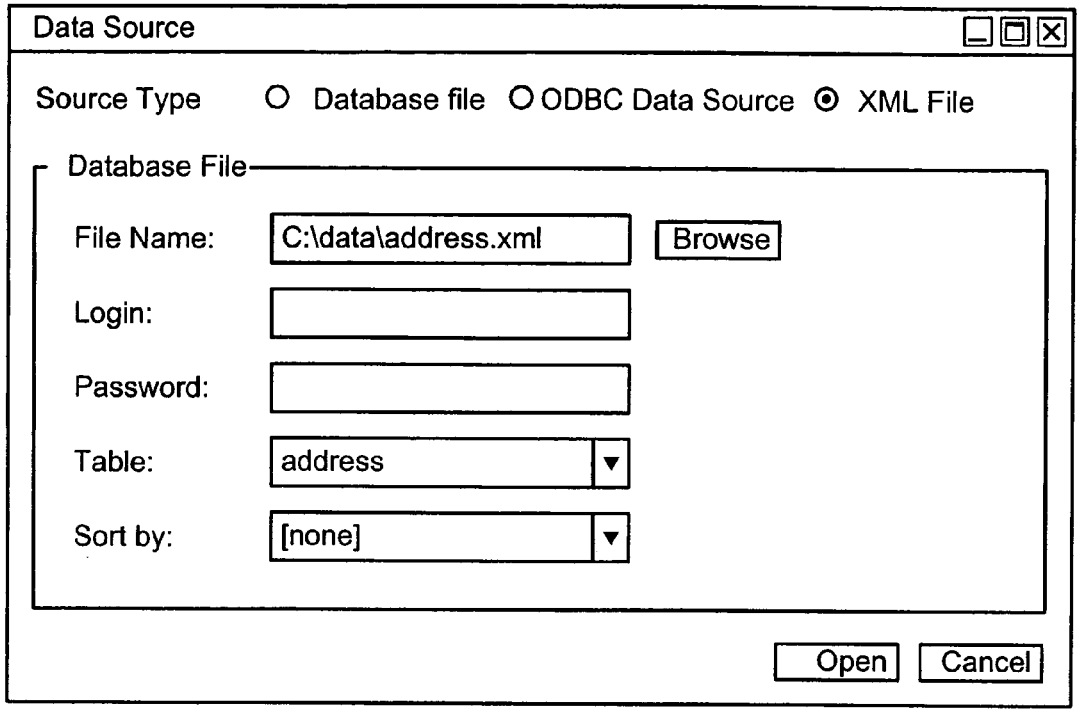

FIG. 13 shows a GUI window as presented on the display 144 by the UI application 103, which allows the user to interactively select a data source, which might be a database, a file, a join of a plurality of databases, or some other source of information. Once a source has been selected, as illustrated in FIG. 14, the source is associated with the template until explicitly or implicitly disassociated.

11.2 Data Filtering

It is possible that not all of the data within a data source may be valid for a particular merging operation. When such does occur, there are numerous possible ways for the user to restrict the range of data that is to be used. One implementation is to allow algorithmic data filtering, to restrict the kinds and amounts of data that are to be used. For example, a range of postal zip codes might be selected so that only certain records associated with a desired geographic region are used to generate documents. Such algorithmic filtering is well known in the art. Another implementation might be for the user to select and mark data, which are to be used, via a user interface, after the data source has been associated with the template.

Figure 17:
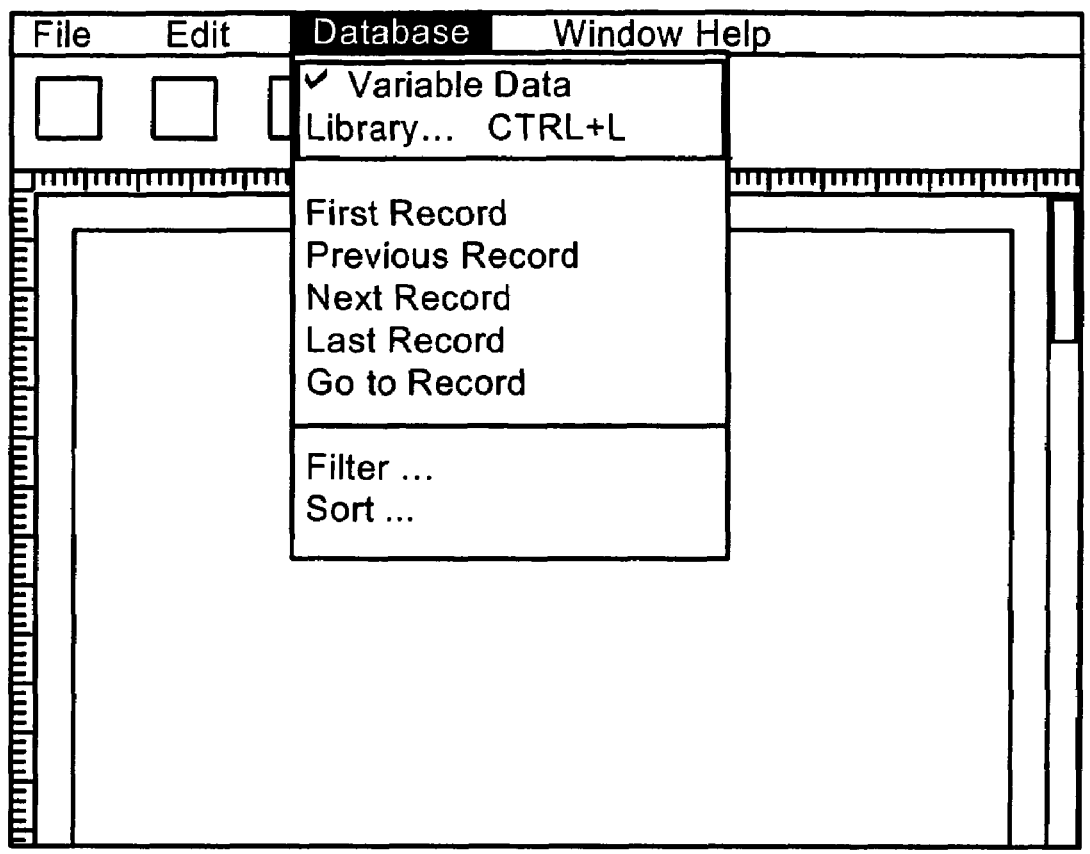

FIG. 17 shows the preferred approach of how the user can access a data filtering operation via the GUI 301 of user interface 103 which occurs after a data source has been associated with a variable document template, via selection of a menu item.

11.3 Data Sorting

Figure 15:
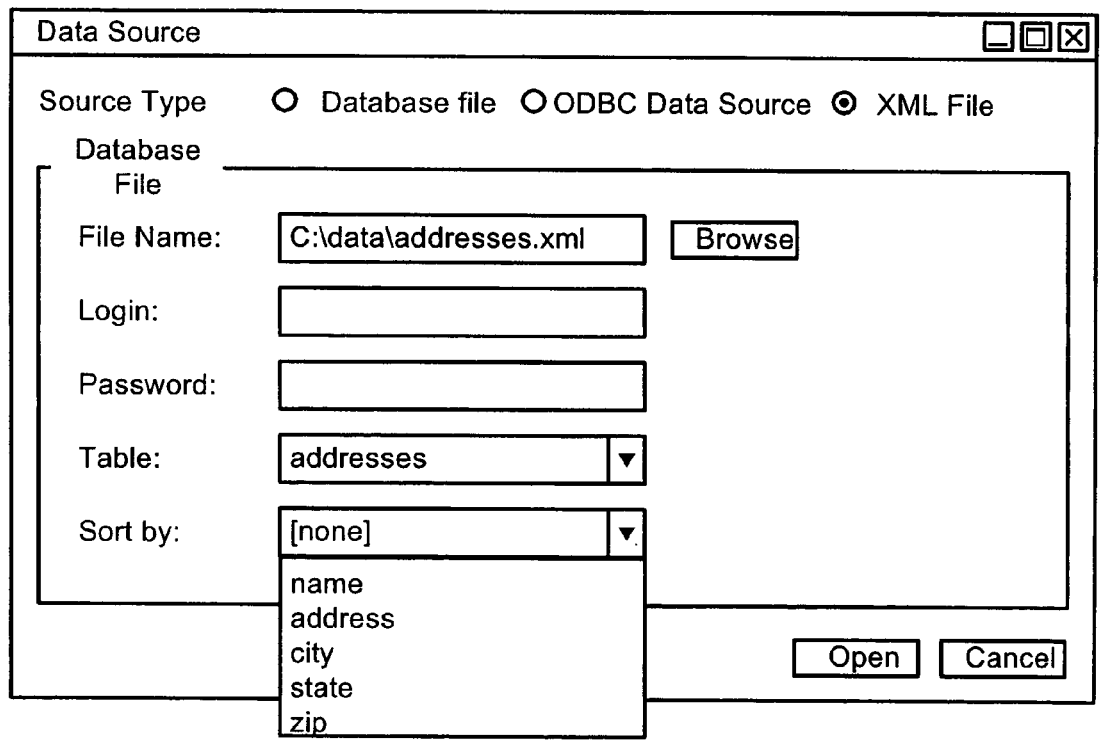
FIG. 15 illustrates a user interface for data source filtering.

Related to filtering is the ability to sort a data set into a sequence in order to find relevant data. One implementation allows the user to select a sorting of the records of the data source based on a user-chosen 'key' variable of the data source. All records are ordered by ascending alphabetic order in the chosen key variable. For example, if the key was the variable "Name", then after the sort operation is performed, records for which the Name starts with the letter A would be encountered before records for which the Name starts with the letter B (in the case of English text). Part of a suitable user interface is shown in FIG. 15, which shows that sorting may occur as part of the process of selecting a data source. Sorting is also possible after a data source has been associated, via a menu selection as shown in FIG. 17.

Another implementation may allow user-selectable sorting methods, such as numeric or language-specific methods, for different kinds of data. Another implementation may automatically select a sorting method based on the kinds of information stored the selected key variable, perhaps with an override mechanism in case the automatically selected method is a poor choice.

11.4 Record Navigation

A data source contains records, each of which is a collection of related information. For example, a database might contain records describing customers, or it might contain records of products. It is useful if the records within a database can be ordered into a sequence and navigated by the user.

Figure 18:
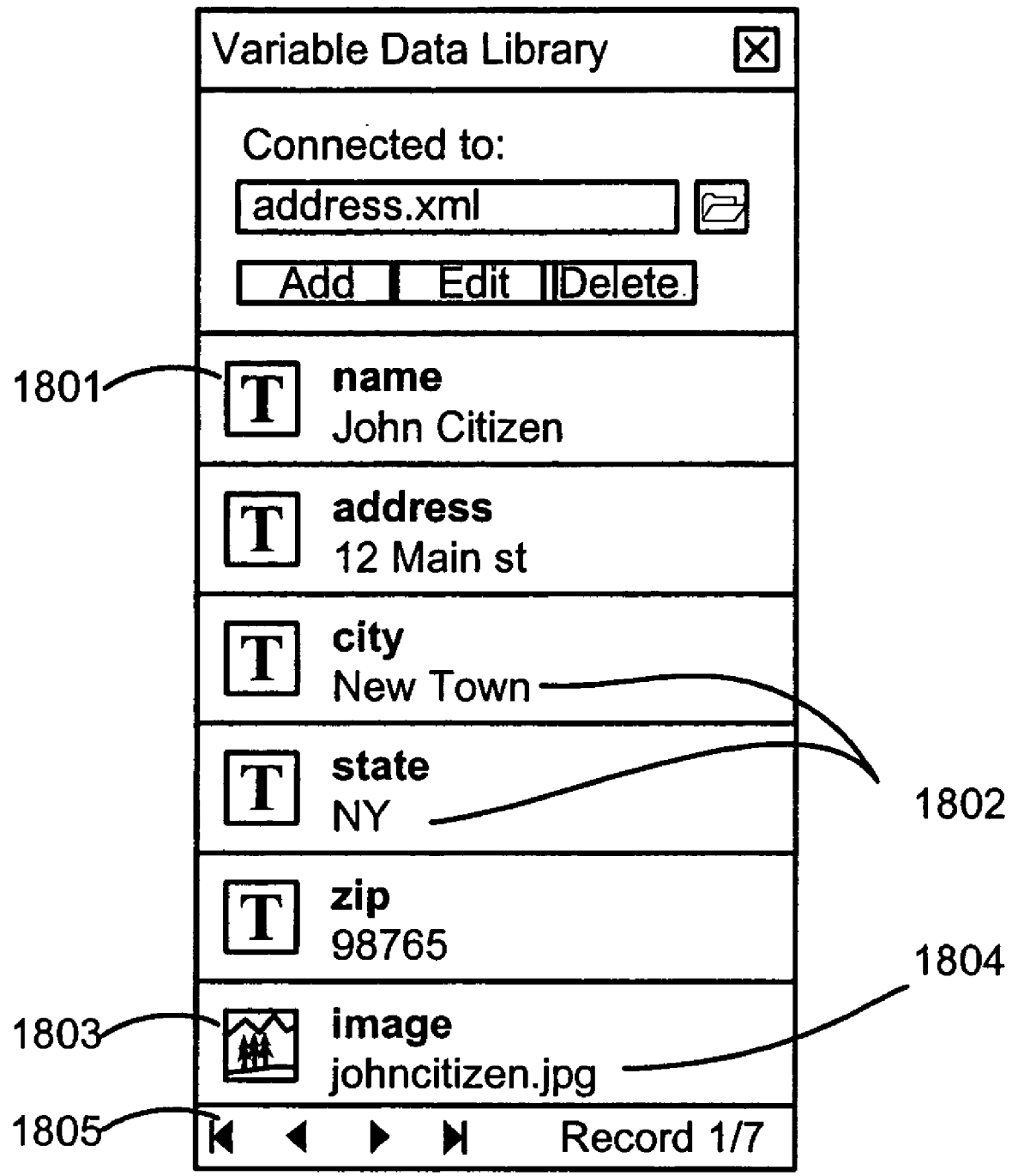
FIG. 18 illustrates an example of a user interface showing variables of a data source and a method for navigating through the data source.

A preferred navigation method is to display a set of GUI buttons which can be activated by the pointing device 313 and the mouse 133, as shown in FIG. 18 by the symbols 1805. Each button steps forward or backward through the sequence of records either one by one, or step to the start or end of the sequence, or step by some number of records. One approach is also to include a menu activated by the pointing device 313/mouse 133 or the keyboard 132, which shows these options (as shown in FIG. 17), and additionally allows the user to navigate to a particular numbered record.

Upon navigating to a particular record, the software application 121 displays that current record in some way upon the display screen 144. This may occur by merging that record with the variable document template and displaying the index of the current record within the sequence.

11.5 Variables

Each data source can be composed of a plurality of named variables that apply to records within that data source. For example, a customer data source might have variables for customer name and customer address. These are variables since the values may differ for each record, although the names of the variables might be the same for every record.

It is useful to have a method of displaying variables so that the user can inspect the records within the data source and choose variables to be associated with the variable document template.

Figure 16:
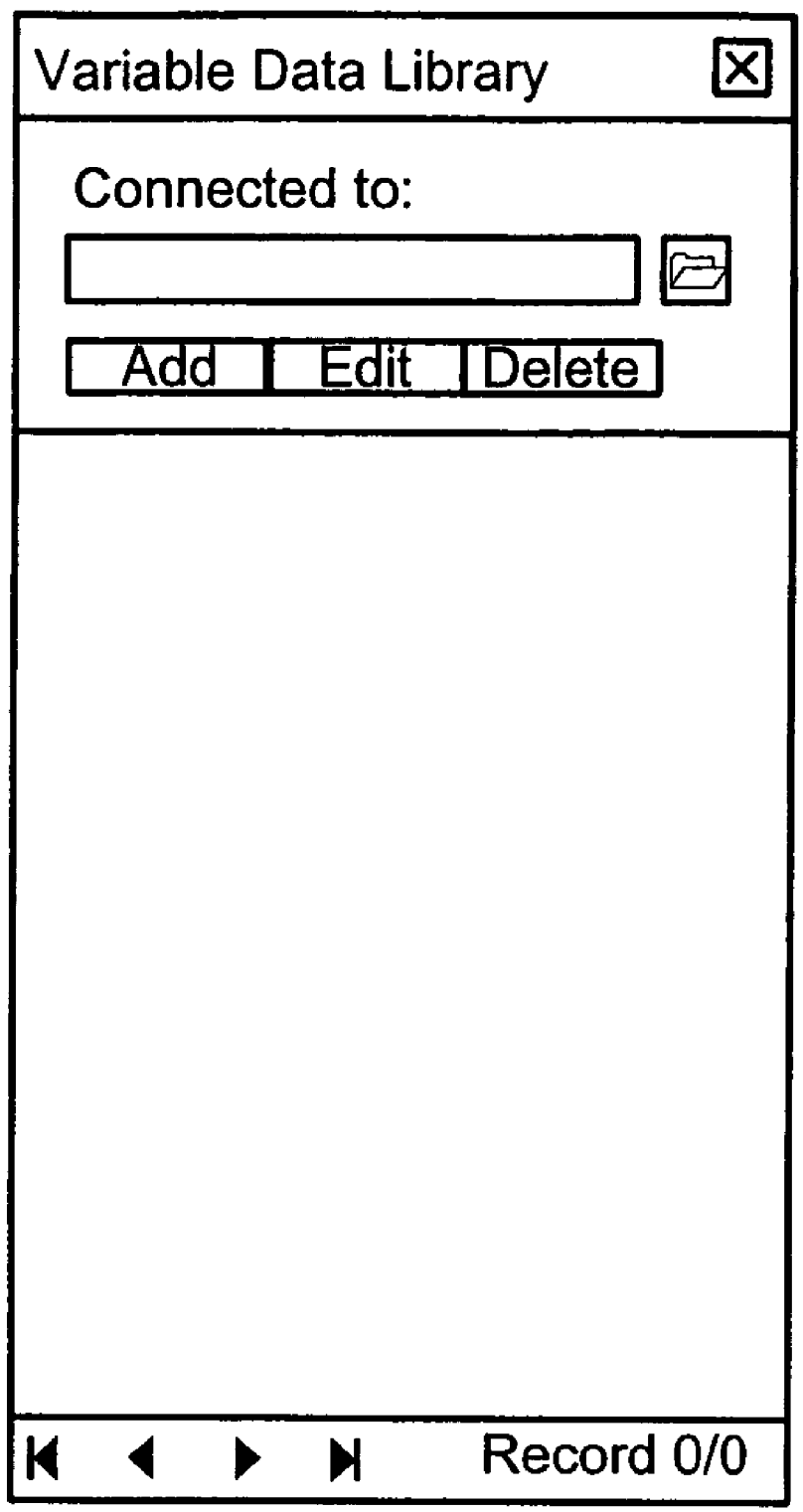
FIGS. 16 and 17 illustrate a user interface showing methods for navigating through the data source.

A preferred method for displaying variables is to list each variable by name and current value vertically within a free-floating window, as shown in FIG. 18. The current value is determined by examining the current record and finding each variable's value in the data source for that record. The current record may be chosen as outlined earlier using record navigation. Note that not all of the values or variable names need be displayed. There may be navigation mechanisms to allow the user to see each variable or value if there is too much information to fit within the window. Another implementation may use a similar display which is part of another window (in other words, a sub-window). If there is no data source associated with a document template, the window would be empty of variables, as shown in FIG. 16.

Variables may contain several kinds of data. A variable might store textual values, or it might store images. These are referred to as Text Variables and Image Variables respectively in the discussion below.

Preferably, the variables of a data source have one kind of value, hence a variable might display text or an image, but not both. A different implementation is to allow the variables of a data source to store different kinds of data per record. For example, in one record a product description variable might contain a textual description, while in another record in the same data source the same variable might have an image value.

11.6 Text Variables

A Text Variable contains textual values within each record of the data source. The application 121 signals to a user that a variable is a Text Variable by placing a distinctive label next to the name of the variable within a list of the variables in a data source, as shown in FIG. 18 by the label 1801. Another implementation might display the value of a variable near the variable's name as a way to signal a variable's type, as shown by the text 1802, although such an approach alone is not guaranteed to be unambiguous since image data might happen to appear the same as textual data in some circumstances. The application 121 uses this technique, but only as an aid to show the variable's data, not as a primary method of distinguishing variable types.

11.7 Image Variables

An Image Variable contains image values within each record of the data source. The values may be image data in a compressed or uncompressed format, or a file name or other access method to locate an image resource. The application 121 signals to a user that a variable is an Image Variable by placing a distinctive label next to the variable's name within a list of the variables in a data source, as shown in FIG. 18 by the label 1803. Another approach is to display the value of a variable near the variable's name, as shown by the text 1804, although this method is not guaranteed to be unambiguous since an image file name (for example) may be confused with textual data.

11.8 Drag and Drop to Containers

It is useful to have a method for allowing the user to construct a variable document template while variables of a data source are visible, so that the user may know what variables exist. It is also useful to allow the creation of the appropriate type of container from a given variable.

Figure 19:
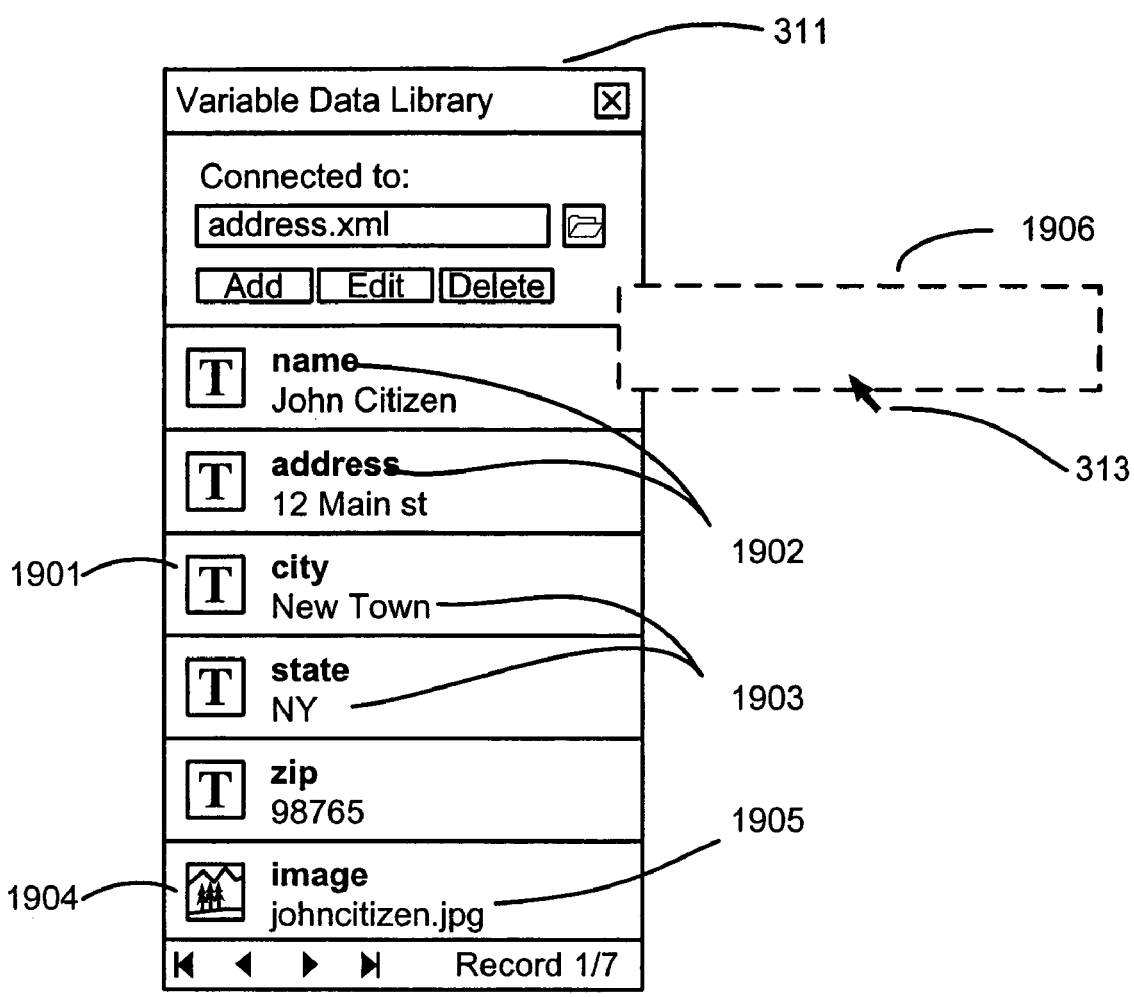
FIG. 19 illustrates a user interface for associating a variable of a data source with a variable document template.

The application 121 via the user interface 103 allows creation of the appropriate type of container by allowing the user to directly manipulate variables in the variable list (shown in FIG. 19) using the mouse 133 and the pointing device 313. The user selects a variable (for example one of the rectangular areas marked 1902) and drags it onto a design surface using the pointing device 313 and releases the selection 1906. This is used as a signal that an appropriate type of container is to be created and initialized with that variable. For example, a Text Variable (as indicated by the label 1901) which is dragged onto a design surface in this way will produce a Text Container which displays that variable's value for the current record (as also shown by text 1903). If an Image Variable 1904 was dragged to the design surface, an Image Container results which then displays either the filename 1905 and/or the image itself, scaled, cropped and aligned, depending on the settings employed by the user.

The initial state of the Text Container so produced may be user configurable, but another approach is to anchor the container to the page using the location where the user released the selection as a hint.

It might not be possible to use the location as the exact location of the container since the location might be invalid, such as outside the design window or outside the page (if that is invalid), so the location might be a hint. The container may be centered on the location, or one of its corners might be positioned close to the location, or the container might be placed as close to the location as possible while not violating other constraints such as being completely within the page, or the container might simply be placed in a default or random position and the location ignored. There are many possible implementations of a method to position a newly created object as the result of dragging a pointing device.

The application 121 also creates the container to be of sufficient size to store all of the current record's content for the variable so dragged onto the design. Hence a long piece of text will produce a large Text Container. Another approach may might pre-calculate a median size for the data in the dragged variable and produce a container large enough to display that median size. Other approaches can use variants of this method to create containers that are large enough to store the largest record's data, or the smallest, or some other algorithm.

Another approach is to drag the variable onto the design space and then sweep out a rectangle for the container that holds that variable's values. A further approach is to select the variable and then sweep out a rectangle for the container, without first performing a drag operation. Another alternative is to click twice with the pointing device on the variable representation and have a corresponding container appear at a random or algorithmically chosen location in the design.

Another implementation is to have all variables within a data source appear in the design as containers as soon as a data source is associated with the design, and for the user to then position or delete those containers as needed. The initial positions and sizes of containers created in this way may depend on the ordering of data within the data source and the relative sizes of content within each variable. In such an implementation, associating a data source with an existing design might not create a container for a variable if a container representing the particular variable already exists. This method is not preferred, since it does not facilitate the creation of multiple containers that refer to the same variable.

A specific implementation also supports linkage of data source variables with containers that have already been created. This allows a user to create a design without having to first associate a data source. Such an implementation may also provide association of a data source, creation of containers, and linkage of variables with containers in any order to support a flexible workflow.

Such an approach also allows existing containers to have their content modified by a drag and drop mechanism, implemented using the mouse 133 and pointer 313 combination, such that dragging a variable into a container may reassign what that container displays, or it might add to what it holds. For example, a container might have been constructed which contains the static text "Dear" and then the variable named "First Name" could be dragged into the container, and then the variable named "Last Name" could be dragged into the container. This may result in a container that displays all of these data, or it may result in a container that displays only the last variable's value, depending on the mode of operation and the settings on the container.

11.9 Displaying and Navigating Multiple Documents

Since documents are the product of merging a document template with data from a data source, there could be many documents produced as the result of a single merge operation. There are many ways such documents can be navigated and displayed.

One implementation contains several ways to display and navigate the documents, and relies on 'live proofing' (described below) in which each record of the data source is merged on demand with the document template to produce a view of both the constraints of the document template and the data for a given merged document. For such an implementation, several possible user interfaces exist, depending on user settings and/or the nature of the documents produced. A summary of those user interfaces are as follows:

- Each document is displayed in one flowing document that is organized vertically and/or horizontally, similar to a word processing document, or a spreadsheet, and navigated by scrolling mechanisms, a pointing device and/or keyboard. A separate mechanism may be used to navigate through the records in the data source, such as the buttons 1805 in FIG. 18.
- Each record when merged can result in a document which has many pages. Those pages may be organized vertically and/or horizontally and displayed. A separate mechanism can be used to navigate through the records in the data source.
- If a document template produces few pages when merged with each record, several documents may be displayed vertically and/or horizontally. For example, if each document is only one page in length, it is possible to arrange all documents into a linear sequence and display them using a windowing system and employ a scrolling mechanism to navigate the documents. This maps navigation both within a document and between records of the data source onto spatial navigation.
- If each document has one or more pages, these may be organized horizontally and then the vertical direction may be used to step through the records of the data source by laying out each subsequent document below the document representing the previous record, thus navigating the space of documents using one dimension. The roles of horizontal and vertical directions may also be interchanged, with a similar effect.

In each of the above, there may be other ways to navigate between records and between page and/or documents, such as buttons, menus, and so on.

In an alternative implementation, the document template can be displayed separately from the merged documents. Merged documents are produced only in a 'print preview' form which cannot be edited but simply display the results of merging a single record with the template. In another alternative, the document template may be visible, as well as a non-interactive print preview, as well as a live proofing preview which allows editing of both the document template and preview of the merged documents. Other combinations of these work modes are possible.

11.10 Proofing

In on-screen and printing jobs where variable data is used, significant productivity gains can be made by efficiently finding records that are representative of the full range of records being merged, and in particular, the actual extreme cases from a set of variable data records, so that the user understands how the final merged documents will appear.

It is useful to preview and proof print a number of records to see how the merged document will be affected by different sizes of variable images and different lengths of variable text. The most useful sample records to print include:

how most of the records will print; and records where there is either little or a lot of content being displayed.

More complex extensions of the principle include:

when text has been reduced too small or reached its minimum size;

when any variable data text is not being displayed;

when an image is scaled up too much (print quality may be poor); and when the aspect ratio of an image has been distorted too much.

When dealing with variable data, the number of records or versions of a document can be very large and without an automated proofing mechanism, the user would have to manually review each record to check that the final appearance of all of the merged documents are acceptable. For example, it is possible that only one of the records in the database contains content that will produce unpleasing appearances and finding that record can be difficult. This is particularly true for variable data jobs where the number of records is very large.

An efficient method of previewing and proof-printing variable data printing jobs is disclosed that ensures that the final appearance of every document is acceptable and will print correctly. A limited number of records are selected for previewing on-screen and/or proof printing which are representative of all of the other records that will eventually be printed. These records are selected by analyzing the merged appearance of every record and using a predetermined set of rules to determine those records that have the most significant impact on the appearance of the document.

Selective preview and proofing provides a profile of output results including extreme cases, so that the user is not surprised when printing the entire job. Showing extreme cases, being those records with the shortest and longest display sizes, is valuable and economic approach can be generalized to include a short list of "representative" cases that includes the median display size, most extreme cases and a number of records in-between the median and most extreme cases.

11.11 Live Proofing

Figure 20:
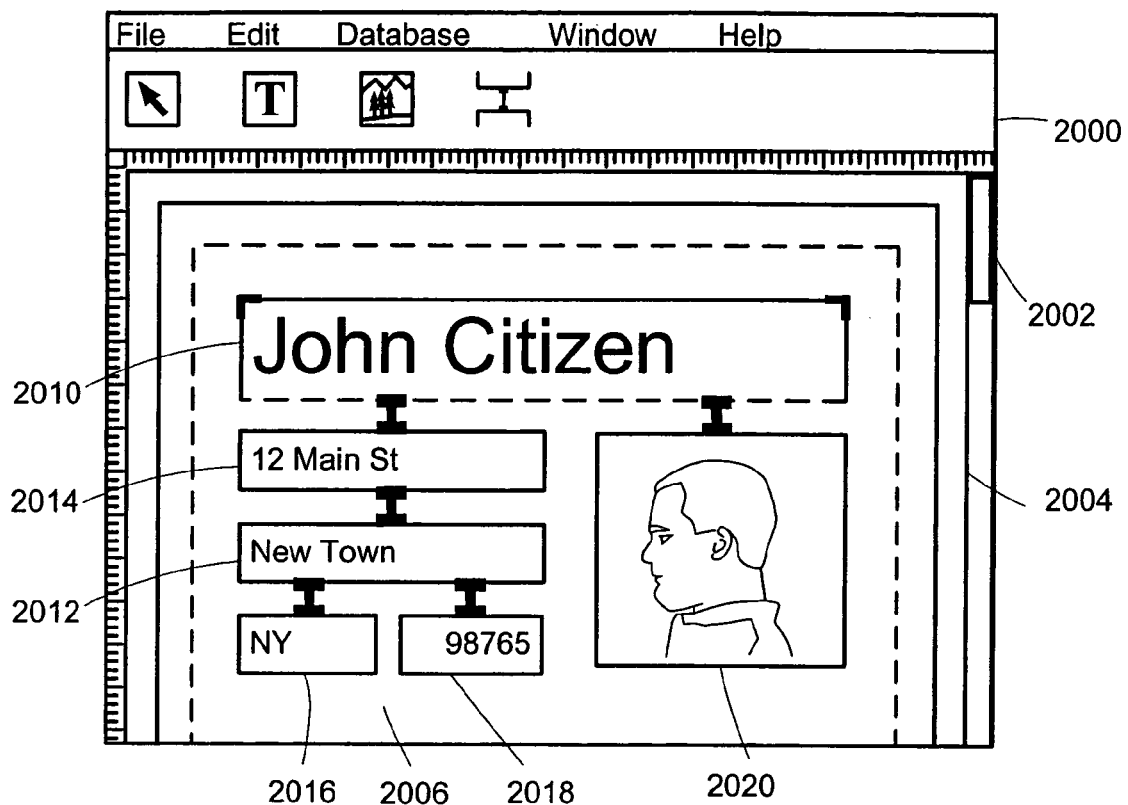
FIG. 20 illustrates a user interface for live proofing of the data source content merged with the variable document template.

Live proofing is the process of displaying variable data merged with the variable document template interactively and on-demand. FIG. 20 illustrates a graphical user 2000 interface in which a record of the data source having items 2010-2020 has been merged with the template to show 2002 what part of that record would look like if printed. Extra borders 2004 and colors 2006 have been added to make visible the constraints defined within the variable document template, but these artifacts are not intended to be printed.

Live proofing is advantageous over a separate merging process because errors in the design of the template are likely to be found earlier through interactive navigation.

A specific implementation of the application 121 uses live proofing. Alternative implementations may use live proofing as an option, or not at all.

11.12 Selective Proofing

Selective proofing is a way of viewing only selected records in a Variable Data Printing application 121 that are either typical of the average document, or are least like the average document.

It is useful if the user can specify many kinds of items to measure during selective proofing. The following measures may apply to individual containers, struts linking containers, pages, records in the data source or variables in the data source. Collectively these things will be referred to as 'design items' in the discussions below of selective proofing. The term 'merged size' refers to a size measure of a design item after a record from the data source is merged with the variable document template. Various size measures will be discussed later.

When selective preview or selective proofing is activated, a design item is selected by the user interactively or by a preference setting. Every record is separately merged with the variable document template. For each record, the merged size of the selected design item is recorded (stored). These merged sizes are compared to find those records for which the merged size of the selected design item is:

smallest;

median, average or some other measure of the middle of the set; and largest.

In order to find the most relevant records, the application 121 examines the actual display size of each record rather than just the number of characters. For instance "w" takes up more space than "i" and would have a greater impact on the size of a container and the overall appearance of the document.

Once these records have been identified, they are presented to the user for previewing on-screen and/or printing.

Users can also preview or proof print additional records from the merged documents to increase their confidence that all of the records in a variable data printing job will display correctly. Preferably, a deviation from the middle of the set is used to order the design items in a sequence so that records having the most different merged size for the selected design item are presented to the user first or most prominently.

11.12.1 Minimum and Maximum Content Size

A useful measure of the size of a design item is to consider its smallest or largest width, height or content area. In the case of individual containers, these measures are simple to compute. In the case of struts linking containers, either width or height will be meaningful, but not both, so area is not a meaningful measure. In the case of individual pages the sum of widths of containers or the sum of heights of containers or the sum of areas of containers may be used. In the case of records, the sum of these measures for all pages needed to display that record may be used. In the case of variables, all containers displaying the value of that variable in whole or in part may be used. Other approaches to select and total these measures can also be used.

11.12.2 Typical Size

Another useful measure of the size of content is to consider the typical size for a given design item. The typical size may be the average width or height, or the average area, or the average of the sums of the areas, or the average of the sum of squares of the widths and heights, or other possibilities. Another measure is to use the median instead of the average for each of the above. Other statistical approaches may be used.

Any or all of these measures may be used to locate typical instances of a particular design item. For example, records for which a particular container has an area closest to the average area could be located.

11.12.3 White-Space Size

White-space is another useful measure of how typical a design item is within the set of merged documents. White-space may be defined in many ways. For example, white space may be defined as the difference in area between the area of a container as defined by the constraints of the container and the area of content within that container when merged with a particular record, for example, if a container had a minimum size and the content does not fill that size. Alternatively, white space may be defined as the difference between the size of a container and the size of content of that container in one dimension only, such as width or height.

Maximizing white-space is similar to, but not the same as, minimizing content size, and vice-versa. They are not the same, since container constraints such as minimum dimensions play a part in the calculation. For instance, finding a record which has a maximal content area is not necessarily the same as finding a record which has a minimal white-space area.

11.12.4 Most Different Size

Of particular interest to variable data printing is locating documents which are unusual. For this a measure of unusualness is required. Such a measure may be defined in many ways. One example of such a measure is to calculate the largest deviation from the median size for a design item. The size is defined for some measure of width, height, area, sum of width and height, sum of squares of width and height, and so on. This median size can be calculated by examining each design item in question for each record in the data source, finding the size of that item and then finding the medians of all sizes so determined. The largest difference between each design item's size and the median size can then be calculated and thus the design item(s) with the largest deviation can be found.

Figures 21, 21A:
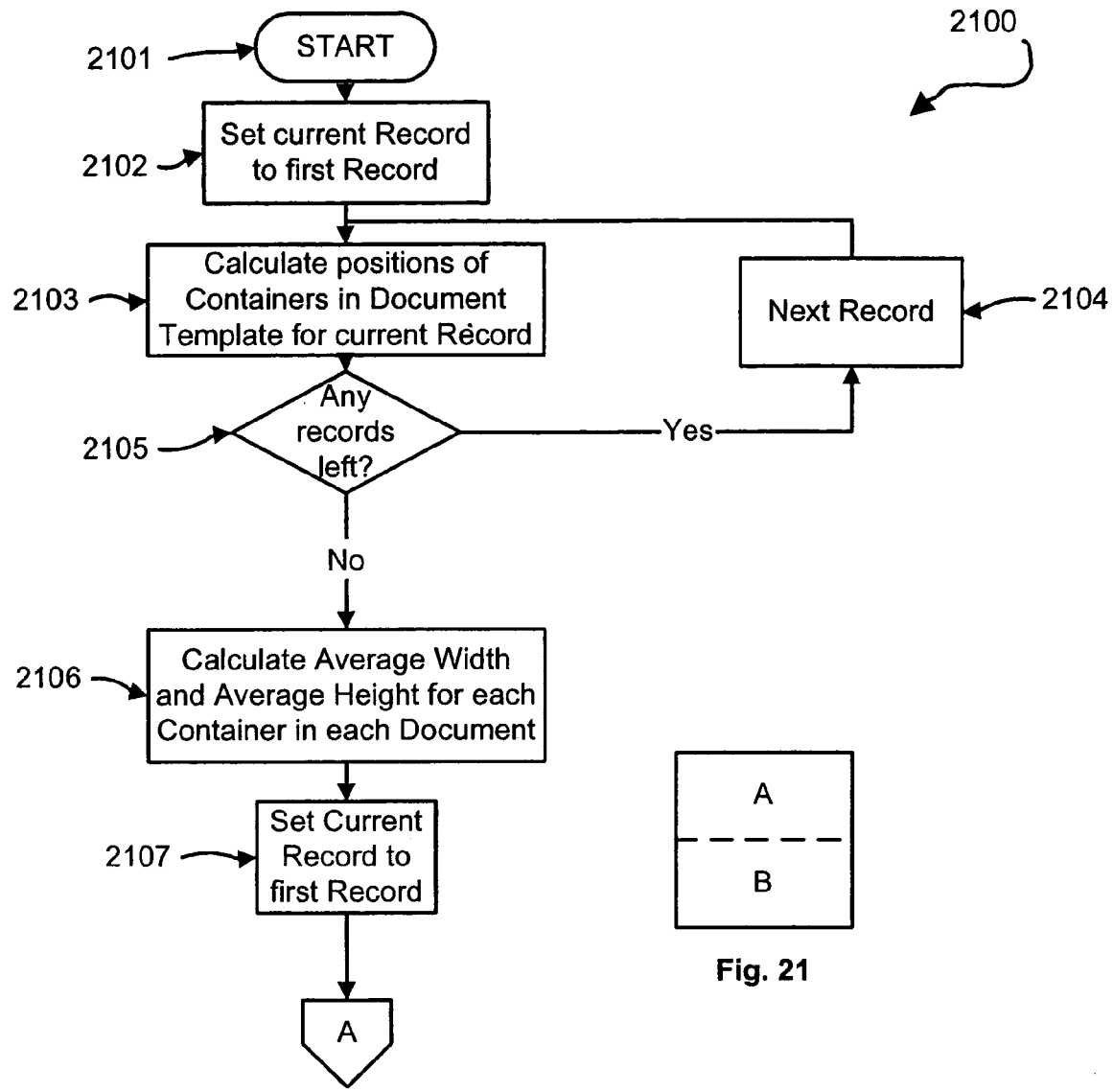
FIGS. 21A and 21B illustrate a method for calculating an average document, and a most disparate document using the widths and heights of the containers for each document, for use in selective proofing.
Figure 21B:
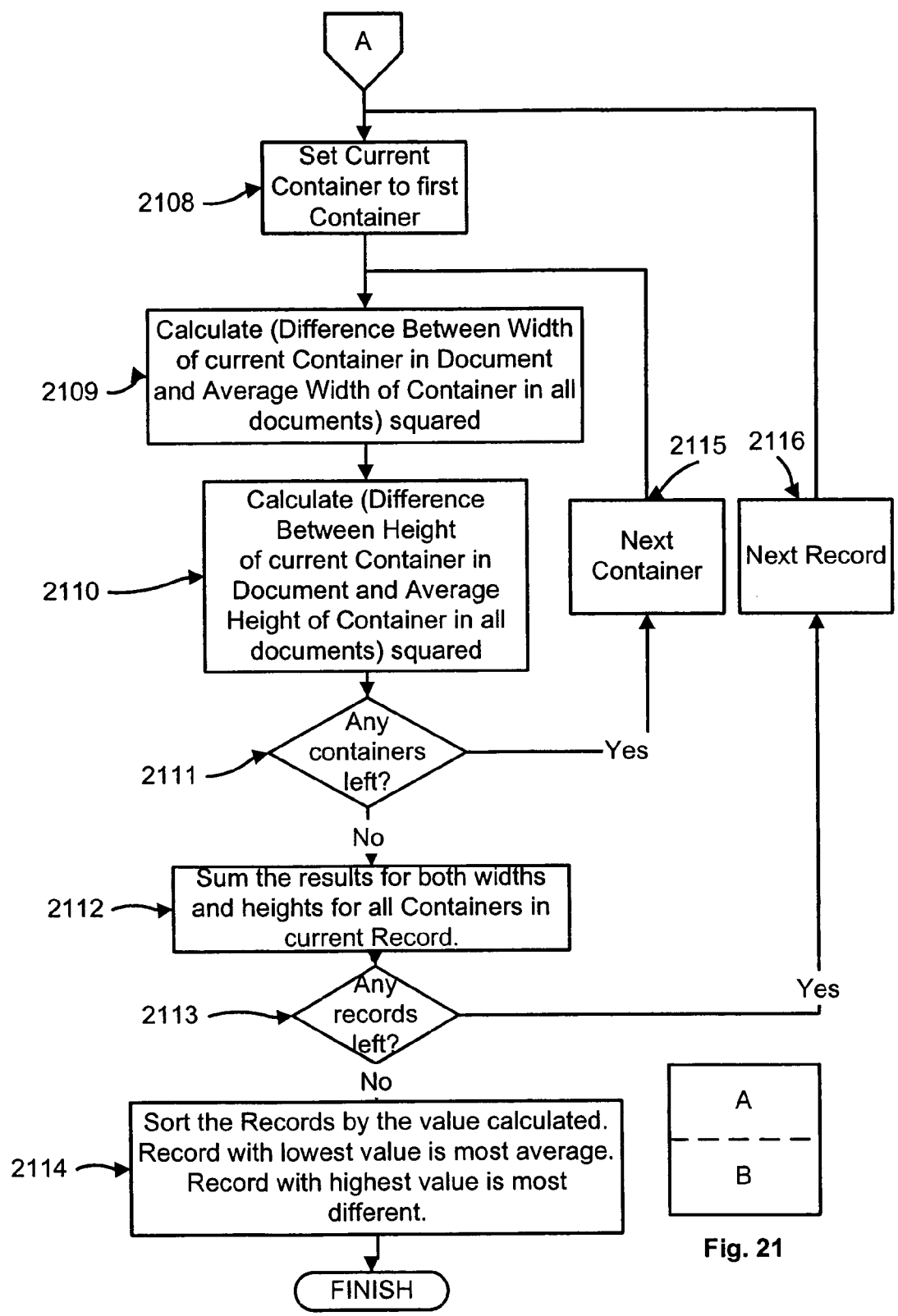

FIGS. 21A and 21B shows a method 2100 for calculating the average document, and the most disparate document using the widths and heights of the containers for each document. The method 2100 may be performed as a sub-module of the application 121.

The procedure starts at step 2101. Firstly, the method 2100 iterates through all records in the data source, calculating the position and dimensions of each container in the document starting with a first record at 2102 and using a process loop formed by steps 2103, 2104 and 2105.

At step 2106, the method 2100 calculates the average (mean) width and height of each container in the document template, by adding the width and height across all documents and then dividing by the number of documents.

Once the average values of the width and height are known for each container in the document template, the method 2100 iterates through all the records starting at a first record in step 2107 and via a loop formed by steps 2108, 2113 and 2116. For each container in the document, defined by a further loop bounded by steps 2108, 2111 and 2115, the method 2100 calculates the difference between the width of the container and the average width in step 2109, and the difference between the height of the container and the average height in step 2110. Step 2110 squares each of these values, and adds them together, to give a figure for the document. Squaring the results means that values are emphasized more strongly the further they are from the average value.

Once the figure above is calculated, it is now possible to work out, for any given container on any given document, how close that container is to the average size. If the container has the lowest value, it is closest to the average. On the other hand, if the container has the highest value, it is the furthest from the average.

If the user wants to know which is the most average document or the most deviant document, the values for each container on each document are added together in step 2112. A list is thus formed which is then sorted in step 2114 which concludes the method 2100.

The document with the lowest value is closest to the average document over each of its containers. The document with the highest value is least like the average document. The user may then be shown as many of these documents as is required, such as the 5 worst documents, or the 10 worst documents.

Other approaches can perform the above calculations on different properties than the width and height of the containers. Other properties that may be useful are the size of the content, the font size (for containers where the font grows and shrinks), the white space area on the document, the lengths of struts, or the positions of container edges.

11.13 Pre-Flight Check

Size measures of the kind discussed above may be used to discover typical, atypical or problematic design items. A "pre-flight check" is a term used within the variable-data printing field to describe an automated pre-print process that seeks to discover problems or other features of a merged document, before committing the entire job to hard copy printing.

This check can be as simple as determining that all records will print acceptably and do nothing extra, reporting that there were no problems, or drawing attention to the problematic records in some fashion.

Preferably, a pre-flight check is performed at the user's request and alerts the user as to whether the check found no problems or whether it found problems. If problems were found, the first problem encountered can then be displayed to the user together with an explanation via some visual and textual method of the nature of the problem.

Another implementation can find and list all problems for the user to then investigate. This check may be performed in the background while the user edits the variable document template, to provide a continually updating list of problems in a window or sub-window. If the list is empty an entry indicating that no problems have been found could be substituted. This background check may occur only at times when the software is otherwise idle, may occur continuously, or for some other set of times or situations.

12. Layout Method Overview

One aspect of the present disclosure is a method of laying out items on a page. A layout comprises a collection of items to be laid out and a set of rules or constraints that define where the items are to be placed in the layout. Several layout methods are described. These include:

1. A model for defining layouts. The layout model defines the types and properties of items that can appear in layouts and the allowed rules or constraints for defining how the items should be laid out. A data structure may be used to store layouts in the working memory of the computer 101. Several layout models are described in detail below.
2. A means of creating and editing layouts. This includes of a set of operations that can be used to create layouts. These operations may be implemented as software functions that can be called to build a data structure in accordance with the layout model. These will be described in detail below.
3. A means of calculating positions and dimensions of items in layouts. Given a layout defined by a set of items and rules, this layout calculation method specifies how the items are to be laid out in accordance with the rules and may be formed by the software 105 executing on the computer 101. The means of calculating layouts will be described in detail below.

Preferably, the means of creating and editing layouts in accordance with a particular layout model, and the method of calculating positions of items for that layout model, are implemented together as a software component, being the layout engine 105, previously mentioned. Note that the layout engine 105 does not include the user interface 103. Many different user interfaces may be used together with the layout engine 105, described previously with reference to FIG. 1A.

13. Layout Models Overview

The layout models include a basic layout model and several extensions to the basic model. The basic layout model defines the basic properties of layout items, and the rules that can be used to define layouts. Several additional rules are also defined that are used to extend the basic layout model. Some combinations of rules are advantageous because they lead to a simple layout method. Other combinations are advantageous because they are simple for users of the layout method to understand.

The basic layout model and the additional rules will be described below. Several implementations will be described incorporating particular combinations of the rules.

14. Creating and Editing Layouts Overview

A layout is typically associated with part of a page in a document. Creating and editing operations are assumed to operate on a layout that is initially created as an empty layout and are functions that are called by the user interface software 103. The operations may also be performed by server software without direct input by a user while producing a document by combining data with a document template.

Operations used to create or edit layouts preferably do not correspond directly to the operations performed by the user of the software. A single action by the user is typically translated into multiple layout creation operations by the user interface software 103 or preferably by another layer of software that provides a higher-level interface to the layout engine 105 than the operations directly supported by the layout engine 105.

The means of creating and editing a layout comprises at least operations for:
1. adding items;
2. removing items;
3. adding rules; and
4. removing rules.

Other operations may be added for modifying the items or rules. The exact forms of the editing operations depend on the specific layout model used. Many different forms are possible. These operations are described in detail below.

When adding items and rules to a layout, it is easy to add combinations of rules that are inconsistent in the sense that there is no possible placement of the items that can satisfy all of the rules. Such a layout is said to be over-constrained. Conversely, it is also possible that a given combination of rules may admit many possible solutions. For instance, there may be many possible placements of the items that satisfy all of the rules. Such a layout is said to be under-constrained. It is desirable to ensure that every layout has exactly one solution. Hence, in addition to the operations used to create a layout, the application 121 also incorporates means for ensuring that there is exactly one solution. This is incorporated into the layout creation means and into the means for calculating layouts.

Since it is desirable to prevent users from creating layouts that have no solution or more than one solution, consistency and uniqueness checking may be performed in conjunction with editing operations. Such checking may be performed after each editing operation to test if the operation is valid. If not, the change may be disallowed and suitable feedback may be given immediately to the user.

Thus consistency and/or uniqueness checking may be incorporated as part of the editing operations. Alternatively, the layout calculation can ensure that a single well-defined solution is calculated for each possible layout that can be created using the layout creation and editing operations.

A means of ensuring existence and uniqueness of layout solutions will be described in detail below.

15. Layout Calculation Overview

For each layout model, there is a corresponding method of calculating the positions and dimensions of the layout items. These positions and dimensions may be defined in any two dimensional coordinate system that is convenient for the problem.

Several methods may be used for calculating the positions and dimensions of layout items. These include:
1. the tree traversal method;
2. the simplex method;
3. a modified simplex method with a quadratic objective function; and
4. graph based layout.

The tree traversal method applies to a restricted layout model consisting of little more than the basic layout model. The other methods are used for various extensions to the basic model. Methods 2, 3 and 4 are equivalent to solving various optimization problems.

An optimization problem consists of a set of constraints and an objective function that must be minimized or maximized. In the application 121, some of the rules defining a layout represent constraints and some of the rules are used to define the objective function.

The simplex method is a well-known method for solving a particular class of optimization problems. The simplex method is suitable for use with some of the layout models described as part of this disclosure.

The simplex method only supports linear objective functions, whereas it is desirable to have a strictly convex function to ensure that the layout has a unique solution. Typically, a quadratic objective function is used, because there are well-known techniques for solving optimization problems with linear constraints and a quadratic objective function. The simplest of these are modifications of the simplex algorithm. These methods are well known in the art of solving optimization problems and any of these may be used without departing from scope of the present disclosure.

16. Detailed Description of Layout Models 16.1 Basic Layout Model

Figure 22:
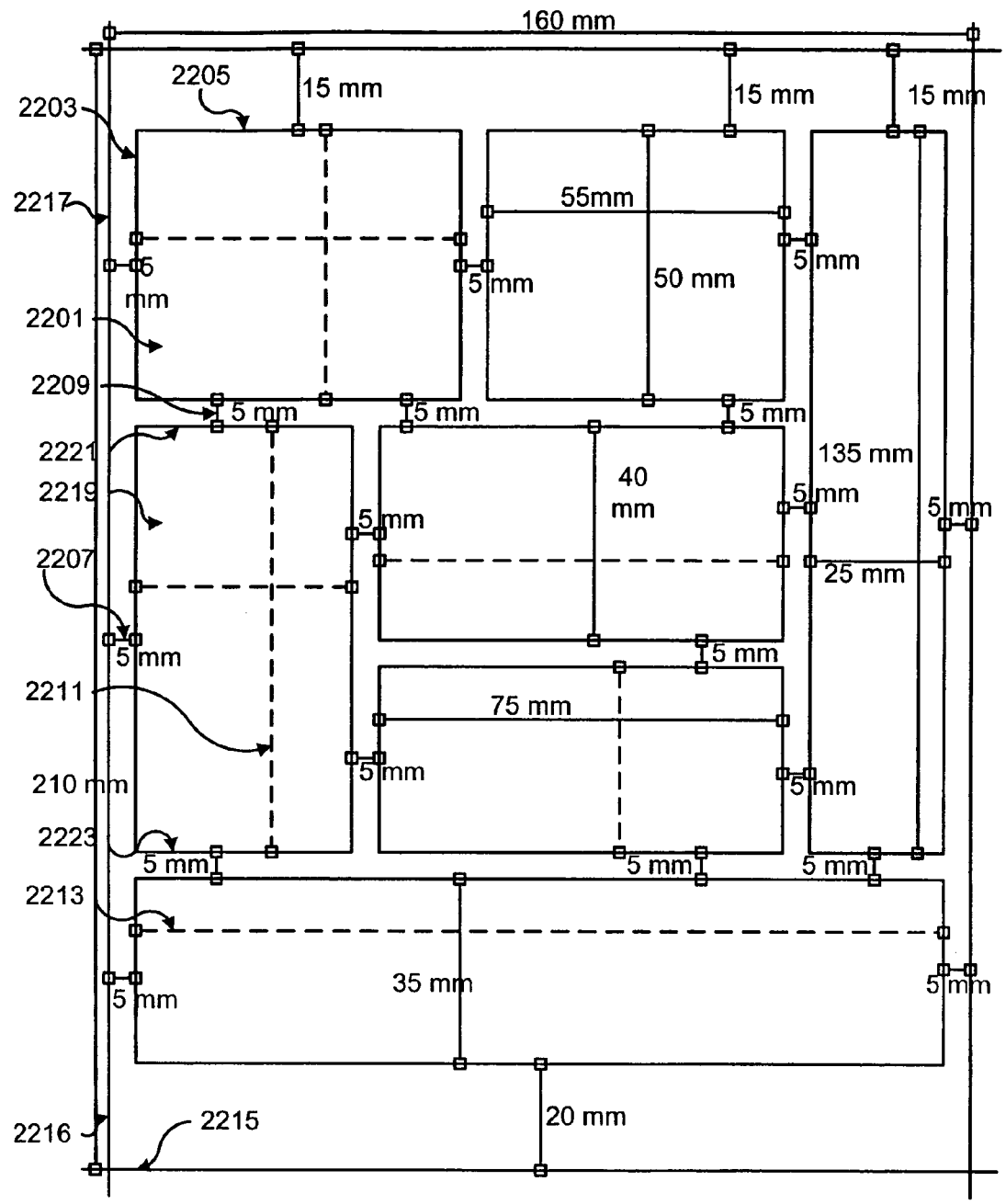
FIG. 22 is an example layout showing the layout items and constraints that are used as input for the layout method.

One aspect of the application 121 includes of a method of laying out a collection of items. Typically, the items are laid out in a rectangular space in accordance with a set of rules or constraints. FIG. 22 shows an example set of items and constraints.

A basic layout model is described for defining such layouts. The basic layout model is used to define the basic structure of a layout and the limits of the variability of the layout. For example, the basic layout model is used to define basic relationships between layout items, set minimum and maximum sizes of items and to set limits on positions of items. Extensions to the basic layout model are used to provide finer control over layouts. The advantages that basic layout model has are:

1. it can be easily understood by a layout designer in terms of physical analogies such as rigid and movable objects;
2. it can be easily represented and manipulated via a graphical user interface;
3. it has a simple representation in software that can be manipulated using a well defined set of operations.

In the basic layout model, as shown in FIG. 22, a layout comprises one or more rectangular layout items 2201, called boxes, the layout rectangle defined by horizontal and vertical sides 2215 and 2216, in which to place the boxes, and zero or more rules 2207, 2211.

Typically, the rectangular space in which the items are to be laid out represents the printable area of a page, or part of a page in a document, and each item represents a graphic image or a block of text, although in some applications of the basic layout model the layout rectangle may be absent.

The size and location of each box in the layout is defined by the positions of the four sides of its bounding rectangle. Size and location may be specified in layout units, which are typically related to an absolute unit of measurement such as millimeters. Rules 2207, 2209, 2211, and 2213 define relationships between the sides of items or the layout rectangle. A rule may define a relationship between opposite sides of the same item, such as rules 2211, 2213, between the side of an item and the side of another item, such as rule 2209, between the side of an item and a side of the layout rectangle 2207, or between opposite sides of the layout rectangle, such as rule 2217. A side, in this description, is defined to mean the left, right, top or bottom of an item or object.

In the basic layout model, the side of each box is associated with an abstract layout item called an "alignment mark" or just "mark". The sides of the layout area are also associated with marks. Thus, the basic layout model supports two kinds of layout items: boxes and marks.

The term "alignment mark" is an abstraction and generalization of registration marks used by printers to align multiple images to be printed on top of each other. There are two kinds of alignment marks: horizontal and vertical. A horizontal mark represents a vertical position on the page or layout and may be thought of as a horizontal line of indeterminate or infinite length. A vertical mark represents a horizontal position on the page and is conceptually a vertical line of indeterminate or infinite length.

Alignment marks are not generally intended to be printed—they exist purely to define positioning and relationships between boxes. Alignment marks may be displayed in various ways (or not at all) by the user interface.

A layout is associated with a two-dimensional coordinate system. It is the job of the layout engine 105 to determine the position or coordinate of each mark in the chosen coordinate system. Vertical marks have a horizontal coordinate and horizontal marks have a vertical coordinate. The coordinate system is preferably specified by assigning coordinates to one designated vertical mark and one designated horizontal mark. The coordinates of all other marks are determined by their offsets relative to the designated marks. If the layout is of a fixed size, the marks used to specify the coordinate system are typically two sides of the layout rectangle.

A box is a rectangular area typically associated with some text or graphics. A box may be used to represent a container when calculating a layout. Each box is associated with four marks that define the sides of the box. A box is essentially a relationship between four marks. In extensions of the basic layout model additional marks may be associated with boxes. In the basic layout model, the layout rules used to determine the position and dimensions of boxes are completely described in terms of the marks associated with their sides, but in extensions of the model, additional rules are associated with boxes.

Boxes and marks are also used to represent shapes and positions that do not correspond directly to shapes and positions of objects that appear in the document. For example, boxes are also used to represent ideal dimensions of items, which may be different to the sizes calculated by the layout engine 105. Marks may be used to define limits on the placement of other items, for example, marks may be placed at positions representing page margins and rules may be added to ensure that the layout engine 105 does not place items outside the page margins.

In the basic model, each rule represents either a vertical offset 2209 or a horizontal offset 2213 and may have either a specified size 2207 or an unknown non-negative size (shown as dashed lines) 2213. A fixed offset rule specifies the size and direction of the vertical or horizontal offset between two marks in the layout. An unknown offset constraint specifies only the direction of the offset between two marks. For example, the offset 2211 indicates that the edge 2221 of box 2219 must always be above the edge 2223 of the same box. The size of an unknown offset constraint represents a value that needs to be calculated by the layout method.

Thus, in the basic model, there are two types of rules: fixed offset rules and non-negative offset rules. Each type of offset rule defines a constraint on the relative positions of a pair of marks.

A fixed offset rule indicates that the offset between the position of a first mark and a second mark must have a specified value. For instance, given marks m and n, a fixed offset rule is a constraint denoted by: fixed(m, n, d) defined by the equation:

$pos(n)-pos(m)=d,$ where d is a non-negative number. Struts 412 are represented as fixed offset rules in the layout engine. Also if a container has a fixed width, this is indicated to the layout engine by adding a fixed offset constraint relating the marks representing the left and right sides of the container. Similarly, if the container has a fixed height, this is represented in the layout engine by a fixed offset constraint between the marks representing the top and bottom edges of the container.

The distance d represents the offset from one mark to the other, and pos(u) denotes the position of a mark u. The position of a horizontal mark is the vertical distance of the mark from the origin of the layout coordinate system to the mark. The position of a vertical mark is the horizontal distance from the origin of the layout coordinate system to the mark. Any coordinate system may be used that is convenient for defining the layout. In a fixed offset rule, the two marks must be of the same orientation. In this regard, the marks must both be horizontal marks or they must both be vertical marks.

Note that the term "fixed" in this context refers to a value that is an input to the layout calculation method, and cannot be changed by the layout engine 105.

A non-negative offset rule is a constraint that specifies that the offset between two marks is non-negative. A non-negative rule between a mark m and a mark n is a constraint denoted by non-negative(m, n) and defined by the inequality:

$$pos(n) \geq pos(m).$$

In a non-negative offset rule, the two marks must be of the same orientation. For example, the marks must both be horizontal marks or they must both be vertical marks.

Figure 23:
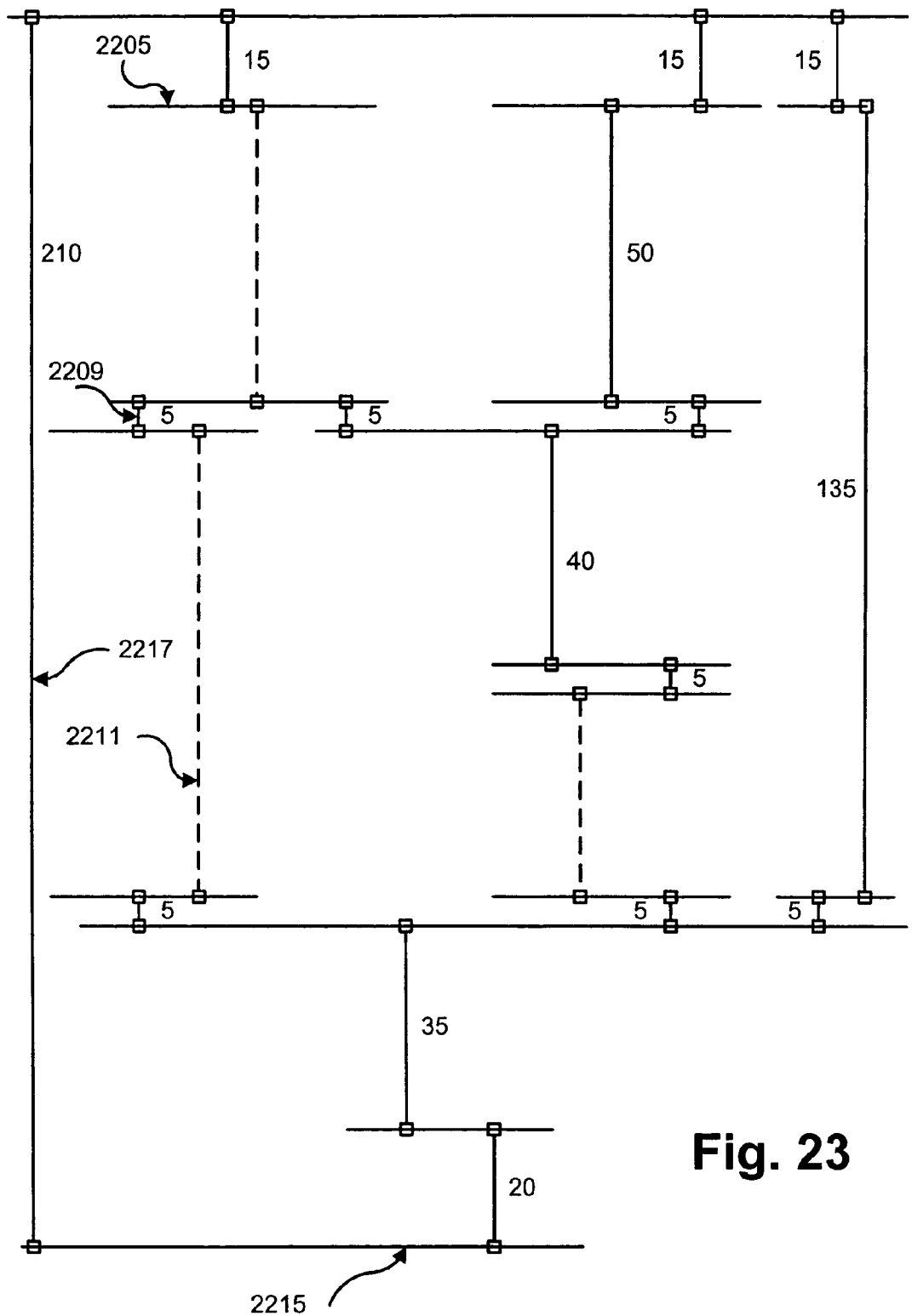
FIG. 23 shows just the vertical constraints corresponding to the example in FIG. 22.
Figure 24:
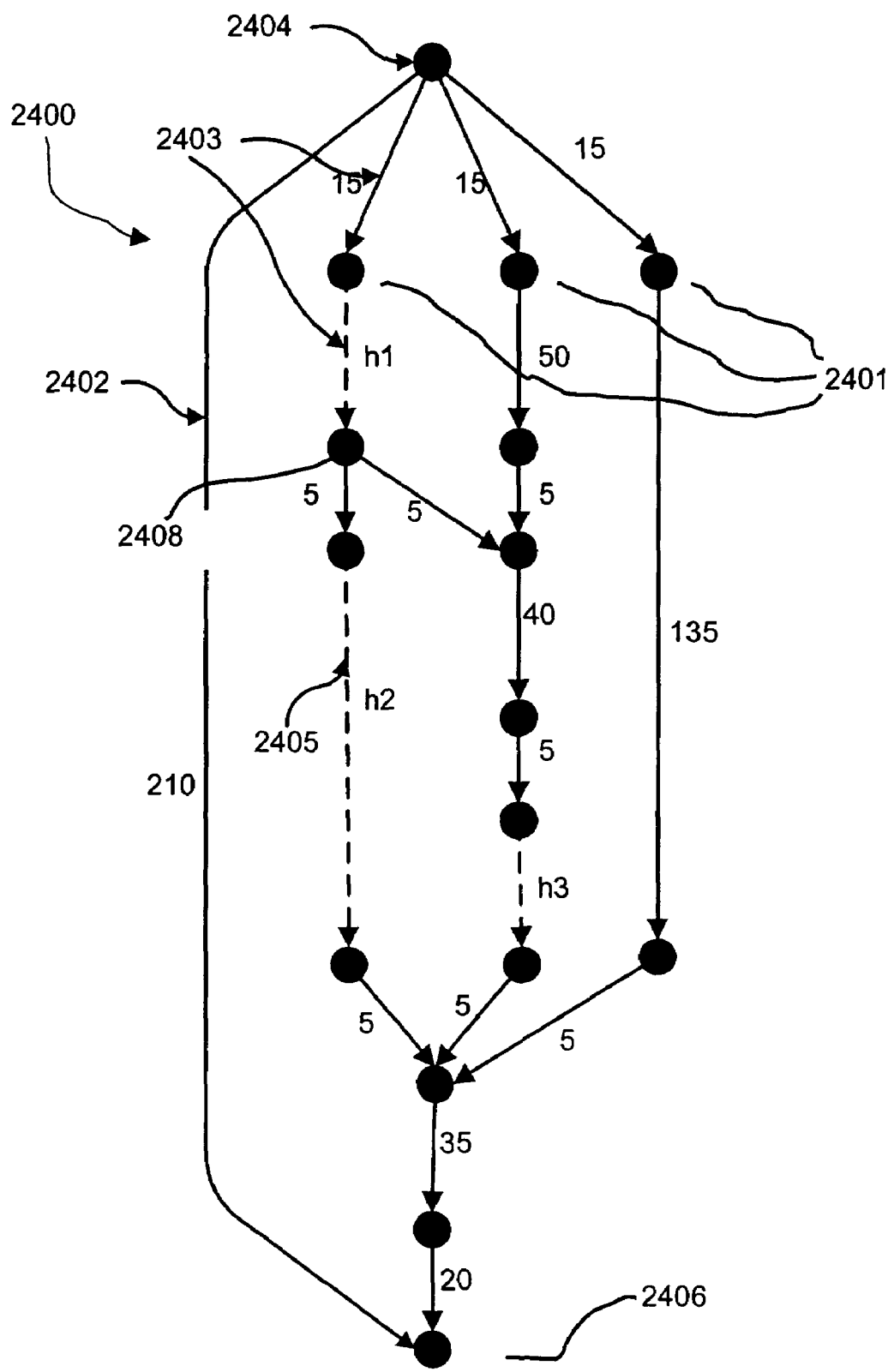
FIG. 24 is a directed graph representing the vertical constraints of FIG. 23.

In the basic layout model, the horizontal rules are independent of the vertical constraints, so the problem of calculating the layout may be split into two separate problems. FIG. 23 shows just the vertical offsets corresponding to the layout shown in FIG. 22. In this implementation, distances are specified in logical units. In FIG. 23, fixed offset rules have been labeled with the size of the offset in logical units. In this case it is assumed for simplicity that each logical unit corresponds to one mm. Logical units may be any convenient size for the application, but typically one logical unit would be smaller than the smallest independently addressable printer dot. The vertical offset rules shown in FIG. 23, may be represented in the form of a directed graph 2400 as shown in FIG. 24. In FIG. 24, each vertex 2401 represents a horizontal mark, and each arrows 2403 represent a rule. Fixed offset rules (e.g. 2402) are shown as solid lines and non-negative offset rules (e.g. 2405) are shown as dashed lines. In FIG. 24, for example, arrow 2402 between a root node 2404 and a terminal node 2406 represents the fixed offset rule 2217 from FIG. 23, and which defines the height of the layout rectangle of FIG. 22. Further, the non-negative offset rules are variable within boundaries established by the fixed offset rules. For example, an increase in the value of h1 will cause a corresponding decrease in the value of h2 and the value of h3, both of which depend from a terminal node 2408 of h1.

Typically, the layout area is of a fixed size. This is specified by connecting the marks associated with opposite sides of the layout area with fixed offset rules. In some applications, it also makes sense for the layout engine 105 to calculate the size of the layout rectangle based on relationships between the sides of the layout area and items in the layout. Typically, rules are added to the layout to ensure that the boxes representing printable items are constrained to be within the layout area, but in some implementations, this may not apply, and the layout area rectangle may not be required. In some applications of the basic layout model, the layout rectangle may be missing.

16.2 Alternative Representations of the Basic Layout Model

In another implementation, the basic layout model is represented in a different, but equivalent way, to that described above. Here, the basic layout model is represented using only one type of rule: a minimum offset rule.

The minimum offset rule specifies the minimum allowed offset between a first mark and a second mark. A minimum offset rule between a mark m and a mark n is a constraint denoted by min (m, n, d) and defined by the inequality:

$$pos(n) - pos(m) \geq d,$$

where d is a number representing the minimum allowed offset. In this representation, the number d may be positive, negative or zero, and the two marks related by a minimum offset rule must be of the same orientation (ie. both be horizontal marks or both be vertical marks).

In another equivalent implementation, maximum offset rules may be used instead of minimum offset rules. A maximum offset rule, denoted by max (m, n, d), is defined by the inequality:

$$pos(n) - pos(m) \leq d,$$

where d is a number representing the maximum allowed offset.

To see that only one of these two types of rules is required, note that any maximum offset rule can be replaced by an equivalent minimum offset rule because of the equivalence:

$$\max(m, n, d) \equiv \min(n, m, -d).$$

To see that the alternative representation of the basic layout model is equivalent to the representation originally described, note that any non-negative offset rule is a special case of a minimum offset rule as seen from the equivalence:

$$\text{nonnegative}(m, n) \equiv \min(m, n, 0),$$

and any fixed offset rule is equivalent to two minimum offset rules as seen by the equivalence:

$$\text{fixed}(m, n, d) \equiv \min(m, n, d) \text{ and } \max(m, n, d)$$
$$\equiv \min(m, n, d) \text{ and } \min(n, m, -d).$$

Conversely, any minimum offset rule can be expressed using an extra mark t, a fixed offset rule and a non-negative offset as shown by the equivalence:

$$\min(m, n, d) \equiv \text{fixed}(m, t, d) \text{ and } \text{nonnegative}(t, n), \text{ if } d \geq 0$$
$$\equiv \text{fixed}(t, m, -d) \text{ and } \text{nonnegative}(n, t), \text{ if } d < 0,$$

where t is an extra mark used to mark the limit of the allowed positions of n relative to m. In the special case where d=0, t may be replaced by m, and the fixed offset rule is redundant.

Thus, there are many equivalent representations that allow minimum and maximum offsets, fixed offsets and non-negative offsets to be specified. Minimum offset rules may be used to represent all of these types of rules because this simplifies the data structure used to represent layouts, and the software for manipulating the data structure.

Directed graphs are also preferably used to represent layouts conforming to the basic layout model where each graph vertex corresponds to a mark and each graph edge is labeled with a number representing the minimum allowed offset from the mark represented by the source vertex of the edge to the mark represented by the destination vertex of the edge. Thus, for any given layout, a graph representation may be produced where each mark in the layout is represented by a corresponding vertex of the graph, and each minimum offset rule is represented by a corresponding directed edge. In the basic layout model, boxes may be ignored in the representation because each box is completely described by the marks corresponding to its sides.

There are numerous ways to represent a graph in the memory of a computer and any appropriate representation may be used. Generally it is convenient to store layouts consisting of the items and constraints in a form other than a graph representation for the purpose of displaying and editing, so typically the layout will not be always represented directly in the form of a graph in an interactive application. The graph representation may comprise means for labeling the edges and vertices of the graph with numbers and other information as required.

Figure 33C:
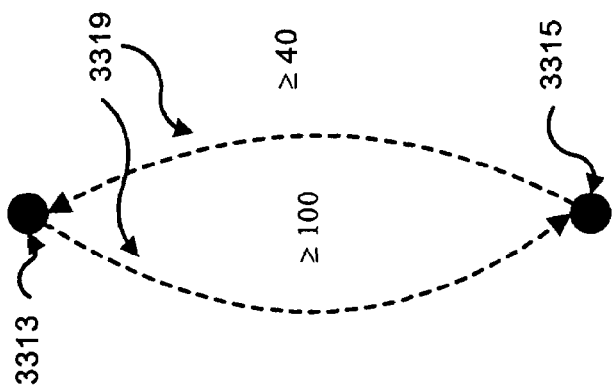
FIGS. 33A to 33C show how the minimum and maximum height of a container may be specified using different representations of the basic model.
Figure 33B:
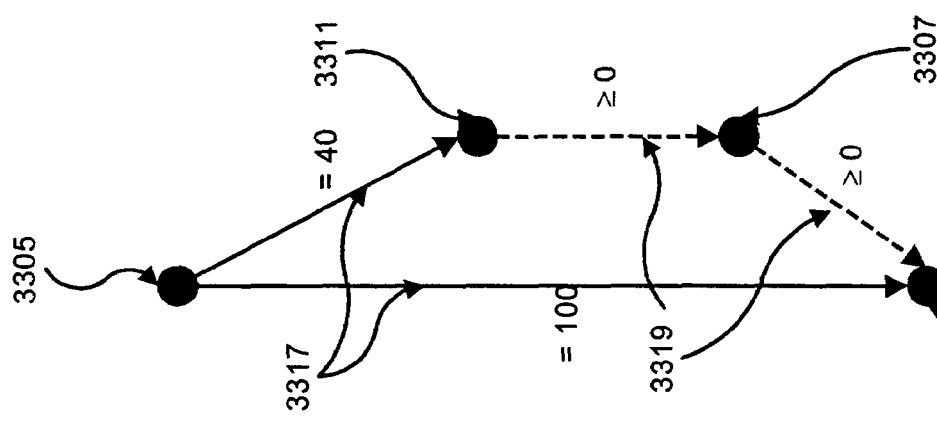
Figure 33A:
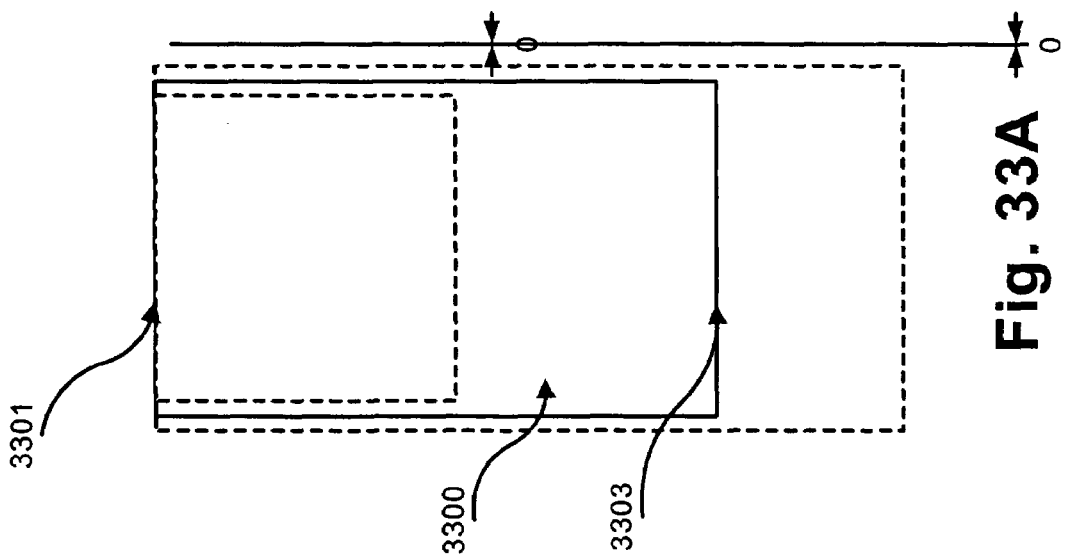

FIGS. 33A to 33C show how the minimum and maximum height of a container may be represented using only fixed offset rules and non-negative offset rules and also using only minimum offset rules. In FIG. 33A, a container 3300 is shown with a minimum allowed height of 40 units and a maximum height of 100 units. The container 3300 is represented in the layout engine 105 by a box with the top edge associated with mark 3301 and bottom edge associated with mark 3303. The directed graph of FIG. 33B has four vertices 3305, 3307, 3309 and 3311. The vertex 3305 represents the mark 3301 and the vertex 3307 represents the mark 3303. The other two vertices 3309 and 3311 represent extra marks that define the range of movement allowed for mark 3303 relative to the mark 3301. The positions of these marks are fixed relative to the mark 3301 using fixed offset rules represented by solid edges 3317 in the graph. Two non-negative offset rules represented by dashed edges 3319 in the graph are used to constraint the position of the mark 3303 to be between the two extra marks 3311 and 3309. The second directed graph of FIG. 33C represents the same constraints using only two vertices 3313 and 3315 where vertex 3313 represents mark 3301 and vertex 3315 represents mark 3303. Two edges 3319 are used to represent minimum offset rules. The edge from vertex 3313 to 3315 represents a minimum offset rule with minimum value 40. The edge from vertex 3315 to 3313 represents a minimum offset rule with minimum offset −100. This is equivalent to a maximum offset rule from 3313 to 3315 with maximum value of 100.

16.3 Shape Rules

In variable data printing applications, it is convenient to be able to define a relationship between the width and height of a box. In the basic layout model there is no way to do this.

For example, a box might correspond to an image that is to be inserted into the layout and the size of the image might need to be adjusted to fit into the available space. It is desirable in such a case, to be able to specify the aspect ratio of the box and have the layout engine 105 determine the best size of the box based on the sizes of other items in the layout. As another example, a box may correspond to the bounding box of a block of text whose height and width are not specified, so both need to be determined by the layout engine 105.

The basic layout model may be extended to allow additional rules called shape rules that define relationships between the widths and heights of boxes, and to include two types of shape rules: aspect rules and text rules.

An aspect rule specifies that a box must have a particular aspect ratio. A text rule specifies that a box should be shaped as a bounding box for a particular block of text. Layout of text is handled by a special purpose module. Examples of text layout are described later in this document.

The behavior of shape rules is described in more detail below because their exact behavior depends on the method used to calculate layouts. These rules may have different behavior in different implementations depending on the method chosen to calculate positions and dimensions of items.

16.4 Equal Offset Rules

Another type of constraint that is convenient to have when specifying the layout is to be able to specify that two distances are equal. This can be specified using an equal offset rule denoted by equal(m, n, s, t) for marks m, n, s and t, where m and n have the same orientation and s and t have the same orientation. The equal offset rule equal(m, n, s, t) is defined by the equation:

offset(m, n)=offset(s, t), where offset(a, b) denotes the offset from a first mark a to a second mark b, such that offset(*a*, *b*)=pos(*b*)−pos (*a*).

The basic layout model can be extended by the addition of equal offset rules. Allowing equal offset rules in a layout model makes it very easy to create layouts that are over-constrained.

Equal offset rules are not supported in all implementations, because equal offset rules require a more general layout method which is less efficient than that preferred in the layout engine 105. The layout engine 105 preferably includes minimize distance rules, defined below, instead of equal offset rules as an alternative means for making various offsets equal.

16.5 Rules Involving Centers of Boxes

In the basic layout model, only the edges of boxes participate in the layout rules. It is also desirable to be able to define relationships between the centers of boxes. In an extension to the basic layout model, each box is always associated with two additional marks. These comprise of a vertical mark and a horizontal mark that both pass through the center of the box.

In a model that allows equal offset rules, marks can be associated with the center of each box using equal offset rules, so no additions to the model are needed to support rules involving centers of boxes.

16.6 Fixed Center Rules

As a special case of rules involving centers of boxes, in another implementation, there is an extension to the basic layout model that allows the vertical or horizontal position of the centre of each box to be fixed relative to the page or relative to a side of the page or layout area. This special case avoids the need for equal offset rules, so a simpler method of calculating layouts can be used.

A fixed center rule can be considered to be a relationship between a pair of marks associated with the opposite sides of a box, so additional marks passing through the center of the box do not need to be added to the layout.

16.7 Maximize Offset and Minimize Offset Rules

The basic model layout rules and additional rules described so far are useful for specifying precise constraints such as exact sizes of items and spaces between items and for specifying limits on the variability of positions and sizes of items. With the rules described thus far, defining layouts that are over-constrained or under-constrained can be readily achieved. To give a finer degree of control over layouts, a good strategy is to use the basic model rules and other precise rules such as equal offset and fixed center rules to define an under-constrained layout and add additional, more flexible rules for specifying preferences for sizes and positions of items. Two additional types of rules may be used for this purpose: minimize and maximize rules.

The rules defined so far define constraints that the layout method must obey. Unlike the rules defined above, minimize and maximize rules define the objective function for the layout method.

A minimize offset rule, denoted by minimizeoffset(m, n), indicates to the layout engine 105 that the offset from mark m to mark n should be as small (ie. as negative) as possible. This behavior of this rule will be defined in detail below as it depends on the method of calculating layouts.

A maximize offset rule, denoted by maximizeoffset(m, n), indicates to the layout engine 105 that the offset from mark m to mark n should be as large (ie. as positive) as possible. This behavior of this rule will be defined in detail below as it depends on the method of calculating layouts.

The minimize offset and maximize offset rules are useful for including in linear objective functions and so may be included in layout models suitable for calculation using the simplex method. If a linear objective function is used, then each minimize rule or maximize rule contributes a linear term to the objective function. In this case only one of these two types of rules are necessary because the rule minimizeoffset (m, n) is equivalent to maximizeoffset(n, m). Therefore, the data representation of a layout model that includes these types of rules only needs to support one of these type types of rules. For example, the data structure may only support minimize offset rules, and each maximize offset rule is represented using the equivalent minimize offset rule.

16.8 Minimize Distance Rules

Use of maximize offset and minimize offset rules may lead to layouts where the ideal separation between two marks is infinite, so the rules do not always lead a well-defined layout. To avoid this problem, maximize offset rules and minimize offset rules may be replaced with another type of rule. Alternatively, another type of rule called a minimize distance rule, denoted by minimizedist(m, n) is used to specify that the distance. For instance, the absolute value of the offset, between two marks m and n should be as small as possible. Minimize distance rules only apply between of marks with the same orientation. In a specific implementation, another type of rule called a preferred offset rule, described below, is used instead of using minimize distance rules.

Note that a minimize distance rule can be approximated using fixed offset rules, minimize and maximize offset rules and non-negative offset rules using the following equivalence:

minimizedist(m, n)=minimizeoffset(m, t) and minimizeoffset(n, t) and nonnegative(m, t) and nonnegative(n, t), where t is an extra mark added to the layout and not involved in any other rules. This approximation may not be exact and depends on the exact layout calculation method used. In particular, the exact placement of items calculated by the layout method depends on the objective function chosen.

Note also that a minimize offset rule can also be approximated using a minimize distance rule using the following equivalence:

minimizeoffset(m, n)=minimizedist(t, m) and fixed(t, n, d);

where t is an extra mark added to the layout and d is a large positive number representing a distance much larger than the largest desired distance between m and n. This approximation is not exact and the exact placement of items will depend on the exact implementation of the layout calculation method, but it proves that functionality similar to maximize and minimize offset rules can be provided by adding only minimize distance rules to any layout model that allows fixed offset and non-negative offset rules.

In some implementations, minimize distance rules may also include an extra value indicating the strength of the rule. Such a rule may be denoted as minimizeoffset(m, n, s), where m and n are the marks related by the rule and s is a positive number representing the strength of the rule. In this case, when more than one minimize distance rule affects the position of a mark, stronger rules have a greater influence over the position than weaker rules.

16.9 Preferred Offset Rules

In a specific implementation, another type of rule, called a "preferred offset rule" is used instead of using minimize distance rules. A preferred offset rule, denoted by preferred (m, n, d), specifies that the preferred offset from mark m to mark n is d. A preferred rule can be represented by a minimize distance rule via the following equivalence:

preferred(m, n, d)=fixed(m, t, d) and minimizedist(t, n), where t is an extra mark added to the layout to represent the preferred position of n relative to the position of m.

Conversely a minimize distance rule can be represented using a preferred offset rule via the equivalence:

minimizedist(m, n)=preferred(m, n, 0).

Therefore, adding either minimize distance rules or preferred offset rules to any extension of the basic layout model will result in equivalent models. The preferred offset rules are used instead of minimize distance rules because this representation typically requires less marks and less rules for commonly specified layout relationships.

The preferred offset rules may, as desired, also include an extra value indicating the strength of the rule. Such a rule may be denoted as preferred(m, n, d, s), where m and n are the marks related by the rule, d is a number representing the preferred offset from m to n and s is a positive number representing the strength of the rule. In this case, when more than one preferred offset rule affects the position of a mark, stronger rules have a greater influence over the position than weaker rules. Preferred offset rules with strengths are equivalent to minimize distance rules with strengths via the following equivalences:

preferred(m, n, d, s)=fixed(m, t, d) and minimizedist(t, n, s), where t is an extra mark added to the layout to represent the preferred position of n relative to the position of m, and minimizedist(m, n, s)=preferred(m, n, 0, s)

16.10 Preferred Layout Model

One desirable layout model includes the basic layout model, extended to add the following types of rules defined above:
1. rules for fixing the center of a box horizontally or vertically;
2. shape rules to support boxes containing text and images; and
3. preferred offset rules.

This layout model is flexible enough to support all commonly needed layout features, while being both simple enough for users to understand, simple enough to have a simple data representation and able to support a fast method for calculating positions and dimensions of layout items.

16.11 An Example Layout

Figure 37A:
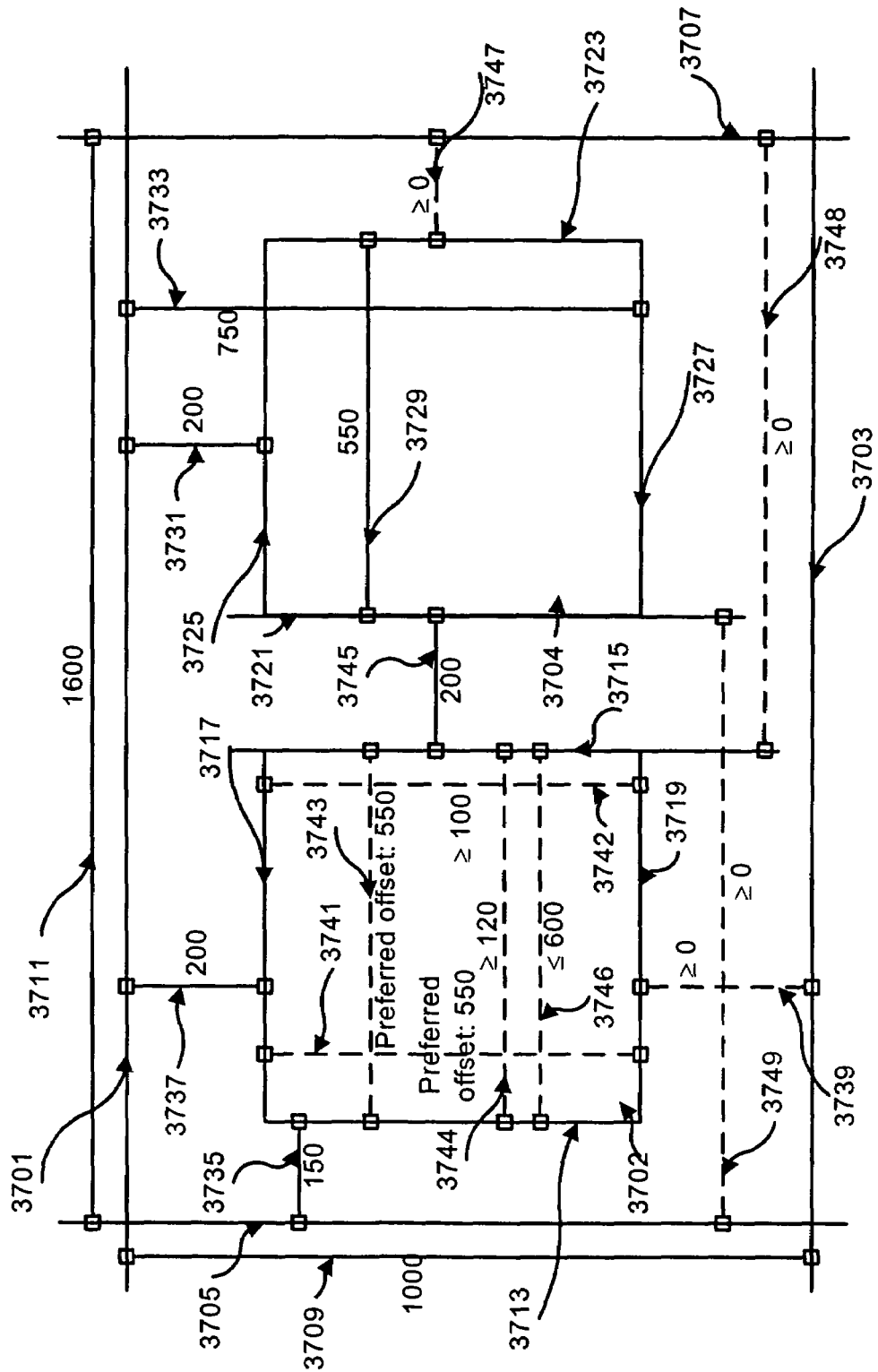
FIGS. 37A to 37D illustrate an example layout corresponding to FIG. 4 and the manner in which the various constraints of the layout may be stored.

FIG. 37A shows how the example layout shown in FIG. 4 is represented in one implementation of the layout engine 105 using boxes, marks and rules. The bounds of the layout area are represented by marks 3701, 3703, 3705 and 3707. A layout area typically represents a part of a page in a template. The height of the layout area is represented by a fixed offset rule 3709. The width of the layout area is represented by a fixed offset rule 3711. The two containers shown in FIG. 4, are represented in the layout engine 105 by two boxes 3702 and 3704 shown in FIG. 37A. The marks 3701 and 3705 are designated as origin marks.

The four edges of the first box 3702 are represented by marks 3713, 3715, 3717 and 3719. The top-left corner of the box 3702 has a fixed position on the page 150 logical units to the right of the left side of the layout area, and 200 units below the top of the layout area. This is represented by the two rules 3735 and 3737. The rule 3735 ensures that the left side of the box 3702 is 150 units right of the left side of the layout area and the rule 3737 ensures that the top of the box 3702 is 200 units below the top of the layout area. The height and width of the box 3743 are not fixed and thus are calculated by the layout engine 105. A minimum offset rule 3744 indicates that the minimum width of the box is 120 logical units. The rule 3742, indicates that the minimum height of the box is 100 logical units. A preferred offset rule 3741 indicates to the layout engine 105 that the preferred height of the box 3702 is 550 logical units. Another preferred offset rule 3743 indicates to the layout engine 105 that the preferred width of the box 3702 is also 550 logical units. The preferred width and height of the box are determined from the content of the container that the box represents. A minimum offset rule 3739 tells the layout engine 105 that the bottom edge of the box 3702 must not be below the bottom of the layout area represented by the mark 3703.

The four edges of the second box 3704 are represented by the marks 3721, 3723, 3725 and 3727. The positions of the top and bottom edges of the box 3704 are fixed relative to the layout area. The position of the top edge is represented by mark 3725. The top edge is fixed at 200 logical units below the top of the layout area by the fixed offset rule 3731. Similarly, the bottom edge of the box is fixed at 750 logical units below the top of the layout area by the rule 3733.

The width of the box 3704 is fixed at 550 logical units by the fixed offset rule 3729, but the positions of the left and right sides of the box are not fixed and must be calculated by the layout engine 105. The minimum offset rule 3747 indicates to the layout engine that the right edge of the box represented by mark 3723 must not extend past the right edge of the layout area represented by the mark 3707.

Additional minimum offset rules 3748 and 3749 ensure that variable edges remain inside the layout area. In the example, these rules are redundant, and in some implementations, redundant rules may be removed before calculating the layout. Detecting redundant rules may be done by temporarily removing the rule and using the push operation to determine whether the rule could be violated by pushing the affected marks. If the rule cannot be violated using the push operation, then the rule is redundant.

The strut 412 is represented by the fixed offset rule 3745. This rule indicates to the layout engine 105 that the distance between the two boxes 3702 and 3704 must be 200 logical units.

Figure 37B:
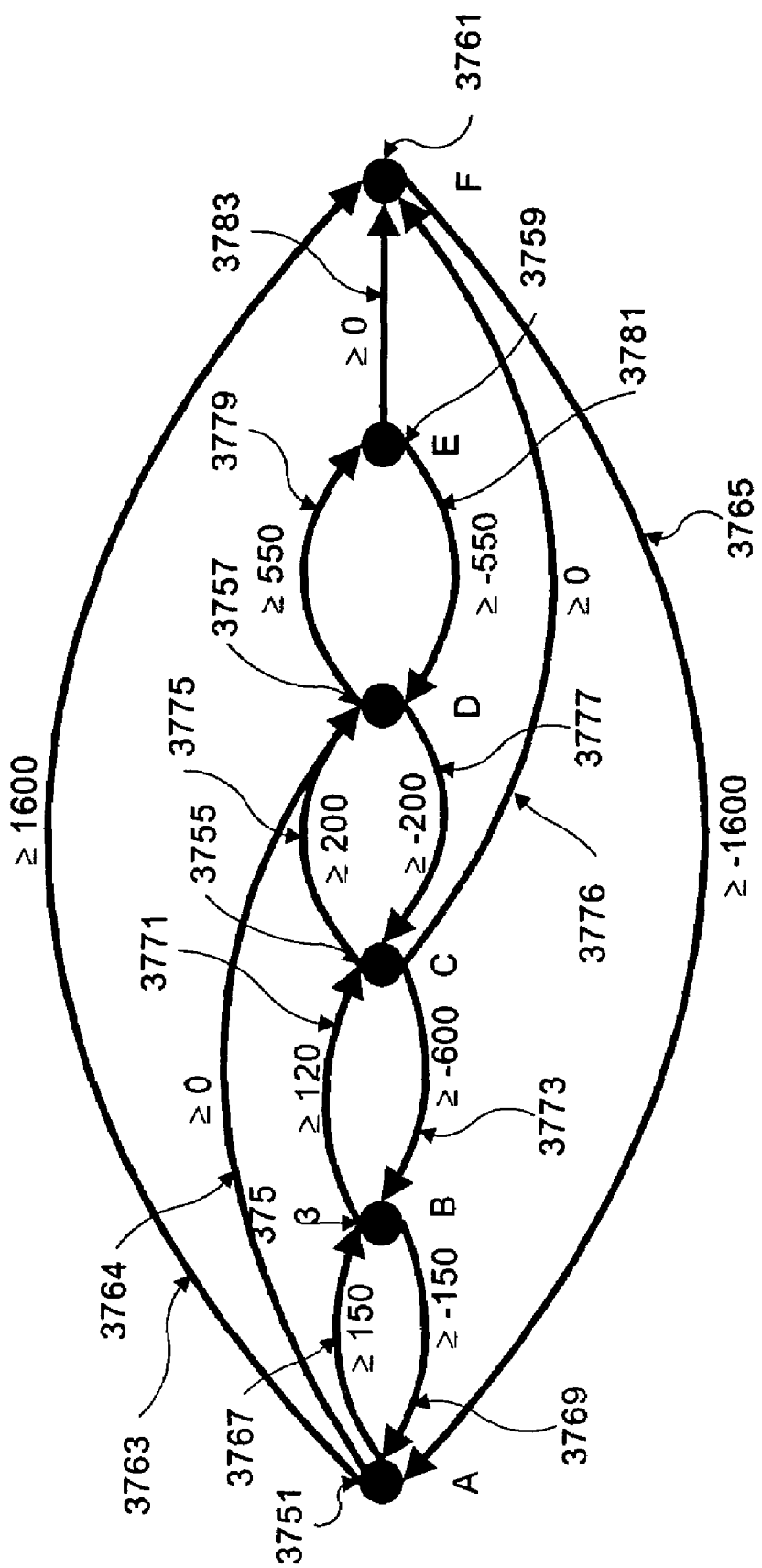

FIG. 37B shows the graph that represents the horizontal offset rules shown in FIG. 37A. Another similar graph (not illustrated) may be used to represent the vertical offset rules. The vertex 3751 represents the mark 3705 corresponding to the left edge of the layout area. The vertex 3761 represents the mark 3707 corresponding to the right edge of the layout area. The vertex 3753 represents the mark 3713 corresponding to the left edge of the box 3702. The vertex 3755 represents the mark 3715 corresponding to the right edge of the box 3702. The vertex 3757 represents the mark 3721 corresponding to the left edge of the box 3704. The vertex 3759 represents the mark 3723 corresponding to the right edge of the box 3704.

The fixed offset rule 3735 is represented by a pair of minimum offset rules represented by graph edges 3767 and 3769. The minimum offset rule 3744 is represented by the graph edge 3771 and the maximum offset rule 3746 is represented by the graph edge 3773. The fixed offset rule 3745 is represented by the graph edges 3775 and 3777. The fixed offset rule 3729 is represented by the graph edges 3779 and 3781. The minimum offset rule 3747 is represented by the graph edge 3783.

Figure 37C:
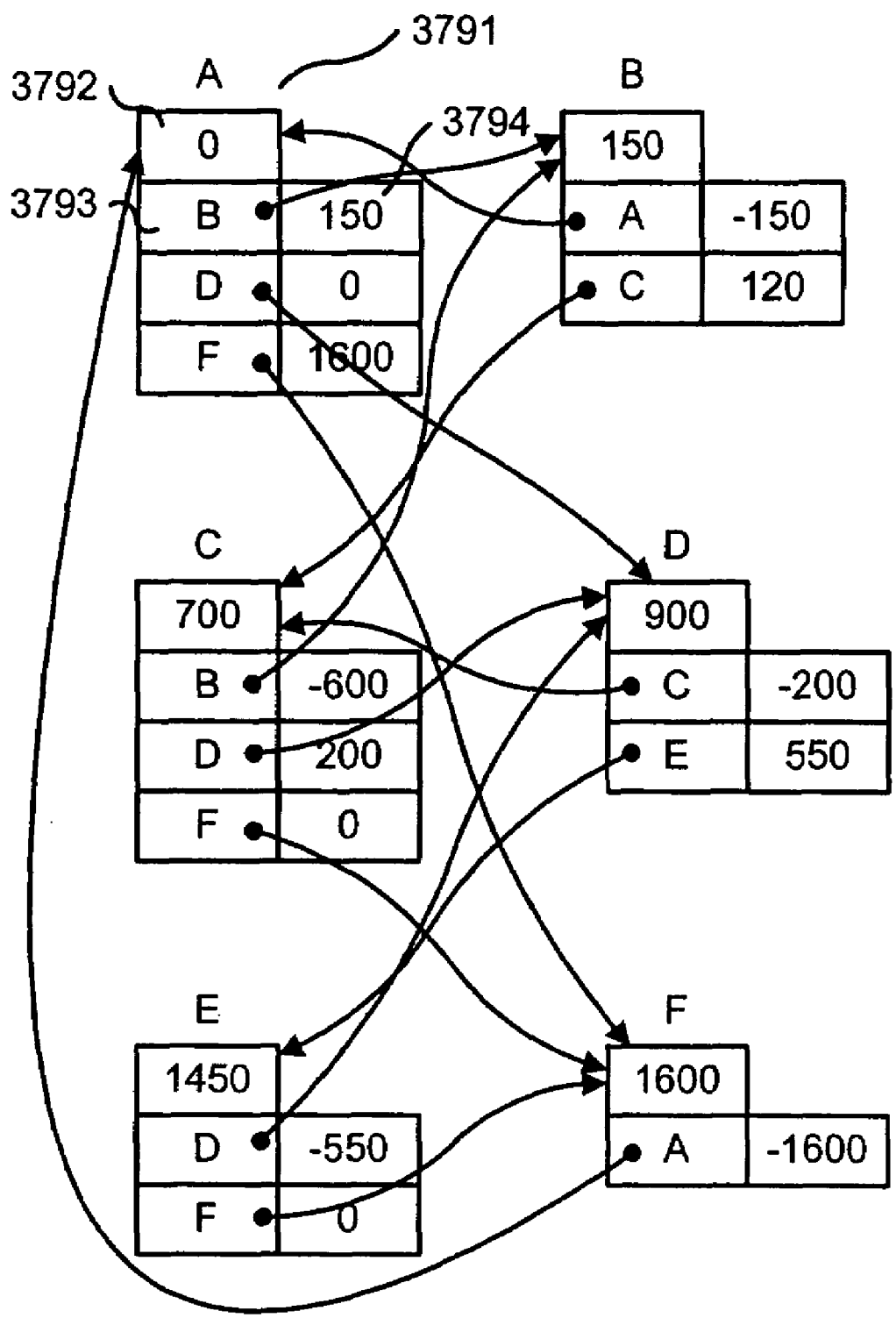

FIG. 37C shows the memory structure used to store the graph shown in FIG. 37B. Each graph vertex is represented by a data structure e.g. 3791 containing at least the position of the mark that the vertex represents plus an adjacency list representing the edges that leave the vertex. The adjacency list consists of records, each representing one edge, containing at least a pointer, such as the pointer 3793, to the destination vertex and the minimum allowed offset (e.g. 3794) from the source vertex to the destination vertex. Since the sizes of the adjacency lists vary, these are stored as linked lists. The links between adjacent records are not explicitly shown in FIG. 37C.

Figure 37D:
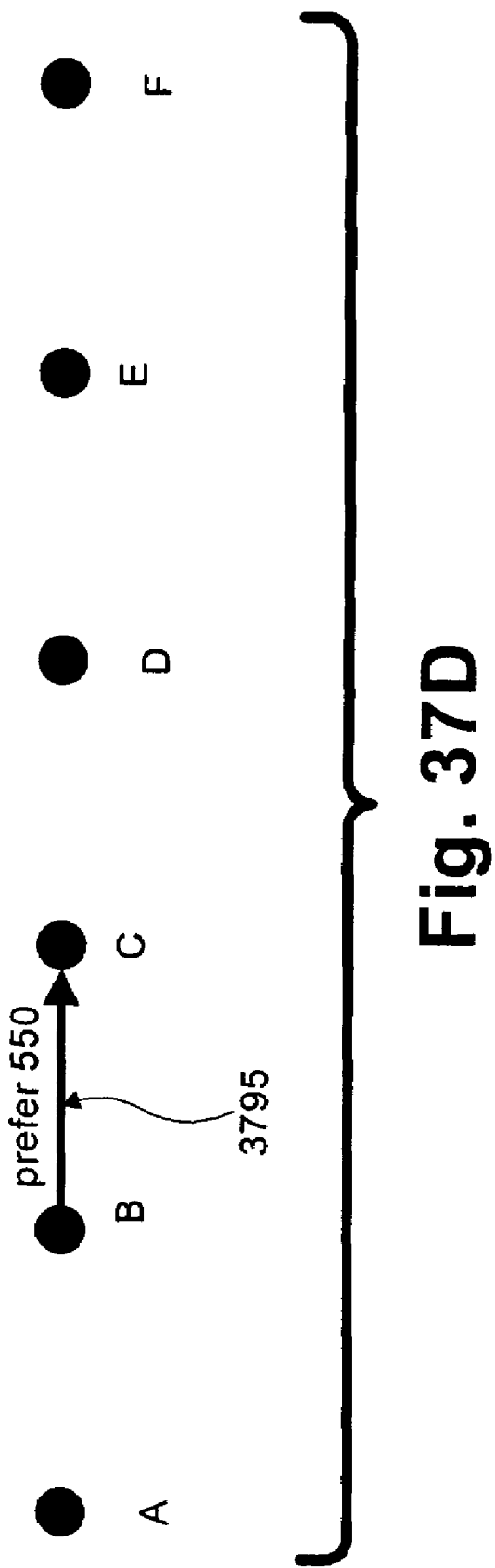

The preferred offsets are stored in a separate graph as shown in FIG. 37D. Each preferred offset is represented by an edge in the graph, such as the edge 3795. The data structure for storing the preferred offset graph is similar to the data structure used for storing minimum offset rules. Corresponding vertices in the two graphs are linked by pointers (not explicitly shown). In some implementation, extra edges are added to each graph to ensure that each edge has a reverse edge. This is to make it possible to efficiently traverse the graph in a forwards or backwards direction.

17. Detailed Description of Layout Creation and Editing

17.1 Basic Operations for Creating and Editing Layouts

The simplest approach to creating and editing layouts is to allow any kind of item to be added or removed and to allow any kind of rule allowed by the supported layout model to be added or removed. In this approach, only minimum consistency checking is required to prevent the layout data structure from becoming inconsistent when an item is removed from the layout by automatically removing any rules involving the item being removed. In this approach, there is no guarantee that it is possible to determine positions and dimensions for the items that satisfy all of the rules.

It is also useful to avoid layouts that contain redundant information because this can reduce the complexity of the layout so that it is simpler for the user to understand, and the process of removing redundant information can provide feedback to the user to make the layout clearer to the user. Redundant information can also increase the size of the data structures representing the layout and can slow down the layout calculations.

The directed graph structure (FIG. 24) described for representing layouts involving rules from the basic layout model automatically provides a means of disallowing some types of redundant information. A graph does not allow more than one directed edge with the same source and destination vertices. This prevents more than one minimum offset rule from being applied to the same offset. If there is more than one minimum offset rule between the same pair of marks (in the same order, i.e. having the same first mark and the same second mark), then one of the rules is redundant because only the rule having the most negative minimum offset value is required.

The operation for adding a minimum offset rule preferably automatically replaces any existing minimum offset rule already represented with the same source and destination vertex with the newly added rule. Alternatively, the operation of adding a minimum offset rule to an existing layout does nothing if there is already a minimum offset rule with a smaller (ie. more negative) minimum offset value for the same offset.

In a specific implementation, operations are supported for adding and removing all of the types of rules supported by the basic layout model. Those rules comprise fixed offset rules, non-negative offset rules and maximum offset rules, although these are all represented using minimum offset rules. For example, the operation of adding a fixed offset rule is implemented by adding two corresponding minimum offset rules. Operations are provided to fix or unfix the position of any mark. Fixing the position of a mark is equivalent to adding a fixed offset rule between the mark and the origin mark of the same orientation. Operations are also provided for independently fixing the horizontal or vertical position of the center of any box. Many combinations of layout creation and editing operations are also possible.

The horizontal position of the center of a box may be effectively fixed for various reasons. For example, if the horizontal positions of the two vertical sides of the box are fixed relative to the layout area, the horizontal position of the box and width are completely determined and so, the horizontal position of the center of the box is also fixed. In this case, the operation for making the horizontal position center of the box fixed relative to the layout (ie. adding a fixed center rule), may do nothing because the rule is redundant. The same applies to fixing the vertical position of the center of the box.

In one implementation, operations for adding and removing preferred offset rules and minimize distance rules are also supported. In this implementation, minimize distance rules are represented using the equivalent preferred offset rule. Preferred offset rules may be represented in a directed graph where each vertex represents a mark and each preferred offset rule is represented by an edge connecting the vertices corresponding to the marks related by the preferred offset rule. Since a directed graph only allows a single edge with the same source and destination vertices, this might seem to be inadequate to represent layouts with more than one preferred offset rule relating the same two marks, but it turns out that in a specific implementation where preferred offset rules include a strength, any two preferred offset rules relating the same two marks can be replaced by a single equivalent preferred offset rule via the equivalence:

preferred(m, n, d, s) and preferred(m, n, d', s')=preferred(m, n, D, S), where $$D = \frac{sd + s'd'}{s + s'}, \text{ and } S = s + s'.$$

This equivalence is valid when the preferred layout calculation is performed.

17.2 Example Based Layout Creation and Editing

When creating and editing layouts, it is desirable to avoid creating over-constrained layouts because such layouts are not useful for producing documents. The process of avoiding conflicting rules can also provide feedback to the user to improve the user's understanding of the layout being created. Avoiding inconsistent rules during creation of the layout can also reduce the amount of work involved for the user by automatically preventing mistakes.

Example based editing may be used in certain implementations to avoid over-constrained layouts. Example based editing is where the operations for creating and editing layouts are always operating on an example of the layout that obeys all constraints. Note that minimize offset rules, maximize offset rules, minimize distance rules and preferred offset rules do not impose constraints on the layout and can be ignored for the purpose of avoiding over-constrained layouts. In a variable data printing application, this might be done by allowing the user to build an example layout showing a preview of a document. The preview might be a display of one of the documents resulting from combining actual data with the document template, or the preview may contain sample data that is only similar to data expected to be inserted into the document template, or alternatively, only the sizes and positions of items might be approximately the same as expected in the actual documents to be produced from the template.

The positions and dimensions of newly created items are preferably specified when items are created, so example positions of items are always known. To store these values, each vertex of the graph used to represent the layout is labeled with the position of the corresponding mark. In addition, rules may only be added if they do not conflict with the current positions and dimensions of the items. For example, a minimum offset rule may only be added to the layout if the current positions of the marks involved obey the minimum offset rule. Similarly, when a fixed offset rule is added, the offset value must be equal to the offset between the marks related by the rule. When the horizontal or vertical position of center of a box is fixed, the position and dimensions of the box are known and the horizontal or vertical center is fixed, based on the actual position of the center of the box at the time the operation of adding the rule is performed.

The user may indicate, via the interface 103, a change to the layout that may require rules to be added to the layout. If the example layout indicated by the user does not satisfy the rules to be added, the layout is automatically adjusted, if possible, so that the newly added rules are consistent with the layout. For example, when the user changes the width of a fixed width container, either via a dialog box or by dragging an edge of the box, the positions of the items are modified and the rules are updated as well. This may require several layout operations such as removing some existing rules, changing the positions of the marks involved, and adding new rules. For example, when changing positions of marks, the application 121 will first remove any rules that would be violated if the position of the marks were to be changed, update the position of the marks and add new rules that are consistent with the new positions of the marks.

When editing or creating layouts, it is sometimes necessary to move a mark or more than one mark relative to another mark or relative to the layout origin without violating any constraints. This can be quite a complex operation if the marks to be moved are affected by numerous constraints. The layout engine 105 desirably provides an operation called "push" that moves a set of marks a given distance either horizontally or vertically without violating any constraints and also moves other marks not in the original set if necessary to achieve the requested result.

17.3 The Push Operation

The push operation is implemented by the layout engine 105 in response to input from the user interface 103 to move a set of marks a given distance either horizontally or vertically without violating any constraints and also moves other marks not in the original set, if necessary, to achieve the requested result.

The push operation operates on a set of marks all of the same orientation, and may be described in terms of a graph, called the push graph. Given an example layout defined by a collection of marks and minimum offset rules together with positions assigned to each mark in the layout, a corresponding push graph may be defined. The push graph is a directed graph where each vertex corresponds to a mark in the layout, and each edge corresponds to a minimum offset rule where the actual offset is equal to the minimum value allowed by the minimum offset rule.

The push graph for a layout is a directed graph whose edges indicate which marks can directly push others of the marks forming the layout. A first mark can directly push a second mark (in a positive direction) if increasing the value of the coordinate of the first mark would result in violating a minimum offset rule between the first and second marks, this being when the offset between them is already at the minimum allowed. Note that it is assumed that all basic model rules have been replaced with equivalent minimum offset rules when creating or editing the layout.

When moving a mark in a positive direction (ie. increasing its coordinate value), any marks corresponding to vertices reachable from its corresponding vertex in the push graph must also be moved by the same distance to avoid violating any minimum offset rules.

When moving a mark in a negative direction (ie. decreasing its coordinate value), any marks reachable from its corresponding vertex in the reverse of the push graph must also be moved by the same distance and direction to avoid violating any minimum offset rules. The reverse of the push graph is the same as the push graph except the directions of the edges are reversed.

A variety of methods of determining reachable vertices in a directed graph may be used to implement the above.

The push operation works by moving groups of marks without violating any minimum offset rules. To calculate the range of allowed movement for a group of marks, a quantity called the "slack" is defined for each minimum offset rule. Given any minimum offset rule $min(m, n, d)$, then the slack for the rule is given by $offset(m, n)-d$. The slack is the maximum distance that mark m can be moved (in a positive direction) before the rule is violated, and is also the maximum distance that mark n can be moved in a negative direction (i.e. the maximum amount by which the coordinates can be decremented) before the rule is violated. The slack for a minimum offset rule is always a non-negative number if the rule is not violated in the example layout. Each edge in the push graph corresponds to a rule with a slack of 0.

The maximum positive allowed movement, for a set of marks is the minimum of the slack values of all minimum offset rules $min(m, n, d)$, where m is in the set and n is not in the set. This is the maximum distance by which the marks can be moved in a positive direction without moving any other marks not in the set and without violating any minimum offset rules. The maximum distance by which a set of marks can be moved in a negative direction can be similarly defined as the minimum of the slack values of all minimum offset rules of the form $min(n, m, d)$, where m is in the set and n is not in the set. If there are no minimum offset rules limiting the movement of a set of marks in a given direction, then the maximum distance is infinity (ie. there is no limit on how far the marks can be moved).

The push operation keeps track of a current set of marks to be moved, and a distance to push which is the remaining distance that it must push the marks in the current set. The set of marks and the distance to push are updated as the steps in the operation are performed. The push operation moves the marks in one or more increments. The distance of the move in each increment is determined from the maximum allowed movement of the current set of marks. Additional marks that can be pushed by the marks in the set are added to the set before each increment, so a different set of marks is moved at each increment.

Figure 25:
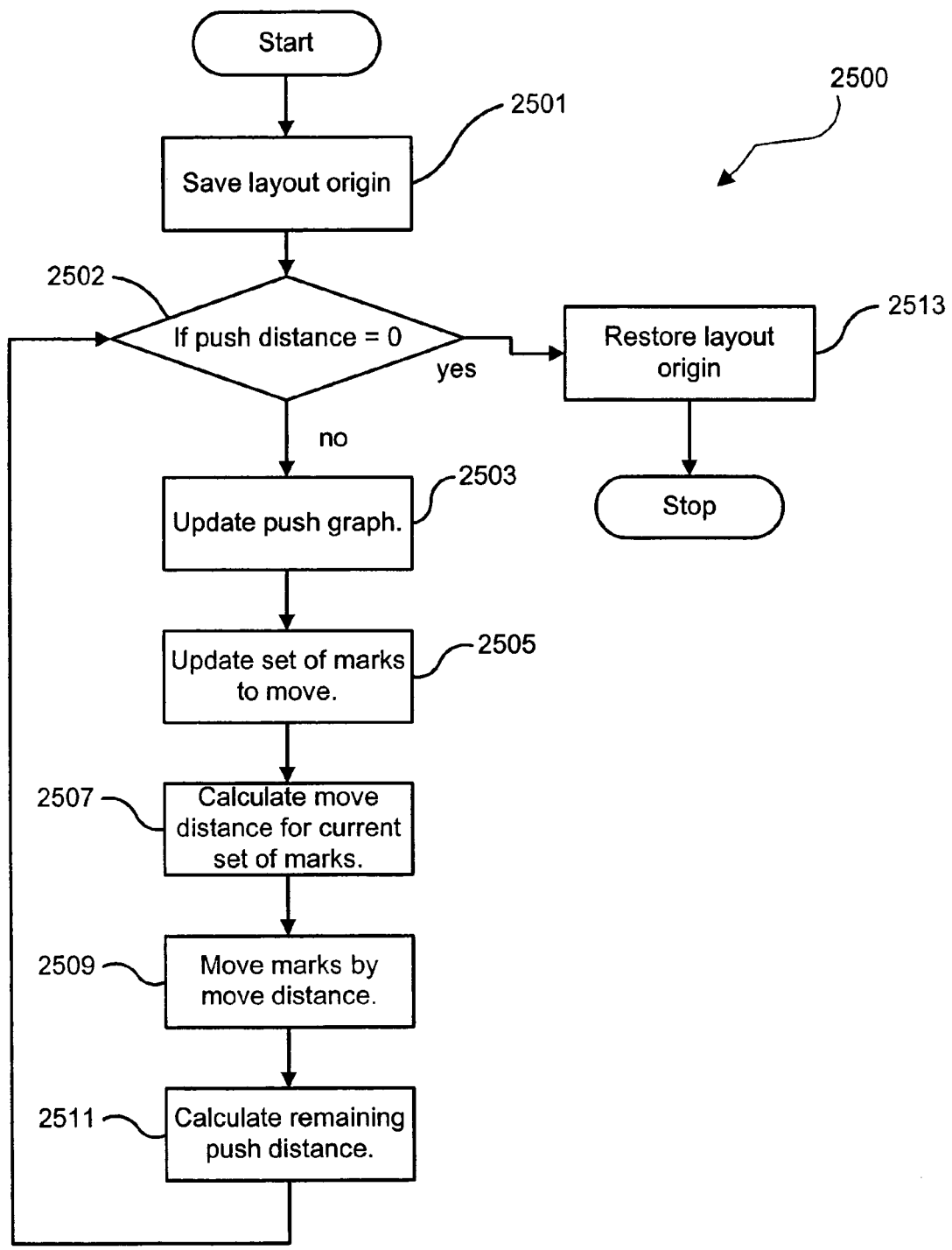
FIG. 25 shows the steps involved in performing the push operation.

FIG. 25 shows a method 2500 involved in a first implementation of the push operation. The push operation starts at step 2501 where the origin for the layout is saved. Since the push operation can change the position of the mark that defines the coordinate system, this mark and its position are remembered so that the coordinate system can be restored later in step 2513. After step 2501, the push operation continues to step 2502, where the remaining distance to push is compared with 0. If the remaining distance to push is 0, there is nothing to be performed and the operation proceeds to step 2513 where the origin of the coordinate system is restored. This is done by moving all marks in the layout by an appropriate value to restore the original position of the origin mark that was saved in step 2501. If the distance to push tested in step 2502 is not 0, the operation proceeds to step 2503, where the push graph is updated based on the current positions of the marks in the layout. The operation then proceeds to step 2505. In step 2505, the set of marks to be moved is updated by adding any additional marks that can be pushed in the push direction by any mark in the current set. For instance, any mark whose corresponding vertex is reachable in the push graph (or the reverse of the push graph if the distance to move is negative) from a vertex corresponding to any mark in the current set is added to the current set of marks. The operation continues to step 2507 where the distance for the current increment is calculated. The distance for the increment is the smaller of the remaining push distance and the maximum allowed move distance for the current set of marks in the given direction. This distance is always positive if the push distance is positive. After the distance to move is calculated, the operation continues on the set 2509, where all marks in the current set are moved by the distance calculated in step 2507. After step 2509, the operation proceeds to step 2511, where the remaining push distance is calculated by subtracting the distance moved from it. After step 2511, the operation returns to step 2502, where the distance calculated in step 2511 is tested to determine if another iteration if required.

The version of the push operation described in FIG. 25 can never fail, but if the origin mark is moved during the operation, the behavior of the operation is unintuitive. For example, if a group of marks is pushed to the right, instead of the marks moving to the right, other marks might move to the left instead. This behavior is caused by step 2513, restoring the origin. In practice, this behavior is sometimes useful. For example, to make a box wider by 10 distance units, pushing the right edge of the box 10 units to the right will make the box wider by 10 units if it is possible to do so, even if the right edge cannot be moved by as much as 10 units. In this regard, if the right edge can only move 3 units to the right, but the left edge can move 7 units to the left, the push operation will automatically move the left edge to the left. The side effect is that other items may also move.

It is also useful to have another version of the push operation that does not move origin marks. This is described in FIG. 26 by a method 2600. This implementation of the push operation proceeds in the same way except that steps 2501 and 2513 are omitted because they are redundant, but includes an additional test, step 2606, that is inserted between steps 2505 and 2507. The test of step 2606 determines if the current set of marks contains the origin mark. If so, the operation stops and fails because the marks could not be pushed as far as requested without moving the origin mark.

FIGS. 27A and 27B, 27C and 27D, and 27E and 27F together give an example of how the push operation works. These figures show a layout formed of two containers, a variable width container 2701 with minimum width 15 units and a fixed width container 2704 with width 20 units. The container 2701 is represented by a box with left and right sides associated with marks A and B. The container 2704 is represented by a box with left and right sides represented by marks C and D. These figures also show the edge of the page 2707 represented by a mark E.

FIG. 27A shows the initial state of a layout before the push operation has started. Item 2701 has a minimum width of 15 units represented by the minimum offset rule 2702. Item 2704 has a fixed width of 20 units represented by the fixed offset rule 2705. The two items 2701 and 2704 are connected by a strut of length 6 layout units represented by a fixed offset rule 2703. There is an additional minimum offset rule 2706 between item 2704 and the edge of the page 2707 represented by the mark E with minimum length 15 units. This rule prevents item 2704 from getting closer than 15 units to the edge of the page. The actual distance is 20 units before invoking the push operation. The steps of the push operation are illustrated for pushing mark A 15 units to the right. A push graph 2709 for the layout is also shown in FIG. 27B. The graph 2709 shows the vertices representing marks B and C connected by edges in both directions because of the fixed offset rule 2703. The vertices representing B and C are also connected in both directions because of the fixed offset rule 2705.

FIG. 27C shows the result of the first iteration of the loop. In the first iteration, at step 2503, the push graph 2709 is calculated. At step 2505 it is determined from the push graph that mark A does not push any other marks and can move by itself. In step 2507, it is determined that the maximum distance that mark A can be moved without violating the minimum offset rule 2702 is 3 units. Since this is less than the requested distance, mark A is moved 3 units in step 2509 resulting in the layout shown in FIG. 27B. The remaining distance calculated in step 2511 is now 12 units. In the second iteration of the loop, at step 2503, the push graph 2711 shown in FIG. 27D is calculated. In this graph mark A now pushes mark B, because the slack in rule 2702 is now zero, and consequently mark A also pushes marks C and D.

Figure 27E:
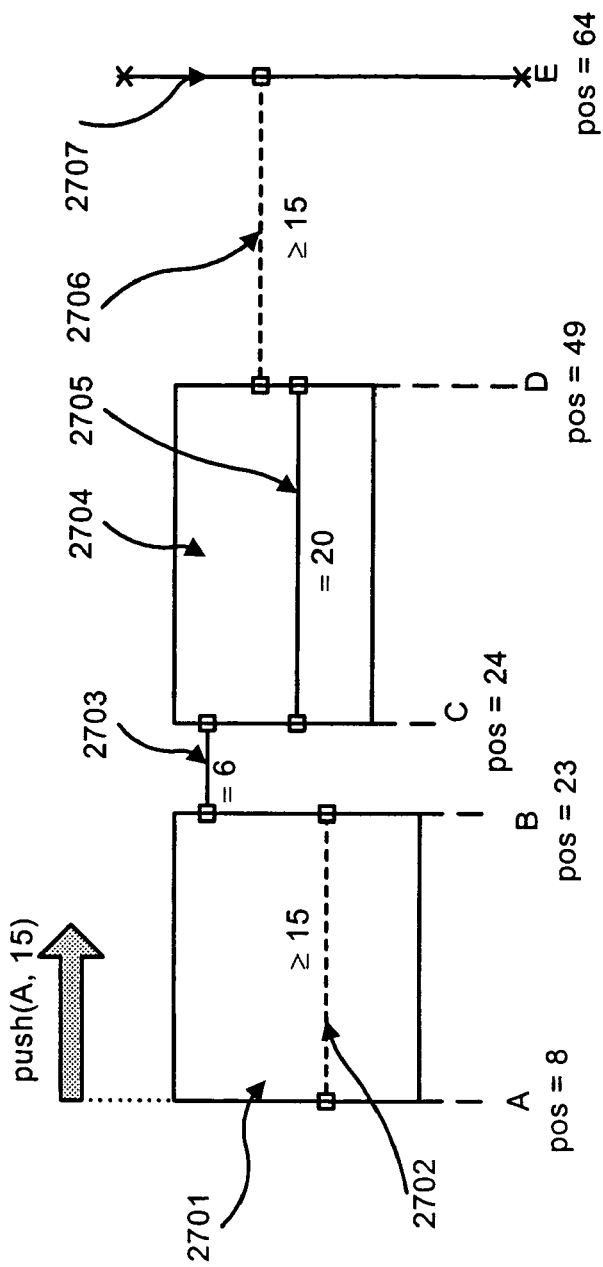
Figure 27F:
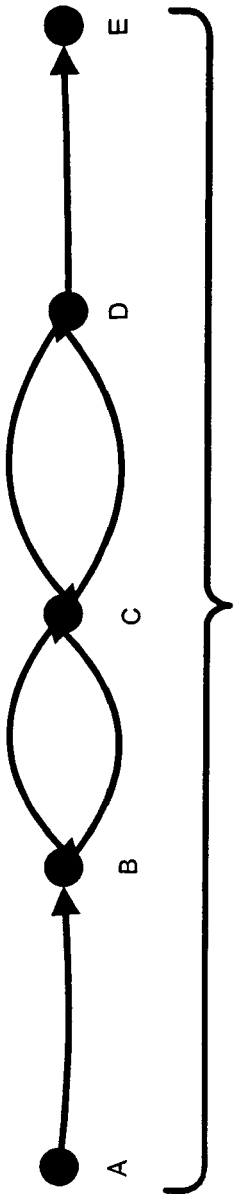

FIG. 27E shows the result of the second iteration of the loop where it is determined that marks B, C and D are now all pushed by mark A, so all four marks must be moved together. At step 2507, it is determined that marks A, B C and D can be moved a maximum distance of 5 units without violating the second minimum offset rule 2706 between mark D and the edge of the page 2707 represented by mark E. The remaining distance is 12 units, but mark D can only move 5 units, so marks A, B, C and D are each moved 5 units. In step 2511, the remaining distance is calculated at 7 units. In the third iteration of the loop, in step 2503, the push graph 2713 shown in FIG. 27F is calculated. In this graph all marks now are pushed by mark A.

Figure 26:
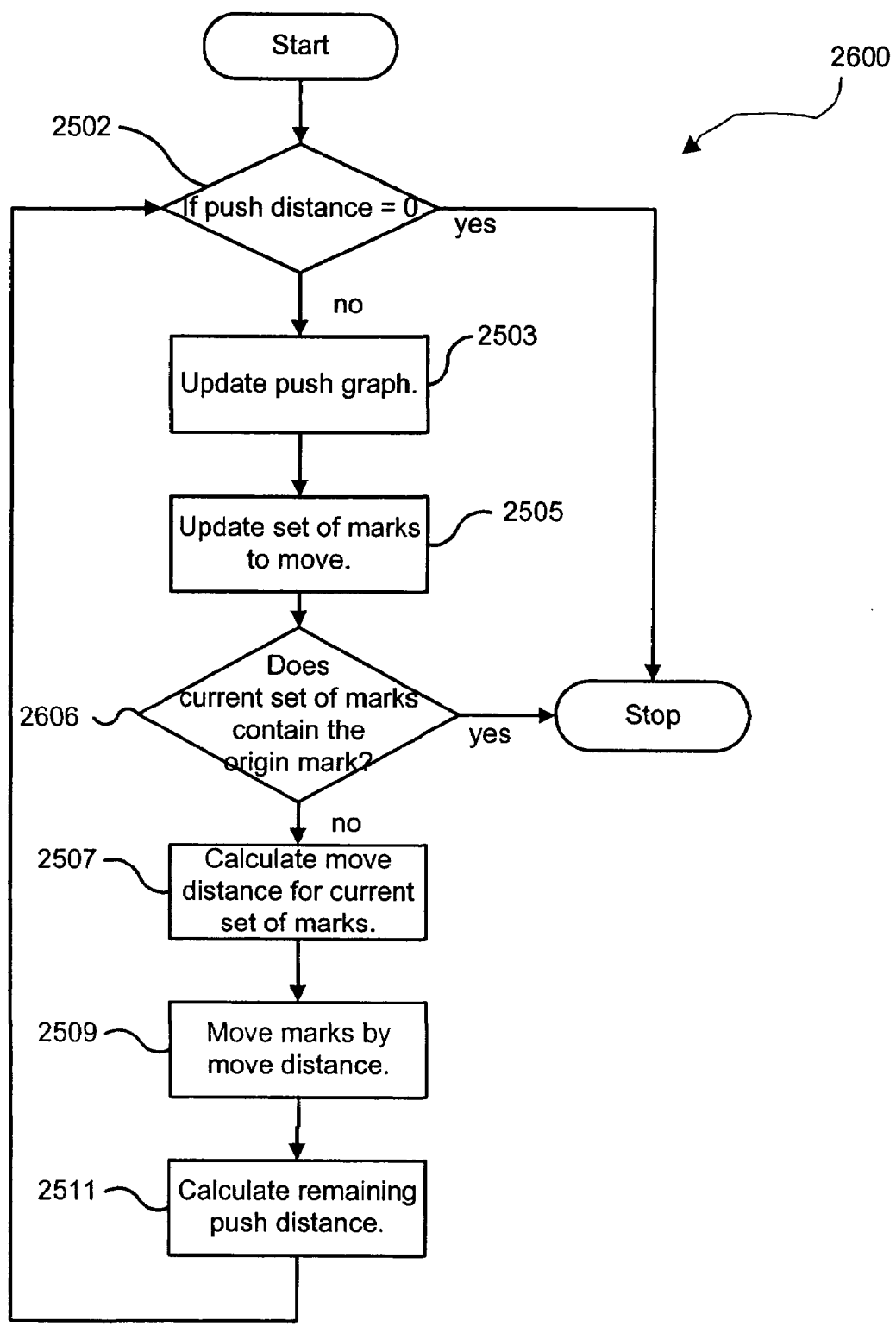
FIG. 26 shows the steps involved in an alternative implementation of the push operation.

In the second version of the push operation shown in FIG. 26, the test 2606 determines that the origin mark E is included in the set of marks to move, so the operation stops. In the first version of the push operation shown in FIG. 25, the third iteration of the loop results in all marks being moved by the remaining 7 units in step 2509, and in the following step 2511, the remaining distance is now calculated as zero, so the test in step 2502 causes the process to go to step 2513 where the position of the origin mark E is restored by moving all marks to case, the left by 7 units. In this example, both version of the push operation, produce the same result. In is example, mark A could only be pushed a total of 8 units instead of the requested 15 units.

17.4 The Push Operation with Fixed Centers

In layout models incorporating fixed center rules, the push operation needs to be modified to be aware of fixed centers. If the horizontal position of the center of a box is fixed, then the left and right sides of the box must always be moved in opposite directions by equal amounts, such marks are said to be "opposed" to each other, or are said to be "opposing" marks. Similarly, if the vertical position of the center of a box is fixed, then the top and bottom sides of the box must always be moved in opposite directions by equal amounts.

To adapt the push operation to incorporate fixed centers, the set of marks to be pushed is replaced by two sets of marks. One set of marks, the forward set, is pushed in a positive direction and the other set of marks, the opposing set, is pushed in a negative direction. In step 2505, marks are added to each of the two sets of marks as follows. If a mark is opposed to a mark contained in one of the two sets, the opposing mark is added to the other set as well as any marks that are pushed by the opposing mark.

Figure 32:
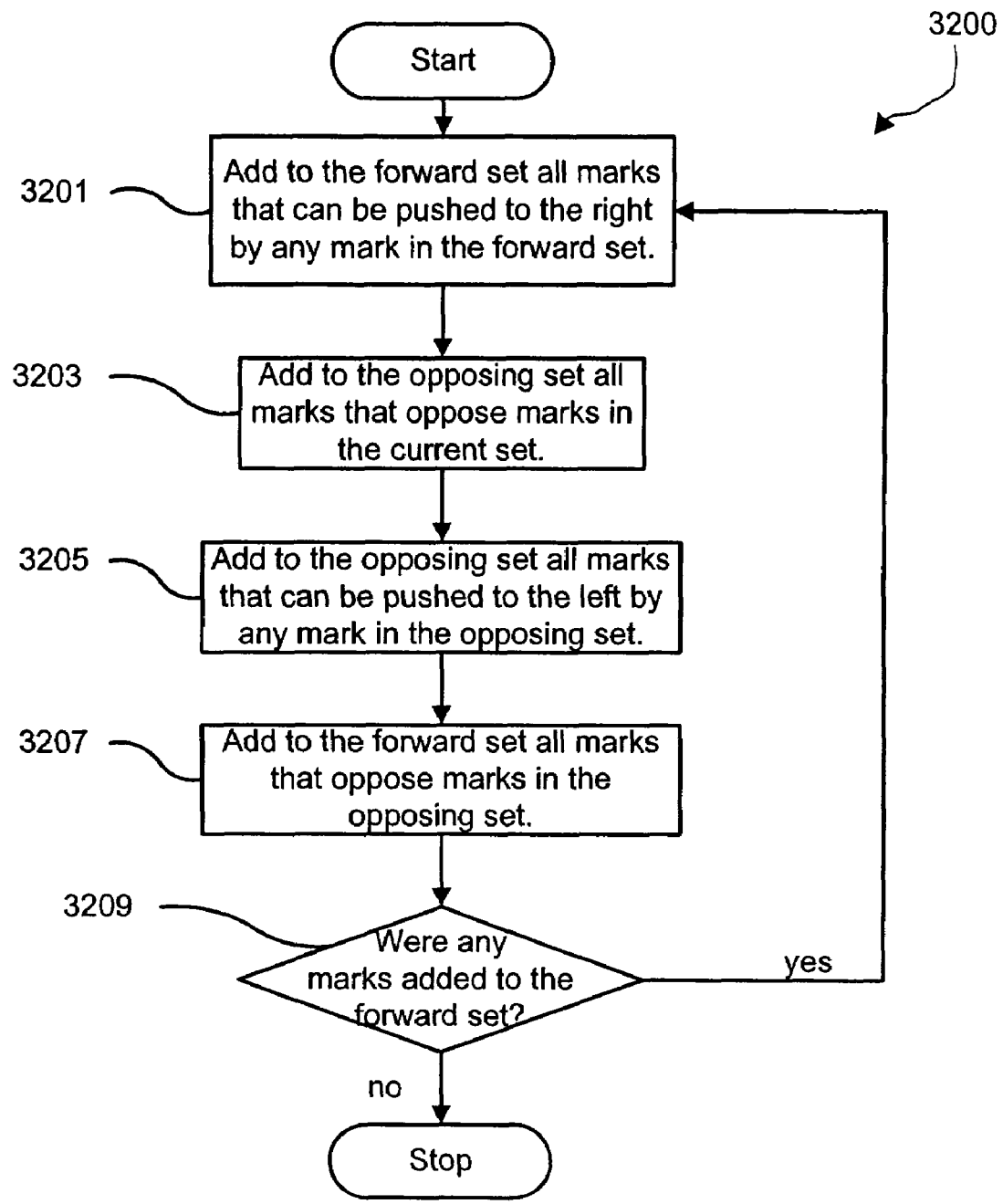
FIG. 32 shows the steps involved in calculating the set of forward and opposing sets of marks that are pushed when a set of marks is pushed to the right.

FIG. 32 shows in more detail a method 3200 of how the two sets of marks are determined when fixed center rules are allowed, such as used in step 2505. In FIG. 32, it is assumed that the initial set of marks to push are vertical marks and that they are being pushed to the right and it is assumed that the coordinate system is increasing to the right. Pushing marks in other directions and orientations is performed similarly. In step 3201, all marks pushed by the current set of marks are added to the forward set (ignoring fixed center rules). Step 3201 may be calculated using the push graph, by finding all vertices reachable from the set of vertices representing the forward set of marks. In addition, if any two opposing marks are included in the forward set, then the origin mark is also added to the set. Following step 3201, in step 3203, all marks opposing any mark in the current set are added to the set of opposing marks. In addition, if any two opposing marks are included in the opposing set, then the origin mark is also added to the opposing set. Adding the origin mark to either set effectively causes the push operation to terminate after the test in step 2606. Following step 3203, in step 3205, all marks pushed to the left by marks in the opposing set are added to the opposing set. This is done in the same way as in step 3201, except the reverse of the push graph is used because the marks are being pushed in a negative direction (ie. their coordinates are being decreased). Following step 3205, in step 3207, any marks that oppose marks in the opposing set are added to the forward set. Step 3207 is the converse of step 3203. Following step 3207, in step 3209, a test is performed to check if new marks were added to the forward set in step 3207. If so, the calculation returns to step 3201 so that steps 3201, 3203, 3205 and 3207 will be repeated until no more new marks are added to either of the two sets.

In step 2507, the move distance is calculated independently for the two sets and the smaller of the two distances (ie. smaller in magnitude) becomes the distance to move. In step 2509, the marks are moved the same distance but in opposite directions. The marks in one set are moved in a positive direction and the marks in the other set are moved in a negative direction.

17.5 The Push Operation with Shape Rules

Since shape rules relate horizontal and vertical marks, adapting the push operation to incorporate layout models with shape rules is potentially complicated. The problem is that when pushing marks, complex interactions between marks of the same orientation may result from combinations of shape rules and other rules. In particular, it is possible to create circular dependencies that have no single solution. To avoid this problem, a restriction is placed on the layout model that shape rules are only applied to boxes where at most one mark corresponding to a vertical side and at most one mark corresponding to a horizontal side appears in a minimum offset rule. That is, at least one of each pair of opposite sides of a shape rule box must be free of minimum offset rules. This restriction prevents any complex relationships between marks due to shape rules. With this restriction, the push algorithm may be modified so that shape rules are applied whenever any side of a box involving a shape rule is moved in step 2509. The shape rules are applied by moving the free edges of the box, where a free edge is an edge that is not involved in any minimum offset rules.

17.6 Using the Push Operation for Editing Document Templates

Figure 34:
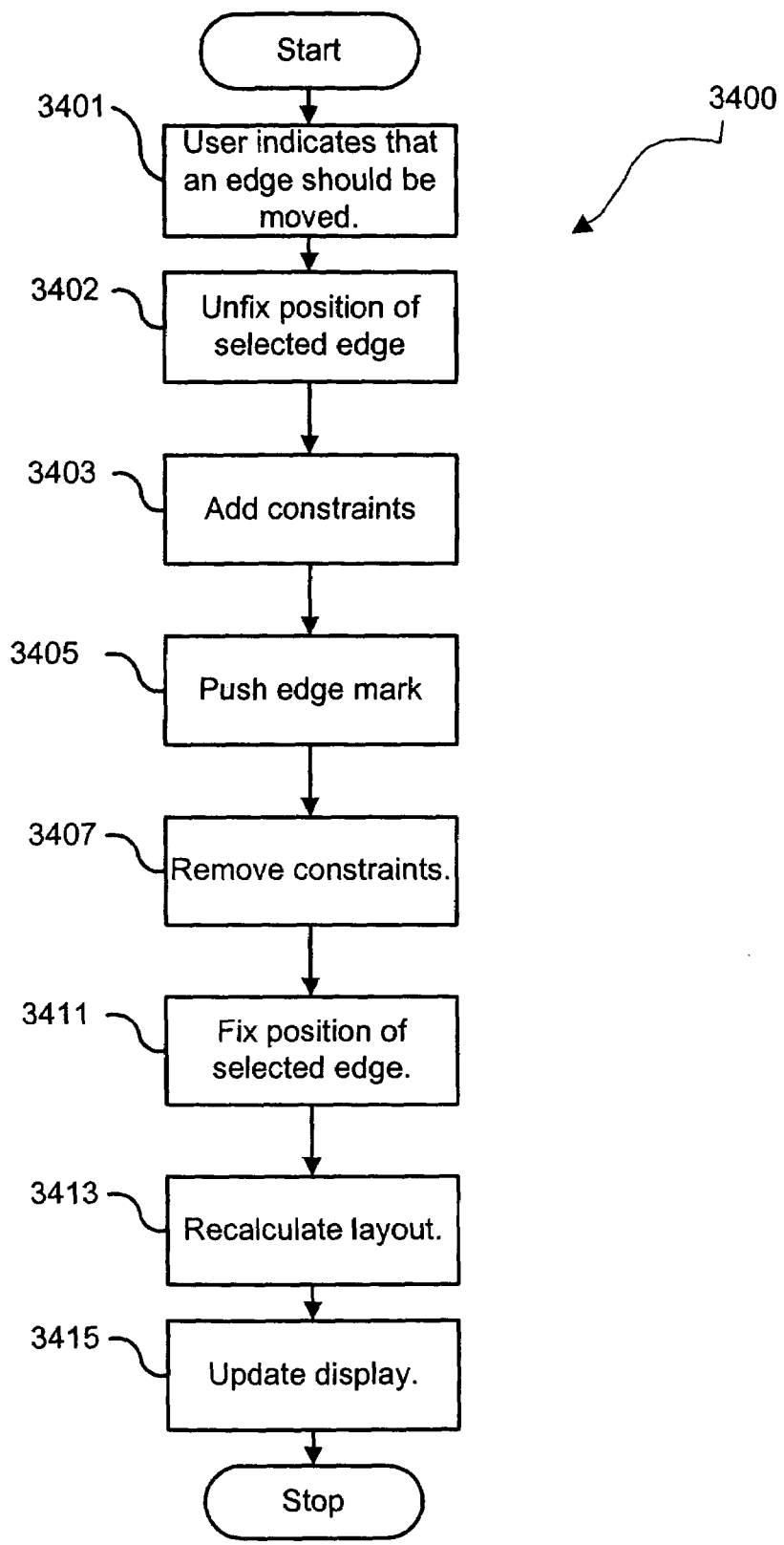
FIG. 34 is a flowchart of modifying an edge position of a container in a layout and the interaction with other edges.

The GUI 301 uses the push operation to modify an example layout while the user is editing a document template. FIG. 34 shows an example method 3400 of how the GUI 301 allows the user to move a fixed edge of a container. At step 3401, the user indicates that the edge should be moved, for example by selecting and dragging the edge with the mouse 133 and pointer 313. Following step 3401, at step 3402, the application 103 unfixes the position of the mark corresponding to the edge being moved. The position of an edge is typically made fixed by adding a fixed offset rule that fixes the offset between the mark representing the edge and the origin mark with the same orientation as the edge. To unfix the edge, the fixed offset rule is removed to allow the position of the edge to be changed. Following step 3402, at step 3403, extra constraints are added to the layout engine 105 to limit the allowed positions of the edge. When an edge is fixed, the edge cannot be moved, so there is no need for any additional constraints on the movement of the edge. However, when the layout engine 105 is used to change the position of an edge, typically the range of movement of the edge is restricted. For example, the layout engine 105 may be told that the edge cannot be moved past the edges of the layout area. As a further example, if the edge is the left edge of a container, a non-negative offset constraint may be added between the mark representing the left edge of the layout rectangle and the mark representing the edge of the container. Also, the minimum and maximum width of the container should be enforced. The document template may be used to store a minimum and a maximum width and a minimum and maximum height for each container independently of the layout engine 105. By adding a minimum offset constraint and a maximum offset constraint between the marks representing the left and right edges of the container, the minimum and maximum width settings of the container can be enforced by the layout engine 105 while the user is dragging the edge of the container.

Following step 3403, the application 121 invokes the push operation to move the edge in step 3405. The push operation ensures that the movement of the edge does not cause any constraints to be violated, and limits the movement to the range allowed by the layout rules. Following the push operation, in step 3407, the constraints added in step 3403 are removed, and then in step 3411, the position of the edge is fixed at the new position. After step 3411, the application 121 uses the layout engine 105 to recalculate the layout in step 3413 as described below and shown in FIGS. 28, 29, 30A and 30B. Step 3413 ensures that all of the minimize distance rules and preferred offset rules are applied. Step 3411 is necessary to prevent the layout engine 105 from moving the edge to another location when step 3413 is performed. Lastly, after the layout has been recalculated in step 3413, the application 121 updates the display 144 to show the result of changing the position of the edge, and the update is complete. The steps in FIG. 34 may be repeated as the user drags the edge of a container with the mouse to provide immediate feedback while dragging.

Figure 35:
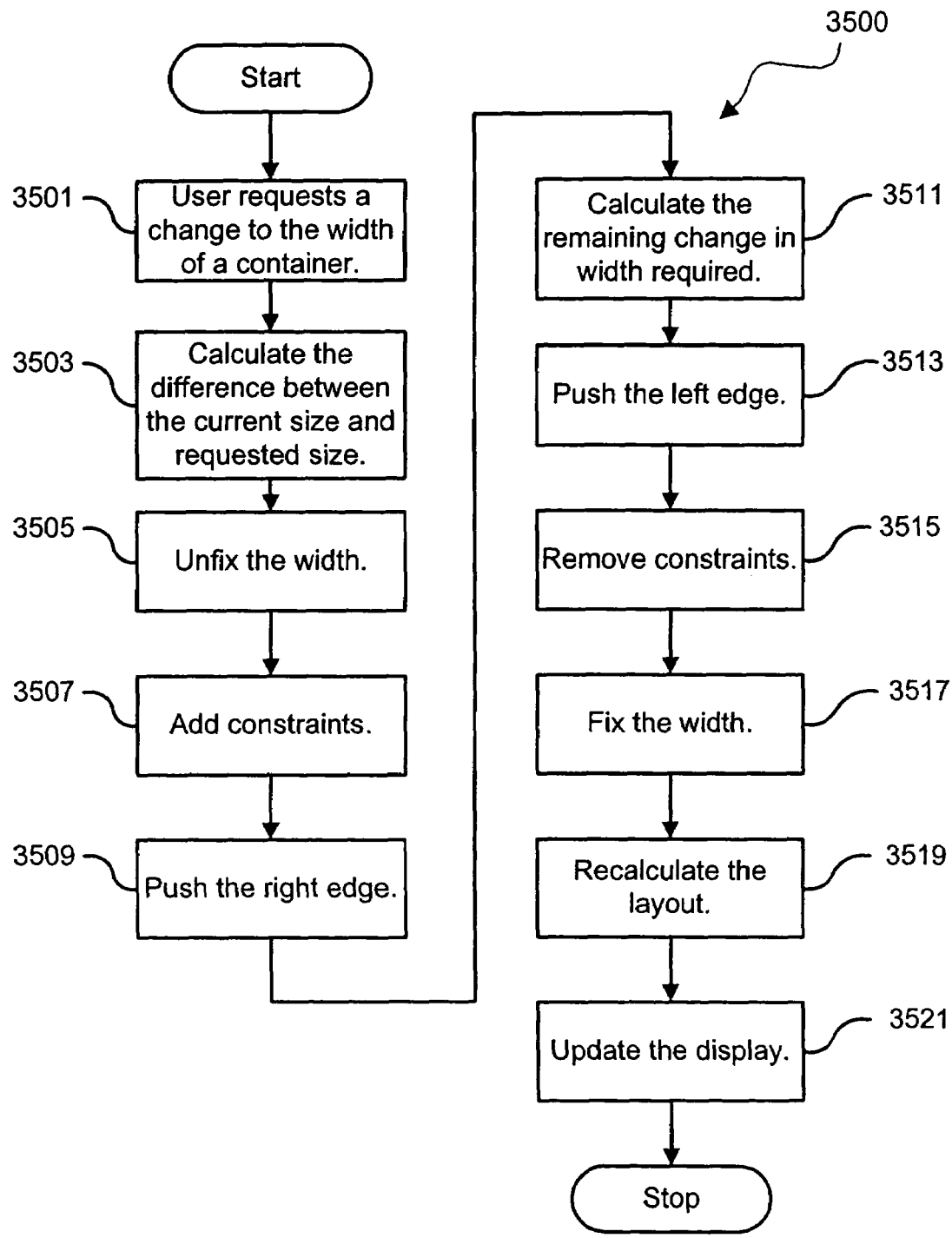
FIG. 35 is a flowchart of another example of the push operation for editing template documents.

FIG. 35 show another method 3500 of how the push operation may be used to edit document templates. The method 3500 starts at step 3501, where the user requests a change to the width of a fixed width container. It is assumed that the position of the container is variable and the left and right edges are not fixed. This may be done by typing a new width using the keyboard 132 into a properties dialog displayed by the GUI 301. In one implementation, clicking on the container using the right button of the mouse 133 causes a context menu, similar to the palette 311, to be displayed. A "Properties . . . " icon may then be selected from the context menu to cause a properties dialog to be displayed. After step 3501, in step 3503, the difference between the current width of the container and the new width is calculated. After step 3503, at step 3505, the width of the container is changed from being fixed to unfixed. The width of a container is made fixed by adding a fixed offset rule between the marks representing the left and right edges of the container. As such, step 3505 comprises of removing the fixed offset rule. After step 3505, at step 3507, constraints are added to the layout to limit the movement of the sides of the container. The minimum and maximum width of each container may be in the document template. These restrictions are enforced by adding rules to the layout. The minimum value is enforced by adding a minimum offset rule relating the marks representing the left and right sides of the container, and the maximum value is enforced by adding a maximum offset rule relating the marks representing the left and right sides of the container.

Step 3509 follows step 3507. In step 3509, the push operation is used to move the mark corresponding to the right edge of the container to the right by the difference in width. If the change in width is negative, representative of the user requesting a smaller width, then the mark will be pushed a negative distance—therefore being pushed to the left instead of to the right. In the next step 3511, the remaining required change in width is calculated. If the push operation in step 3509 was successful in pushing the right edge by the calculated distance, the width of the container will have changed to the correct size and the remaining distance would be zero. If the push operation in step 3509 was not successful, the current width will not be equal to the requested width and the remaining distance would be non-zero. Following step 3511, in step 3513, the left edge is pushed to the left using the push operation by the remaining change in size calculated in step 3511. If the remaining change in width is negative, the left edge would be pushed to the left by a negative distance. That is, the edge would be pushed to the right.

If step 3513 was successful in pushing the left edge by the distance calculated in step 3511, the width will now be equal to the requested width. If not, the width will be as close as possible to the requested width. After step 3513, the constraints added in step 3507 are removed at step 3515 and the width is fixed at the new width at step 3517 by adding a fixed offset constraint relating the marks representing the left and right edges of the container. Following step 3517, the layout is recalculated at step 3519 and the display is updated to reflect the newly calculated layout at step 3521, thus completing the operation of changing the width of the container. The process of calculating layouts is explained in more detail below. In the example shown in FIG. 35, it is assumed that the second version of the push operation outlined in FIG. 26 is used. If the version outlined in FIG. 25 is used steps 3511 and 3513 would be unnecessary.

18. Detailed Description of Layout Calculation 18.1 Calculating Layouts Using the Simplex Algorithm In one implementation, the allowed rules are those of the basic model, together with equal offset rules, aspect rules, minimize offset rules and maximize offset rules. Here, the basic model rules are equivalent to linear inequality constraints and the equal offset rules are linear constraints and the minimum offset rules and maximum offset rules are used to define a linear objective function. In this model, the rules define a linear program, so the layout calculation can be preformed using the simplex algorithm or any other method of solving linear programs.

In this implementation, the objective function is calculated by adding together each offset between a pair of marks related by a minimize offset rule and subtracting, from this sum, each offset between a pair of marks related by a maximize offset rule. If the rules have strengths, the offsets are first multiplied by the strength of the corresponding rule before adding or subtracting.

Unfortunately, there is no known way to include text rules in models whose layouts can be calculated using the simplex method without significant modification to the simplex method.

18.2 Modified Simplex Method

In another implementation, the allowed rules are those of the basic model, plus equal offset rules, aspect rules, minimize distance rules and preferred offset rules. In this implementation, the minimum offset rules and equal offset rules are converted into linear constraints and the minimize distance rules and preferred offset rules are used to define a quadratic objective function. In this model, the constraints are either linear equalities or linear inequalities and the objective function is a quadratic function. These types of problems may be solved using methods known to those skilled in the art of quadratic optimization. A modified version of the simplex method may by used to calculate layouts in this model.

As with the simplex method, there is no known way handle models that allow text boxes with variable width and height using quadratic programming, without significant modification to the quadratic programming.

18.3 Graph Based Layout Calculation

In another implementation, the layout model used allows all of the basic model rules, preferred offset rules and shape rules. This model is the same as the preferred layout model except that fixed center rules are not allowed. In this implementation, the basic model rules are represented using minimum offset rules and these are stored as a directed graph. Preferred offset rules are stored as a separate directed graph. Shape rules are stored separately. This method has the advantage over the simplex and quadratic programming methods that it incorporates both aspect rules and text rules, and can be modified to incorporate other shape rules as well.

Further, in this implementation, each container is associated with a box. For some containers, a further separate box may be associated with the container and used to represent the ideal size and/or shape of the container. Minimize offset rules are used to tell the layout engine 105 to make the box representing the printed or displayed shape of the container as close as possible to the size and shape of the box representing the ideal shape. The ideal size and shape of the container is defined by applying a shape rule to the associated box. The layout calculation method operates to make the size and shape of the container as close as possible to the ideal size and shape. It is not always possible to make the container exactly the ideal size and shape because at its ideal size and shape it might not fit in the available space in the layout. For example, constraints may prevent it from being the ideal size or shape.

The minimum offset rules are used to define constraints that limit the possible positions of the marks, the preferred offset rules are used to define an objective function that is minimized by the layout calculation method, and the shape rules are used to dynamically guide the calculation method. To define the objective function, each preferred offset rule is associated with an energy value. The energy of a preferred offset rule is half of the square of the difference between the preferred offset and the actual offset. The objective function, called the total energy, is the sum of the energies of all of all of the preferred offset rules. If strengths are assigned to preferred offset rules, then the energy is multiplied by the strength. A preferred offset rule may be thought of as a spring that has a natural length and is under tension if compressed or stretched. The tension of a preferred offset rule is the strength of the rule multiplied by the difference between the actual offset and the preferred offset. The strength of the rule is analogous to the stiffness of the spring. The layout engine 105 calculates the layout by minimizing the total energy by balancing the tensions of all of the preferred offset rules.

Figure 28:
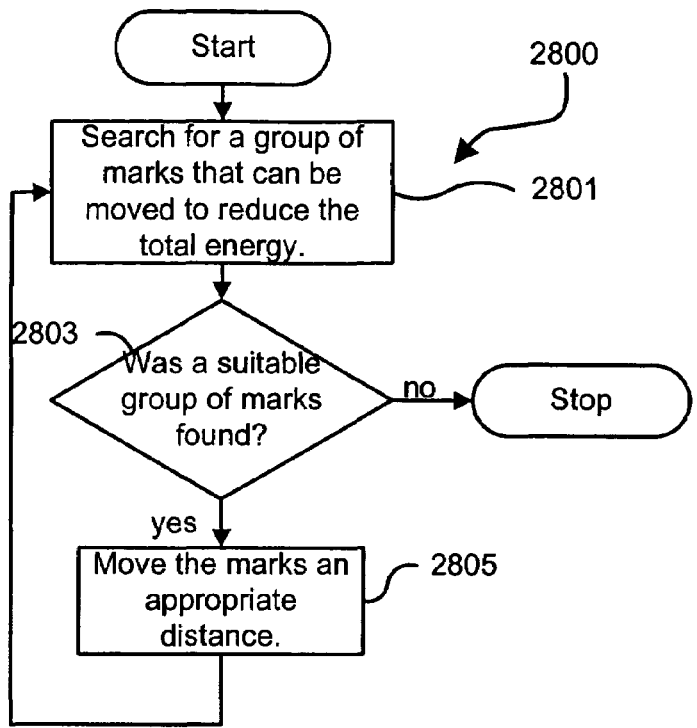
FIG. 28 shows the high level steps in the graph based layout calculation.

FIG. 28 shows the main steps involved in calculating the layout. The layout calculation method 2800 moves (ie. changes the positions of) marks without violating any of the minimum offset rules until the total energy is minimized. The method 2800 starts at step 2801, where the layout engine 105 searches for a group of marks that can be moved to reduce the value of the objective function without violating any basic model rules. At step 2803, a test is performed to test if the search was successful, if so, the method proceeds to step 2805, otherwise the layout calculation is complete and the method 2800 stops. At step 2805, the marks are moved a suitable distance in a suitable direction to reduce the total energy. After step 2805, the method 2800 returns to step 2801, where it searches for another group of marks to move. Methods of selecting groups of marks to move and methods of calculating the distance to move the marks are described in more detail below. To ensure that the process described in FIG. 28 terminates, small changes in positions of marks and/or changes in positions of marks that result in small changes in total energy are ignored. In one implementation, the changes in position may be restricted to a whole number of logical units.

Figure 29:
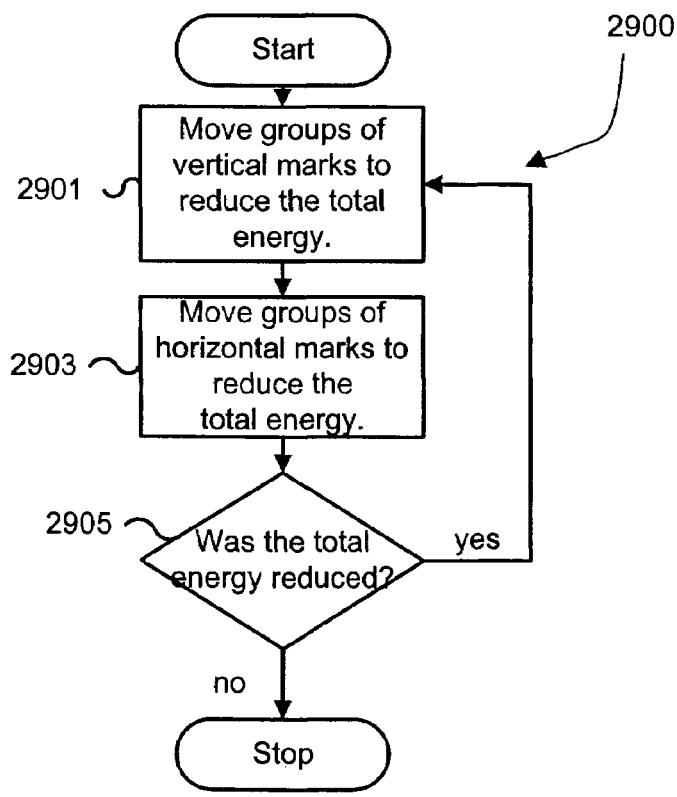
FIG. 29 shows the high level steps in an implementation of the graph based layout calculation.

FIG. 29 shows an equivalent procedure 2900 to that shown in FIG. 28 except that vertical marks are moved first (step) before any groups of horizontal marks are moved (step 2903). The test at step 2905 serves the same purpose as the test at step 2803. There are many possible ways to organize the method of reducing the total energy without departing from the scope of the present disclosure.

Figure 30A:
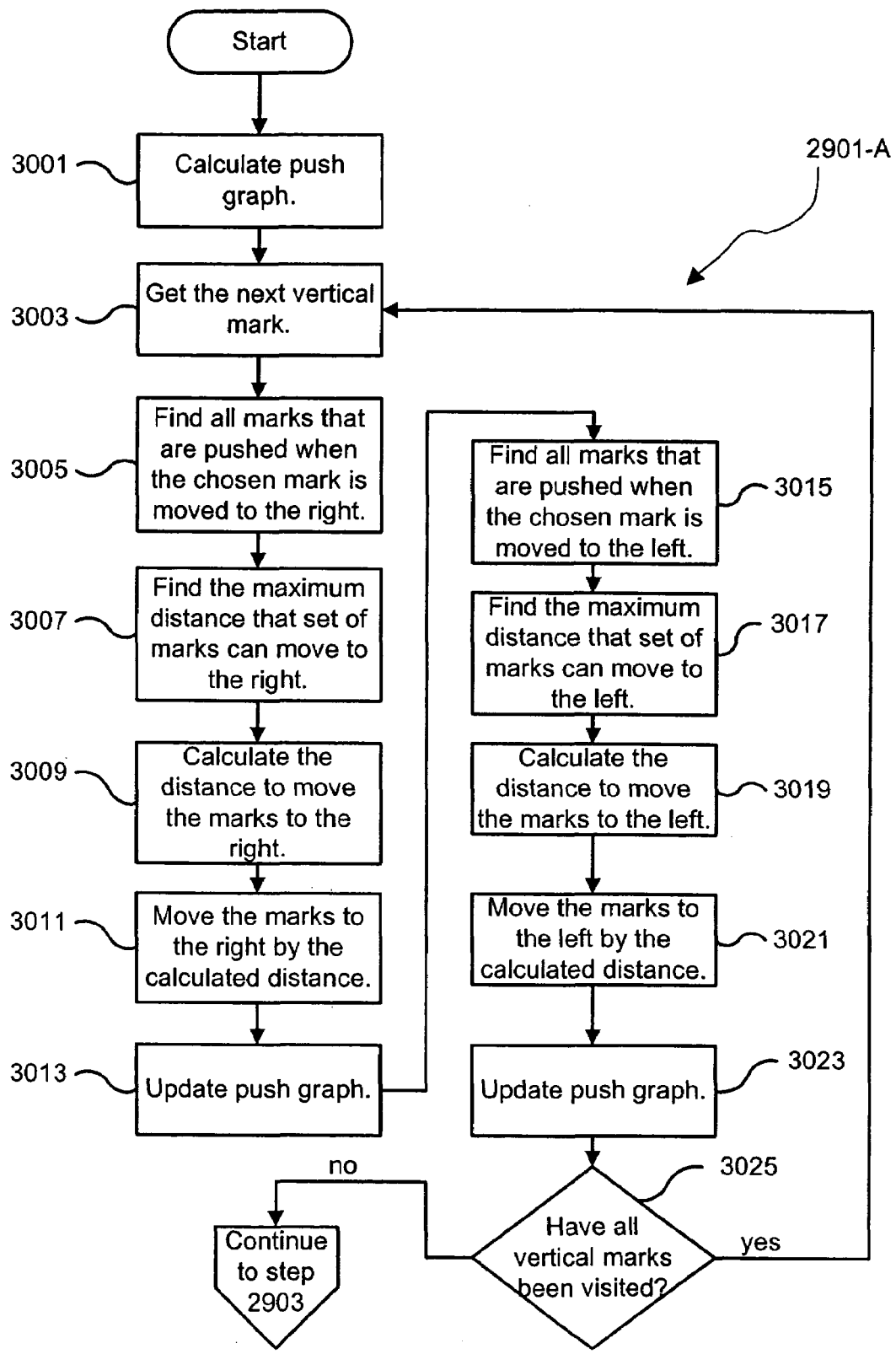
FIG. 30A, shows how the graph based layout calculation reduces the value of an energy function by moving vertical marks.

FIG. 30A shows in more detail how step 2901 may be performed in one implementation as step 2901-A. In step 3001, the push graph for the vertical marks is calculated. This is used to determine which marks can be pushed by a given mark. In some implementations, this graph may be a separate data structure from the graph representing the rules. In other implementations, the two data structures may be combined. In step 3003, the first vertical mark is retrieved by retrieving the first vertex from the graph representing the vertical marks and horizontal minimum offset rules. There are many possible orders in which the marks may be retrieved. In one implementation, the marks may be retrieved in the order that their corresponding vertices are stored in the graph that represents the horizontal minimum offset rules. After step 3003, the method proceeds to step 3005, where the marks that can be pushed to the right by the mark chosen in step 3003 are calculated. Step 3005 determines a group of marks that can all be moved to the right by some non-zero distance without violating any minimum offset rules. The group is comprised of the mark chosen in step 3003 plus all marks that can be pushed by the chosen mark (ie. all marks corresponding to vertices that are reachable in the push graph from the vertex corresponding to the chosen mark). Step 3007 determines the maximum distance that the group of marks determined in step 3005 can be moved to the right without violating any minimum offset rules. The calculation in step 3007 is the same as that performed as part of step 2507 of the push operation. After step 3007, step 3009 calculates the distance that the marks in the group should be moved to reduce the total energy, this not being greater than the distance calculated in step 3007. Step 3009 will be described in more detail below. The distances moved may be restricted to a whole number of logical units. After step 3009, the method proceeds to step 3011 where the marks are moved by the distance calculated in step 3009. Since the marks may have changed position, the push graph may need to be updated to reflect the consequences of the new positions. If the distance calculated in step 3009 is equal to the maximum allowed distance calculated in step 3007, the push graph will need to be changed. This is done in step 3013 that follows step 3011. It is also possible that moving the marks to the right would not decrease the total energy. In this case, the distance calculated in step 3009 would be 0 and the marks would not actually change position in step 3011. Steps 3011 and 3013 would then both effectively do nothing, and may be skipped in some implementations. Steps 3015, 3017, 3019, 3021 and 3023 are equivalent to steps 3005, 3007, 3009, 3011 and 3013 respectively, except that the direction of movement is reversed. In these steps, the reverse of the push graph is used instead of the push graph. One skilled in the art of software engineering will understand that it is possible to design the directed graph data structure used for the push graph so that the same push graph can be traversed in a reverse direction, so a separate reversed push graph is not needed. After step 3023, a test is performed to determine if all vertices have been visited at step 3003, if not, the method returns to step 3003 where the next mark is selected. If so, step 2901 is complete and the calculation proceeds to step 2903.

Step 2903 is the same as step 2901 except that the horizontal marks and vertical minimum offset rules are considered instead of vertical marks and horizontal minimum offset rules.

Figure 31:
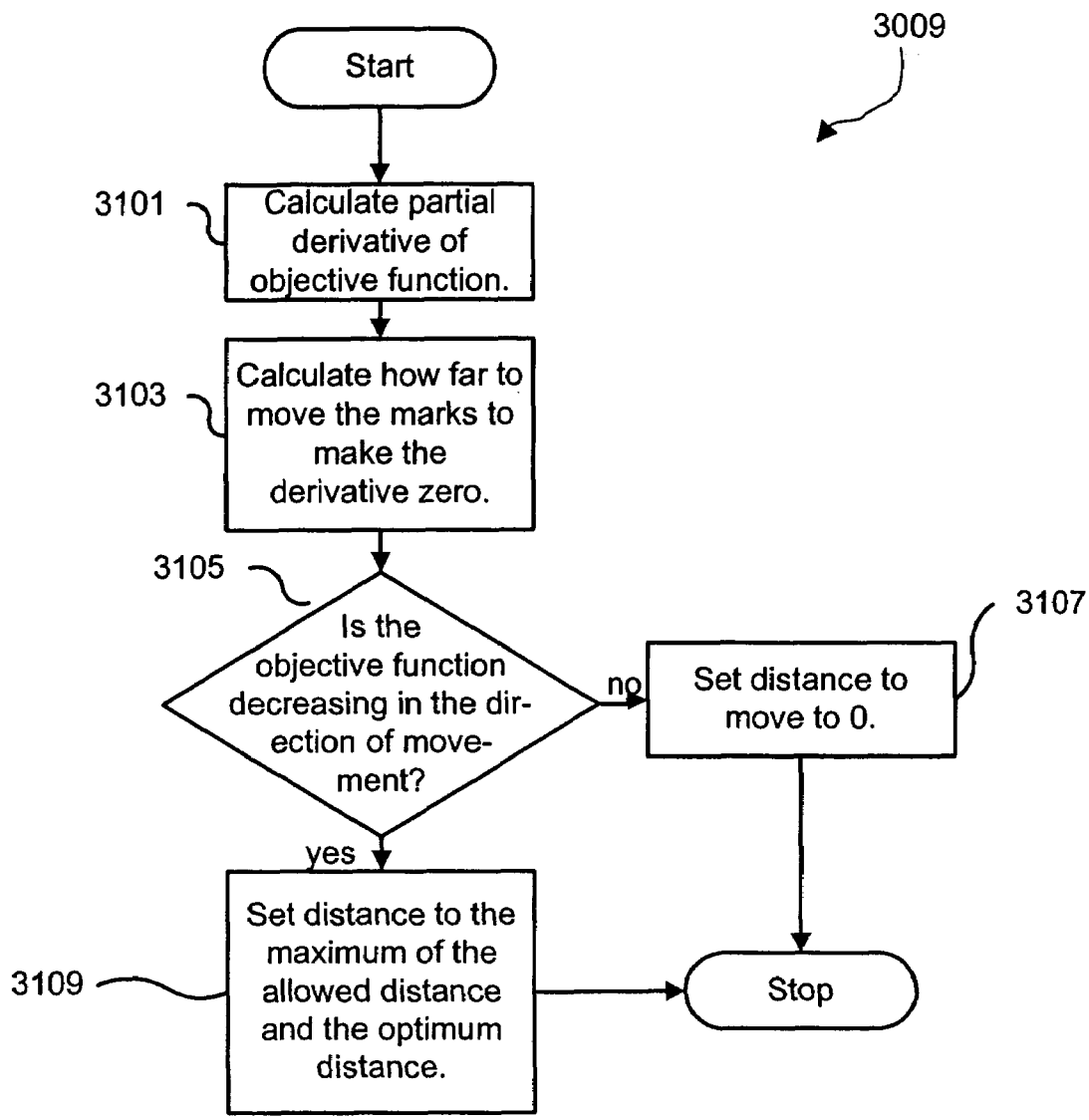
FIG. 31 shows how the distance to move a group of marks in the graph based layout calculation is calculated.

FIG. 31 shows the details of how the calculation in step 3009 is performed. In step 3101, the partial derivative of the total energy is calculated with respect to a change in position of the current set of marks from their current positions. The derivative of the total energy is equal to the sum of the tensions. The partial derivative is equal to the sum of the tensions of the preferred offset rules relating marks in the current set to marks not in the current set. That is, the sum is over rules of the form preferred(n, m, d, s), where m is a mark in the current set and n is a mark not in the current set. Note that the rule preferred(m, n, d, s) is equivalent to the rule preferred(n, m, −d, s), for any marks m and n. The energy is minimized by making the sum of the tensions as close to zero as possible. This is accomplished in step 3103 by moving the marks a distance δ given by:

$$\delta = -D/S,$$

where D is the sum of the tensions and S is the sum of the strengths of the preferred offset rules relating marks in the current set to marks not in the current set. In step 3105, a test is performed to determine if the objective function is decreasing in the direction of movement being considered for the current set of marks. This is equivalent to testing is δ is positive. If the energy cannot be decreased by moving the marks in the current direction, then the distance to move is set to zero in step 3107. If the energy can be decreased by moving the marks in the current direction, then the distance to move is calculated in step 3109. The distance to move is the smaller of δ and the value calculated in step 3007. The movement of marks may be restricted to whole multiples of logical units, so the distance calculated in step 3007 is rounded to whole logical units. This guarantees termination of the layout calculation.

The same considerations about the origin marks apply to the layout calculation as apply to the push operation described above. In this regard, the origin marks may be ignored by the layout calculation in which case step 3005 will always find a set of marks that can be moved except that the designated vertical mark that defines the origin of the horizontal coordinate system may be contained in the set of marks to be moved. In this case, step 3007 will always produce a non-zero positive distance and step 3011 may change the position of the origin mark. In this case, the position of the origin mark should be stored before step 3001 and the position of the origin mark should be restored by moving all vertical marks in the layout by minus the distance that the origin mark has been moved during the calculation. In another implementation, the origin marks are considered in step 3007. In this regard, if an origin mark is included in the set of marks to be moved, then the distance calculated in step 3007 is 0. In this case, the origin does not have to be saved or restored when performing the layout calculation.

Shape rules need only used for containers that have both unfixed width and unfixed height. For such a container, the part of the container that contains the content is represented in the layout engine 105 by two boxes. One box represents the boundary of the displayed or printed text or image contained in the container. The boundary of this box is calculated by the layout engine. The other box represents the ideal shape of the box. This box is controlled by a shape rule and is typically not printed or displayed to the user. The two boxes share one horizontal mark and one vertical mark. For example, the positions of the left and top edges of the two boxes are always equal. It makes no difference whether the left or right edges are shared or whether the top or bottom edges are shared. The remaining two vertical edges are related by a minimize distance rule, and similarly, the remaining two horizontal edges are related by a minimize distance rule. The minimize distance rules indicate to the layout engine that the two boxes should be made as close to each other in size as possible.

Shape rules are taken into account when moving any mark associated with an edge of either box of such a pair of related boxes. The marks belonging to the boxes with shape rules that are not shared may be ignored and skipped in step 3003, but these unshared marks are adjusted before step 3009 if any of the marks representing an edge of the associated box without the shape rule are to be moved. The same applies to the equivalent steps applied to the horizontal marks. The unshared marks are adjusted in accordance with the shape rule to minimize the energy function. This process ensures that the energy is balanced between the vertical and horizontal marks.

In the case where the shape rule is an aspect rule, it is straightforward to minimize the energy. If the width and height of the display box are W and H and the width and height of the ideal box are w and h, then the minimum energy is achieved when W+H=w+h. If the ratio of height to width defined by the aspect rule is r, then the width and height of the ideal box can be calculated as:

$$w = (1+r)^{-1}(W+H) \text{ and } h = r(1+r)^{-1}(W+H).$$

In the case where the shape rule is a text rule, there is no simple formula for the shape of the ideal box. The text layout engine performs calculations to lay out text inside a rectangular space. The text layout engine is used to calculate the dimensions for the ideal box. The text layout engine performs calculations to lay out a block of text in a space with a given width, and it can rapidly calculate the height of the laid out block of text. The text layout engine incorporates word-wrap calculations to wrap long lines of text into multiple lines. The text layout engine lays out text in accordance with formatting information associated with the text. The formatting information may include the paragraph style, size of the font and the style, such as bold or underlined for example, to use for each character.

In one implementation, the ideal width is set to the width of the widest line of text and the ideal height is set to the height of the laid out text block calculated by the text layout engine with the width equal to the width of the display box. This has the effect of adding an energy penalty if the width is less than the width of the longest line or the display box is not high enough to contain the text.

In another implementation, the text layout engine is used to lay out the text at different widths calculating the height for each width until the width is found that results in the lowest energy value. In the case where the widest line of text is not as wide as the display box, the ideal height may be set to the width of the widest line of text and the ideal height may be set to the height calculated by the layout engine when there is no wrapping of lines. Where the text contains long lines of text that must be wrapped to fit inside the display box, a search strategy is employed to find a width that results in the layout with the least energy. Many possible strategies may be devised for searching for the ideal width without departing from the scope of the present disclosure. In particular, a binary search strategy may be employed.

In another implementation, if the text contains long lines of text that must be wrapped to fit into the display box, the dimensions of the ideal box are calculated based on whether or not the text can be laid out to fit inside the display box. If the text does not fit inside the display box, the ideal box is made larger in both width and height than the display box. If the text fits inside the display box, then the ideal box is made smaller in both width and height than the display box. This strategy has the effect of adding a penalty for layouts in which the display box is larger or smaller than necessary to contain the text. There are many possible ways to calculate the exact dimensions of the ideal box without departing from the scope of the present disclosure. One particular method that may be used is to first calculate the height of the text if laid out with width equal to the current width of the display box, and then add half of the difference between the height of the laid out text and the height of the display box to both the width and height of the display box to obtain the dimensions of the ideal box.

18.3.1 Simple One-dimensional Layout Example

Figure 39:
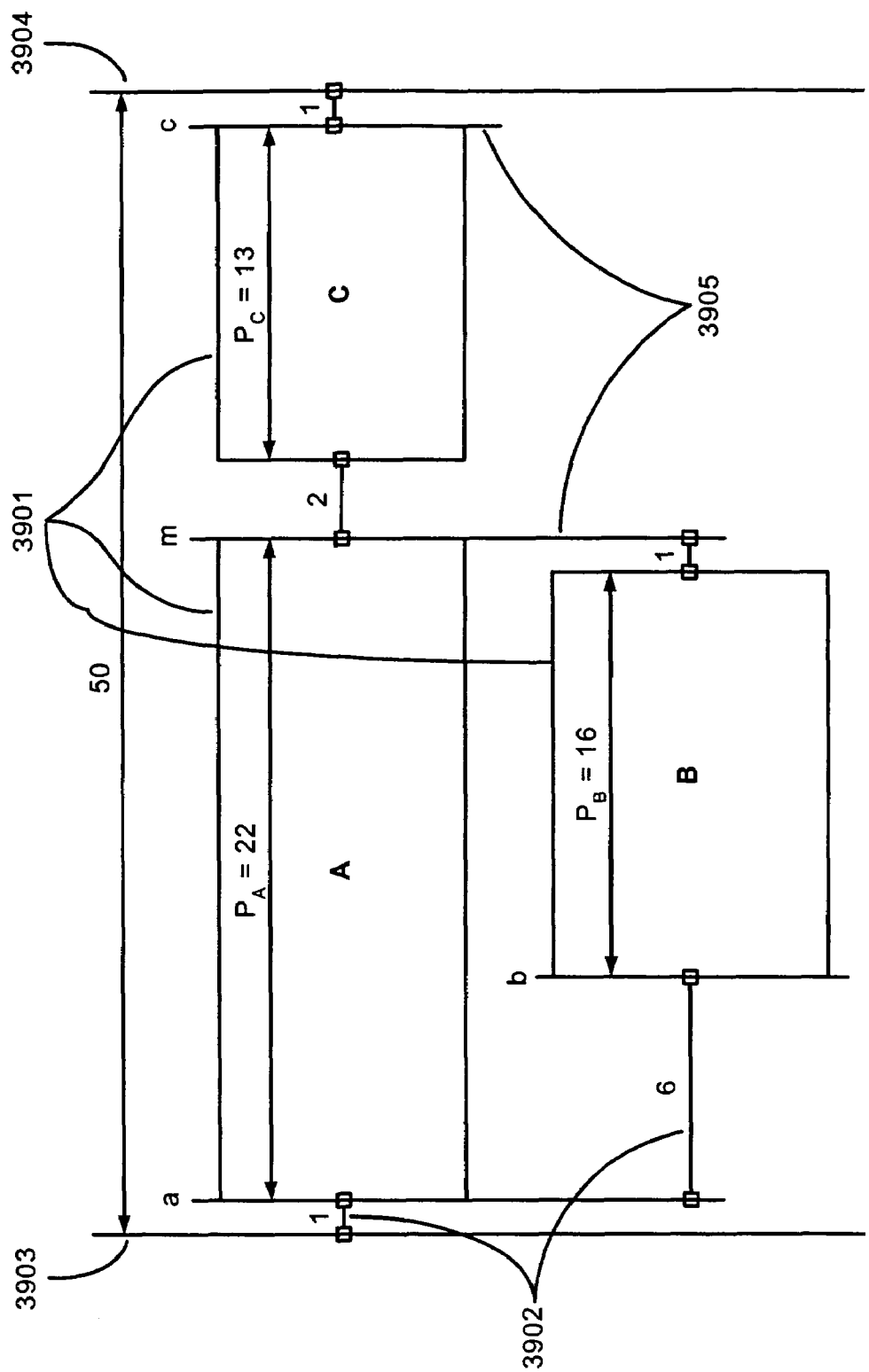
FIG. 39 shows an example use of the layout engine operating in one dimension.

FIG. 39 shows an example usage of the layout mechanism described in Section 18.3 and later. Three boxes 3901 have been specified, A, B, and C. Each box 3901 is defined by marks 3905 at the left, top, right and bottom edges. Left and right edges of the page are defined as two vertical marks (3903 and 3904) with a fixed distance between those marks. There are fixed-offset rules 3902 which specify distances between some of the containers' edges and the edges of the page.

The rules in detail are:

The width of the page is fixed at 50 units.

$P_A$, the preferred width of container A, is 22 units.

$P_B$, the preferred width of container B, is 16 units.

$P_C$, the preferred width of container C, is 13 units.

The left edge of box A (named 'a' in FIG. 39) is 1 unit from the page's left.

The right edge of box A (named 'm') is free to move.

The left edge of box B (named 'b') is 6 units right of 'a'.

The right edge of box B is 1 unit left of 'm'.

The left edge of box C is 2 units right of 'm'.

The right edge of box C (named 'c') is 1 unit left of the page's right edge.

Let the current widths of boxes A, B, and C be represented by $W_A$, $W_B$, and $W_C$ respectively. For the sake of convenience, a co-ordinate system is used which begins at the left edge of the page at zero, and increases to the right of the page. It is also assumed that the letters 'a', 'b', 'c' and 'm' can be understood to mean the location of the corresponding marks within this co-ordinate system.

The energy of a preferred offset rule is half of the square of the difference between the preferred offset and the actual offset. The objective function for this layout, which is the total energy, is the sum of the energies of all the preferred offset rules. So the objective function is:

$$\begin{aligned}E(A, B, C) &= \frac{1}{2}(W_A - P_A)^2 + \frac{1}{2}(W_B - P_B)^2 + \frac{1}{2}(W_C - P_C)^2 \\ &= \frac{1}{2}(W_A - 22)^2 + \frac{1}{2}(W_B - 16)^2 + \frac{1}{2}(W_C - 13)^2 \\ &= \frac{1}{2}[(W_A - 22)^2 + (W_B - 16)^2 + (W_C - 13)^2] \\ &= \frac{1}{2}[((m-a) - 22)^2 + ((m-b-1) - 16)^2 + \\ &\quad ((c-m-2) - 13)^2] \\ &= \frac{1}{2}[(m - a - 22)^2 + (m - b - 17)^2 + (c - m - 15)^2].\end{aligned}$$

Note that to find the width of each box, that box's left-most mark's position is subtracted from its right-most mark's position to obtain a non-negative number. Hence, $W_B$ is (m−b−1) since there is a gap of 1 unit between 'm' and the right edge of box B. Also, $W_C$ is (c−m−2) since 'c' is right of 'm' and there is a distance of 2 units between the left edge of box C and the mark 'm'.

To minimize the objective function, it is noted that 'm' is the only mark which may move (actually, 'm' and the two marks nearest it may move and any of them may be treated as a controlling variable in the equations, so for simplicity the one named 'm' is used). It suffices in this case to simply find the partial derivative of the energy function with respect to the variable m, and solve for that derivative being zero:

$$E(A, B, C) = \frac{1}{2}[(m-a-22)^2 + (m-b-17)^2 + (c-m-15)^2]$$

$$\delta E/\delta m = (m-a-22) + (m-b-17) + (m-c+15).$$

Note the reversed sign of the third term (m−c+15) since the derivative is with respect to m, which was negative in that term.

$$\delta E/\delta m = m - a - 22 + m - b - 17 + m - c + 15$$
$$= 3m - a - b - c - 22 - 17 + 15$$
$$= 3m - a - b - c - 24.$$

It is now possible to find the minimum energy by solving for this value being zero. It is known that a, b, and c have values of 1, 7 and 49 respectively.

$$0 = 3m - 1 - 7 - 49 - 24$$
$$3m = 1 + 7 + 49 + 24$$
$$= 81$$
$$m = 27.$$

Since there is only one variable, this ends the procedure. Hence, the lowest energy of the given configuration is when mark 'm' is 27 units right of the left edge of the page.

18.3.2 Simple Two-dimensional Layout Example

Figure 40A:
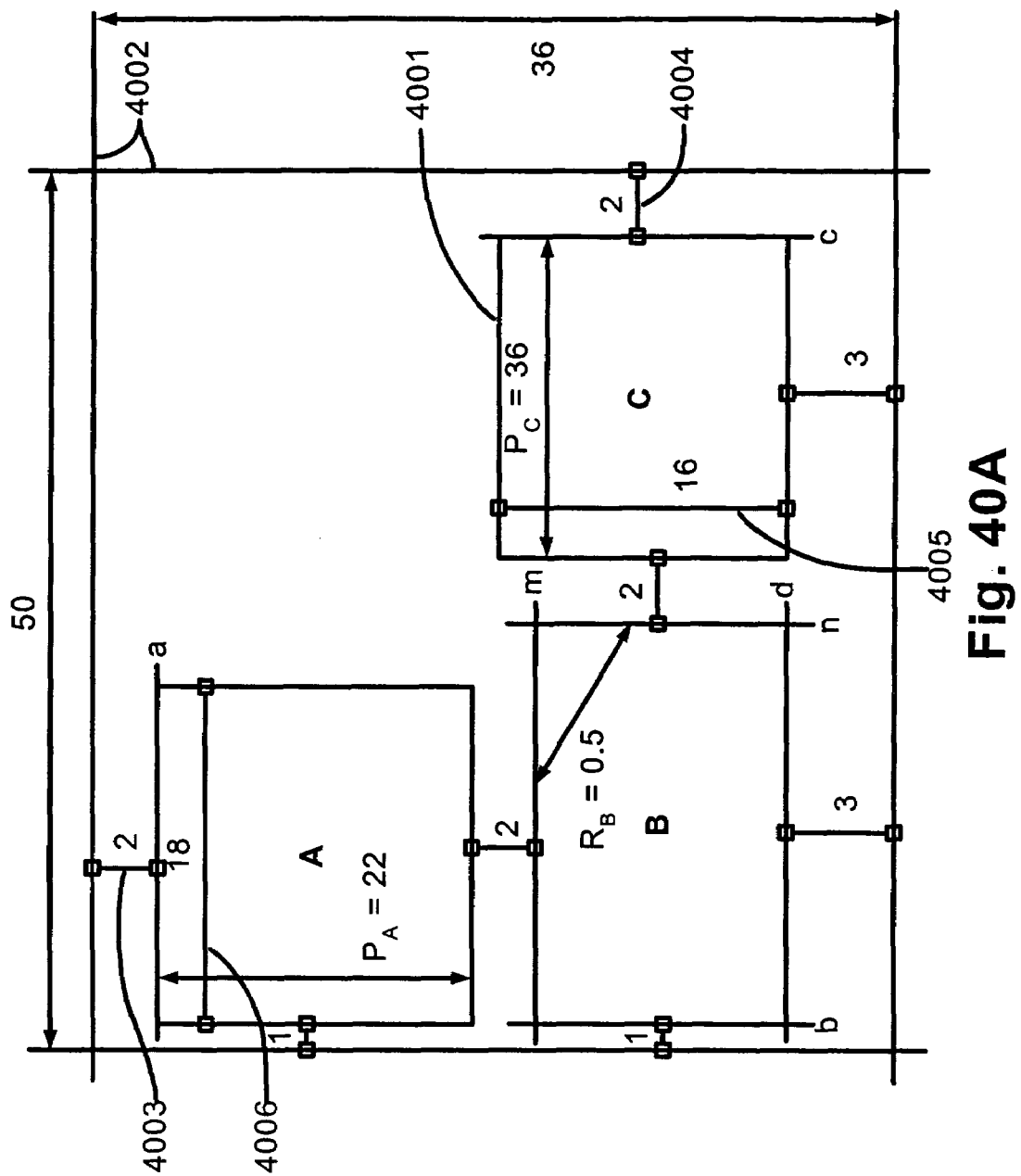
FIGS. 40A and 40B show an example use of the layout engine operating in two dimensions.

FIG. 40A shows another example of usage of the layout mechanism. In this case the example involves tensions in two-dimensions since there are both horizontal and vertical marks which may move.

There are three boxes 4001 labelled A, B, and C shown within a rectangular page of a known fixed size bounded by marks 4002. Fixed-offset rules 4003, 4004, 4005, and 4006 determine the location of three edges of each of A and C. The lower horizontal edge of A may move, but is connected via a fixed-offset rule to the upper edge of B (named 'm'), and so those two marks may only be moved together and by the same distance. Similarly, the right edge of B (named 'n') and the left edge of C may be moved but only together by the same distance, since there is a fixed-offset rule between them.

Since both the width and height of box B may vary, a shape rule has been applied to box B. The rule chosen is an aspect ratio rule which specifies that the ratio of box B's height to its width should be as close to 0.5 as possible (this is indicated by the arrow labelled $R_B$=0.5 in FIG. 40A). Box A has a preferred height of 22 units and box C has a preferred width of 36 units. Since neither of boxes A and C is free to vary in two-dimensions (due to rules 4005, 4006), neither has a shape rule.

The rules in detail are:
The width of the page is fixed at 50 units.
The height of the page is fixed at 36 units.
$P_A$, the preferred height of container A, is 22 units.
$R_B$, the preferred ratio of height to width of container B, is 0.5.
$P_C$, the preferred width of container C, is 36 units.
The upper edge of box A (named 'a') is 2 units from the page's top.
The left edge of box A is 1 unit right of the page's left edge.
The right edge of box A is 18 units right of its left edge.
The upper edge of box B (named 'm') may move.
The lower edge of box A is 2 units above 'm'.
The left edge of box B (named 'b') is 1 unit right the page's left edge.
The lower edge of box B (named 'd') is 3 units above the page's lower edge.
The right edge of box B (named 'n') may move.
The left edge of box C is 2 units right of 'n'.
The lower edge of box C is 3 units above the page's lower edge.
The right edge of box C (named 'c') is 2 units left of the page's right edge.
The upper edge of box C is 16 units above its lower edge.

Let $H_A$, $W_A$, $H_B$, $W_B$ and $H_C$, $W_C$ be the height and width of box A, the height and width of box B, and the height and width of box C respectively.

Let $P_{HB}$ and $P_{WB}$ be the preferred height and width of box B, respectively. The preferred heights and widths of box B are not fixed inputs to the layout algorithm; instead they are calculated at certain stages by use of the shape rule for box B, which is an aspect ratio rule relating its width and height. These values are calculated as weighted averages of the height and width of box B:

$$P_{WB} = (W_B + H_B)/(1 + R_B) = \tfrac{2}{3}(W_B + H_B)$$

$$P_{HB} = R_B(W_B + H_B)/(1 + R_B) = \tfrac{1}{3}(W_B + H_B).$$

An objective function representing the energy of this arrangement may be obtained as half the sum of the squares of the tensions in both the horizontal and vertical directions:

$$E(A, B, C) = \frac{1}{2}(H_A - P_A)^2 + \frac{1}{2}(H_B - P_{HB})^2 + \frac{1}{2}(W_B - P_{WB})^2 +$$
$$\frac{1}{2}(W_C - P_C)^2$$
$$= \frac{1}{2}[(H_A - P_A)^2 + (H_B - P_{HB})^2 + (W_B - P_{WB})^2 +$$
$$(W_C - P_C)^2]$$
$$= \frac{1}{2}[(m - 2 - a - P_A)^2 + (d - m - P_{HB})^2 +$$
$$(n - b - P_{WB})^2 + (c - n - 2 - P_C)^2].$$

To reduce this energy (without actually needing to calculate the energy), it suffices to reduce the partial differentials of the objective function in both horizontal and vertical dimensions, in turn, until the sum of the absolute values of the tensions in both dimensions cannot be reduced further. This produces an arrangement with the lowest tension. The absolute values of the tensions are used so that negative and positive tensions are treated identically in the stopping condition. The partial differentials are:

$$\delta E/\delta m = m - 2 - a - P_A + m - d + P_{HB} = 2m - 59 + P_{HB}$$

$$\delta E/\delta n = n - c + 2 + P_C + n - b - P_{WB} = 2n - 11 - P_{WB}$$

To minimize these partial differentials by setting them each to zero, the following relations are obtained:

$$m = \frac{1}{2}(2 + a + P_A + d - P_{HB}) = \frac{1}{2}(59 - P_{HB})$$

$$n = \frac{1}{2}(c - 2 - P_C + b + P_{WB}) = \frac{1}{2}(11 + P_{WB}).$$

For the purposes of this example, let the initial width and height of box B be 15 and 10 units respectively, so m=d−10=33−10=23 and n=b+15=16.

$W_B = 15$
$H_B = 10$
m=23
n=16.

The preferred width and height of the box B may be calculated:

$$P_{WB} = \frac{2}{3}(W_B + H_B)$$
$$= \frac{2}{3}(15 + 10)$$
$$= 50/3$$
$$= 16\frac{2}{3}$$
$$= 16 \text{ when reduced to the nearest whole unit.}$$

$$P_{HB} = \frac{1}{3}(W_B + H_B)$$
$$= \frac{1}{3}(15 + 10)$$
$$= 25/3$$
$$= 8\frac{1}{3}$$
$$= 8 \text{ when reduced to the nearest whole unit.}$$

The sum of the absolute values of the horizontal and vertical tensions is calculated so that the layout mechanism can determine when to finish. In this case, the horizontal tension $T_X$ is the sum of the differences between the current widths of boxes B and C and their preferred widths. Similarly, the vertical tension $T_Y$ is the sum of the differences between the current heights of boxes A and B and their preferred heights:

$$T_X = (W_C - P_C) + (W_B - P_{WB})$$
$$= (c - n - 2 - 36) + (n - b - P_{WB})$$
$$= c - 38 - b - P_{WB} \text{ when } n \text{ is eliminated}$$
$$= 48 - 38 - 1 - P_{WB}$$
$$= 9 - P_{WB}$$
$$= 9 - 16$$
$$= -7.$$

$$T_Y = (H_B - P_{HB}) + (H_A - P_A)$$
$$= (d - m - P_{HB}) + (m - 2 - a - 22)$$
$$= d - P_{HB} - 2 - a - 22, \text{ when } m \text{ is eliminated}$$
$$= 33 - P_{HB} - 2 - 2 - 22$$
$$= 7 - P_{HB}$$

-continued
$$= 7 - 8$$
$$= -1.$$

The fact the tensions are negative indicates that marks may need to move left or upwards to reduce these tensions.

The total tension is the sum of the absolute values of the vertical and horizontal tensions:

$$T_{TOTAL} = |T_X| + |T_Y|$$
$$= |-7| + |-1|$$
$$= 7 + 1$$
$$= 8.$$

The layout mechanism proceeds to reduce tensions in the horizontal and vertical dimensions in turn, until this total tension can no longer be reduced.

First, vertical marks are moved in a horizontal direction. The preferred width of B was earlier calculated as:

$$P_{WB} = \frac{2}{3}(W_B + H_B)$$
$$= 16.$$

The only vertical marks which may move are 'n', and the mark connected to it by a fixed-offset rule (2 units to its right). Both marks are moved in such a way as to try to minimize the horizontal tension. It suffices to determine the location to which 'n' should be moved, since the other mark's location may be deduced from that as (n+2). The location of 'n' is calculated to reduce the partial derivative of the objective function with respect to n, as determined earlier by the relation:

$$n = \frac{1}{2}(11 + P_{WB})$$
$$= \frac{1}{2}(11 + 16)$$
$$= 13\frac{1}{2}$$
$$= 13 \text{ when reduced to the nearest whole unit.}$$

The mark 'n' is moved to location 13 to reduce the horizontal tension, which also changes the width of box B to 12:

$W_B = 12$
$H_B = 10$
m=23
n=13.

The preferred width and height of box B have changed due to the shape rule:

$$P_{WB} = \frac{2}{3}(W_B + H_B)$$
$$= \frac{2}{3}(12 + 10)$$
$$= 44/3$$

-continued $$= 14\frac{2}{3}$$

= 14 when reduced to the nearest whole unit.

$$P_{HB} = \frac{1}{3}(W_B + H_B)$$

$$= \frac{1}{3}(12 + 10)$$

$$= 7\frac{1}{3}$$

= 7 when reduced to the nearest whole unit.

The total tension must now be recalculated to see if it has reduced, and if it has not, the layout procedure will stop. The new tensions are:

$$T_X = 9 - P_{WB}$$
$$= 9 - 14$$
$$= -5.$$
$$T_Y = 7 - P_{HB}$$
$$= 7 - 7$$
$$= 0.$$
$$T_{TOTAL} = |T_X| + |T_Y|$$
$$= |-5| + |0|$$
$$= 5.$$

Since the total tension has reduced from 8 to 5, the procedure will continue.

Now, horizontal marks are moved in a vertical direction. In this case only 'm' and the mark connected to it may move. It suffices to calculate the location to which 'm' should be moved, since the connected mark will move to (m−2). The partial derivative of the objective function is minimized with respect to m, as determined earlier by the relation:

$$m = \frac{1}{2}(59 - P_{HB})$$
$$= \frac{1}{2}(59 - 7)$$
$$= 26.$$

The mark 'm' is moved to location 26 to reduce the vertical tension, and the mark connected to it by a fixed-offset rule moves to location 24.

$W_B$=12
$H_B$=7
m=26
n=13

The preferred width and height of box B and the total tension are now recalculated:

$$P_{WB} = \frac{2}{3}(W_B + H_B)$$

-continued $$= \frac{2}{3}(12 + 7)$$
$$= 38/3$$
$$= 12\frac{2}{3}$$

= 12 when reduced to the nearest whole unit.

$$P_{HB} = \frac{1}{3}(W_B + H_B)$$
$$= \frac{1}{3}(12 + 7)$$
$$= 6\frac{1}{3}$$

= 6 when reduced to the nearest whole unit.

$$T_X = 9 - P_{WB}$$
$$= 9 - 12$$
$$= -3.$$
$$T_Y = 7 - P_{HB}$$
$$= 7 - 6$$
$$= 1.$$
$$T_{TOTAL} = |T_X| + |T_Y|$$
$$= |-3| + |1|$$
$$= 4.$$

Since the total tension has reduced from 5 to 4, the procedure will continue. Vertical marks are again moved in a horizontal direction to try to reduce the tension.

$$n = \frac{1}{2}(11 + P_{WB})$$
$$= \frac{1}{2}(11 + 12)$$
$$= 11\frac{1}{2}$$

= 11 when reduced to the nearest whole unit.

Mark 'n' is moved to location 11. The width of box B becomes 10 units.

$W_B$=10
$H_B$=7
m=26
n=11

The preferred width and height of box B and the total tension are recalculated:

$$P_{WB} = \frac{2}{3}(W_B + H_B)$$
$$= \frac{2}{3}(10 + 7)$$
$$= 34/3$$
$$= 11\frac{1}{3}$$

= 11 when reduced to the nearest whole unit.

-continued $$P_{HB} = \frac{1}{3}(W_B + H_B)$$
$$= \frac{1}{3}(10 + 7)$$
$$= 5\frac{2}{3}$$
$$= 5 \text{ when reduced to the nearest whole unit}$$
$$T_X = 9 - P_{WB}$$
$$= 9 - 11$$
$$= -2.$$
$$T_Y = 7 - P_{HB}$$
$$= 7 - 5$$
$$= 2.$$
$$T_{TOTAL} = |T_X| + |T_Y|$$
$$= |-2| + |2|$$
$$= 4.$$

Since the total tension has not reduced below 4, the procedure may stop here. Alternatively, the horizontal marks might also be moved before the procedure stops.

Figure 40B:
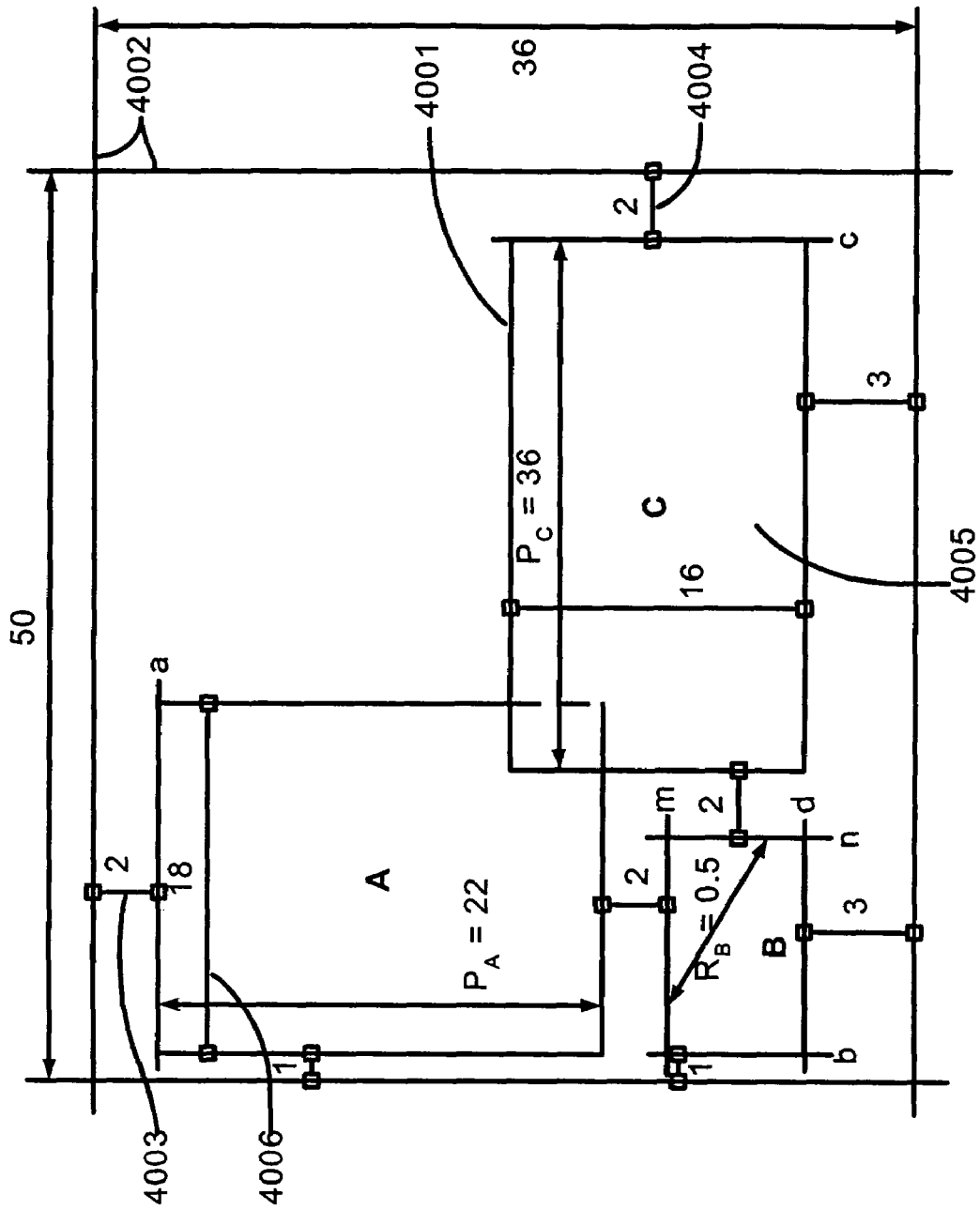

The final result of this example may look like FIG. 40B. Note that box A and C may overlap in this case. This may be the desired effect. If not, to prevent that occurring it may be necessary to add other constraints. For example, a minimum offset rule could be added to force the left edge of box C to remain right of the right edge of box A.

This example has shown only one shape rule and two preferred-offset rules, but a real application might employ shape rules for each of the boxes. The shape rules may also differ depending on the contents to be displayed within the boxes. For example, both aspect ratio rules and text shape rules may be used. Each would calculate the ideal shape of a box in its own fashion.

18.4 Graph Based Algorithm with Fixed Centers

Figure 30B:
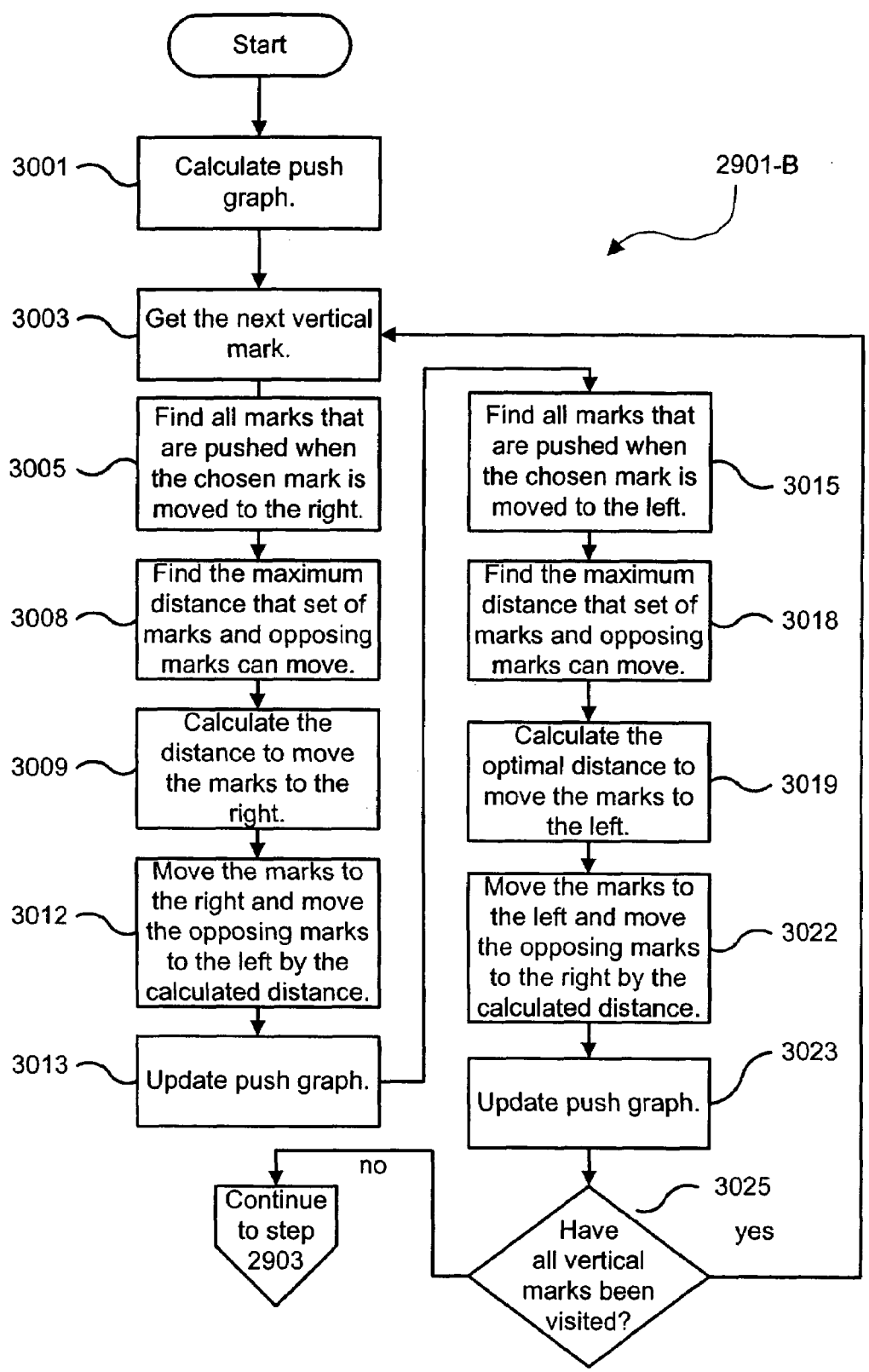
FIG. 30B shows another implementation of the graph based layout method that includes handling of fixed center rules.

In the layout engine 105, use of fixed center rules is allowed, so the layout calculation needs to be modified to correctly handle fixed center rules. A modification to the layout calculation of step 2901 (FIG. 29) is shown in FIG. 30B as step 2901-B and is similar to the modification made to support fixed center rules in the push operation. FIG. 30B is almost the same as FIG. 30A, but shows how fixed centers may be taken into account when calculating the layout. Steps 3001, 3003, 3005, 3009, 3013, 3015, 3019, 3023 and 3025 are common to FIGS. 30A and 30B.

In FIG. 30B, steps 3005 and 3015 must include opposing marks when calculating pushed marks. Instead of calculating a single set of marks to move in one direction, two sets of marks are calculated; one set to be moved to the right and the other set to be moved to the left. This is the same as for the push operation. In FIG. 30B, step 3008 replaces step 3007, where the maximum distance to move is calculated independently for the two sets of marks (ignoring fixed center rules) and then the minimum (in magnitude) of the two values is the maximum distance that the marks can be moved. Steps 3011 is replaced by step 3012, and step 3021 is replaced by step 3022, the difference being that both sets of marks are moved. In step 3012, the set containing the mark chosen in step 3003 is moved to the right and the set containing marks that oppose marks in the first set is moved to the left. In step 3022, the set containing the mark chosen in step 3003 is moved to the left and the set containing marks that oppose marks in the first set are moved to the right. The same considerations apply as for modifying the push operation to include fixed centers. In this regard, if any two opposing marks are in the same set, then the origin mark should be added to both sets. Logically, all pairs of opposing marks with the same orientation should be included in both sets if the origin mark is included because moving the origin requires that all fixed marks should be moved and hence all boxes with fixed centers must also be moved. Of course, it is unnecessary to actually create sets containing the origin mark and all pairs of opposing marks because they should not be moved anyway. Step 3008 will set the maximum distance to zero if an origin mark is included in either set, so steps 3009, 3012 and 3013 do nothing and could be skipped. Step 3018 replaces step 3017, and, like step 3008, the maximum distance is calculated for both the set containing the mark chosen in step 3003, but also for all marks that oppose the marks in the set containing the chosen mark. Step 3018 similarly should set the maximum distance to zero if an origin mark is included in either of the two sets.

19. Printing Documents

Figure 36:
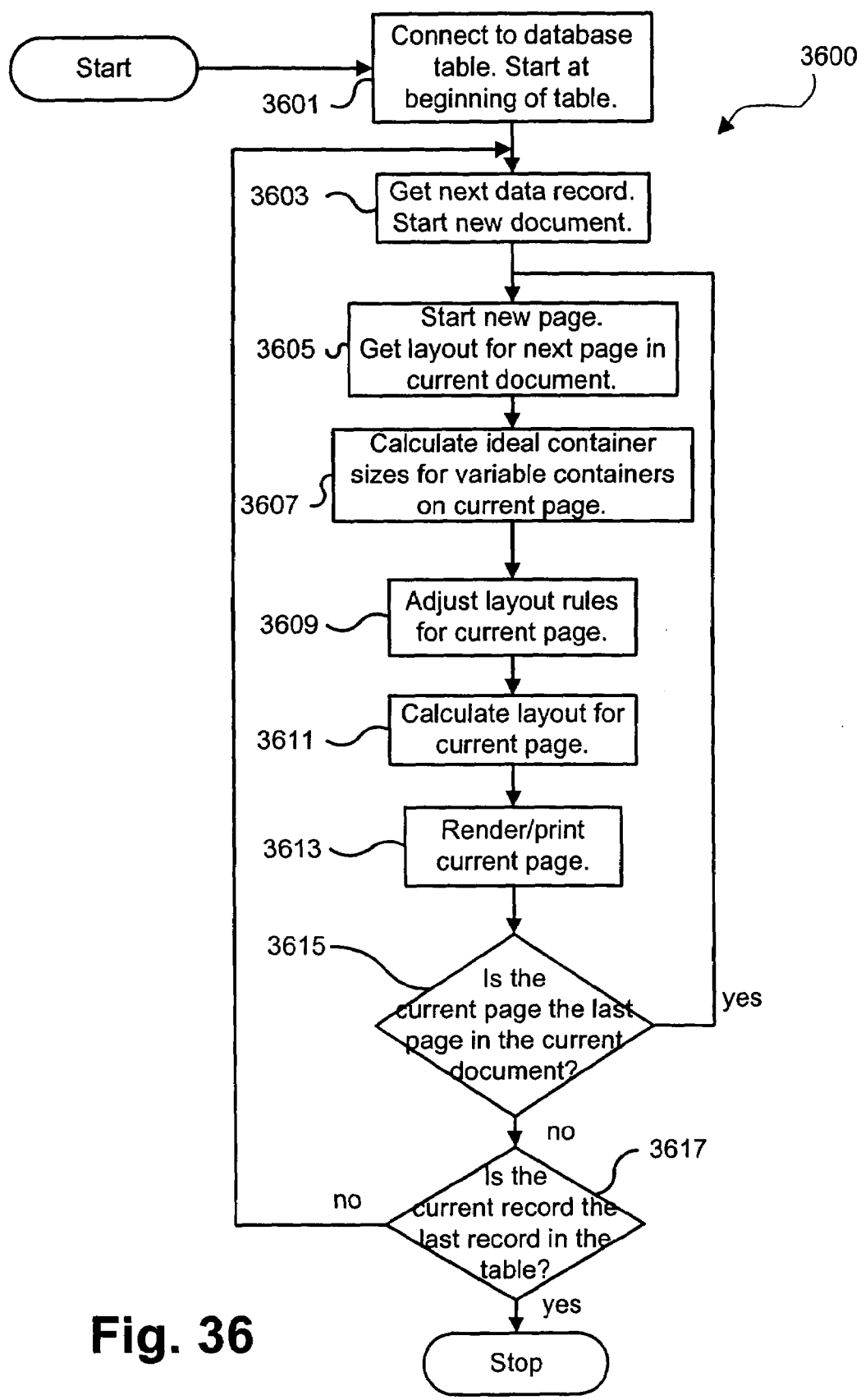
FIG. 36 is a flowchart of a method of generating and printing variable data documents.

FIG. 36 shows a method 3600 steps involved in generating and printing documents from a document template. The method 3600 starts at step 3601 where the application 121 connects to a database and sets a database cursor to the beginning of a table comprising the necessary source data. The user may specify which database to connect to via a dialog as shown in FIG. 14. Following step 3601, at step 3603, the next record is fetched from the database table and the cursor is updated to point to the next record. Since each document in the document set corresponds to one record, a new document is started, and the page counter is reset to the start of the document template. Step 3605 follows where application 121 commences a new page for the document being produced and a layout for that page is sourced and applied to the page. At step 3607, the data in the current record is used to calculate the ideal sizes for each container in the layout on the current page. The ideal sizes calculated in step 3607 are then used to adjust the layout rules at step 3609. Such an operation may comprise changing the values of the preferred offset rules and updating aspect rules based on the ideal sizes calculated in step 3607. Also, for variable text containers where neither the width nor the height of the text is fixed, the height and width are determined in conjunction with a text rule that depends on text from a field in the database record fetched in step 3603. Such text rules are also updated in step 3609. After step 3609, the layout for the current page is calculated at step 3611. After the layout has been calculated, the page is rendered and printed at step 3613. After the page has been printed, a test is performed at step 3615 to determine whether all pages for the current document have been printed. If not, the method 3600 returns to step 3605 to start the calculations for the next page. If all pages from the document template have been printed for the current document, the method 3600 continues to step 3617, where another test is performed to determine if the current record is the last record in the database table. If all records in the table have been processed, the method 3600 is complete, otherwise the procedure returns to step 3603, where the next record in the table is fetched so that the next document can be printed.

20. Pre-calculating Possible Text Shapes

One way increase the speed of a layout mechanism, such as the graph-based layout methods described in section 18, is to pre-calculate all shapes of any text which may be involved in the layout. By calculating the shapes before performing the layout calculations, the layout mechanism may proceed faster because the calculation of text shapes has already been performed and the results stored for rapid later retrieval. A method of calculating the possible shapes of some text is illustrated by examples in FIGS. 41A-41K.

The method works in the following way:
1. Lay the words of the text horizontally end to end with appropriate spacing between the words as required, as in FIG. 41A (each word 4102 is shown within a bounding box 4103). The width and height of this total configuration of words may then be determined as the smallest box 4101 which encloses them. The size of the bounding box 4103 is stored in a memory data structure. Words may be measured using distinct fonts as necessary. Note that a small gap is illustrated between the bounding box 4103 and the word boxes 4102 for the sake of clarity, but this gap would not exist in an actual implementation.
2. The width of the bounding box is obtained and then reduced by one unit of the co-ordinate system being used. The text is then laid out again using the new width as a width constraint. Text will flow to subsequent lines as required by this width constraint and the rules of text flow of the text's language. There is no height constraint, so as many lines as required may be used. A new bounding box is determined from the result, as in FIG. 41B, and this new bounding box is also kept in the memory data structure. The spaces 4105 between words follow the natural spacing rules of the text's language. In English, for example, spaces at the ends of lines will not be counted within the calculation of the bounding box. For some languages the definition of what constitutes a word or an inter-word space may vary from the example given.
3. Step 2 is repeated until the text cannot be laid out in any less wide a bounding box. FIGS. 41C to 41K exemplify this process. Note that each word, such as the word 'Brevity' in the example, may have optional hyphenation breakpoints 4104 within it, which allows that word to be broken, as shown in FIGS. 41h to 41k. When this occurs in English the rule is to add a hyphen 4106. The size and placement of such dynamically inserted punctuation marks would typically be included in the calculation of any bounding box, although this would depend on the rules of the text's language.
4. The calculated shapes of the text are the stored bounding boxes. These shapes may be used in a layout mechanism when it is necessary to know how large a piece of text may be, given a constraint on width or height or both. These shapes may also be used to know what the next largest or next smallest shape is in a given dimension, so as to quickly decide between several possible layouts of a piece of text.

This described implementation is clearly intended to be used with languages which are written from left to write, using inter-word spaces of a known minimal size. Alternative arrangements may be made for languages which do not follow these rules. For example, some Asian languages write characters from top to bottom in columns and then these columns are written from right to left. For such languages, the laying out process would be modified to swap the role of the vertical and horizontal dimensions, and the size of a space character may be reduced to some smaller value or zero. Thus, characters would be stacked vertically in step 1, and then in step 2 the height would be reduced by 1 unit (which could be the height of a character) and the process repeated to form wider and wider bounding boxes. Similarly, the hyphenation rules of each language will depend on the text's language.

21. Table Creation Example

Figure 42A:
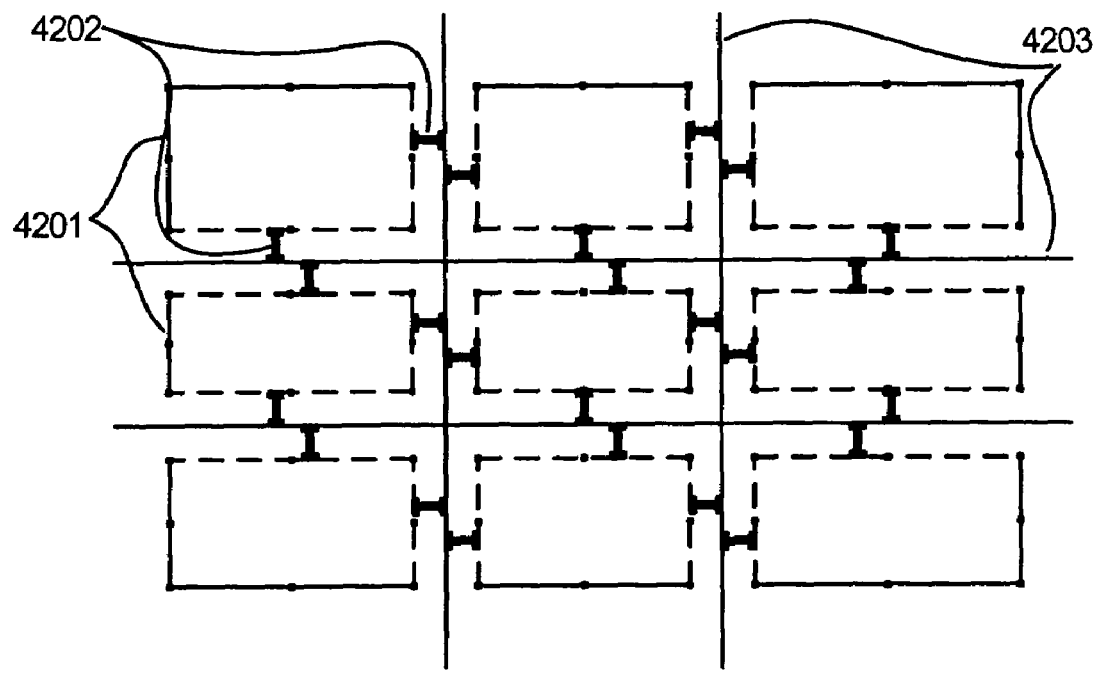
FIGS. 42A to 42C illustrate approaches for the construction of tables.
Figure 42B:
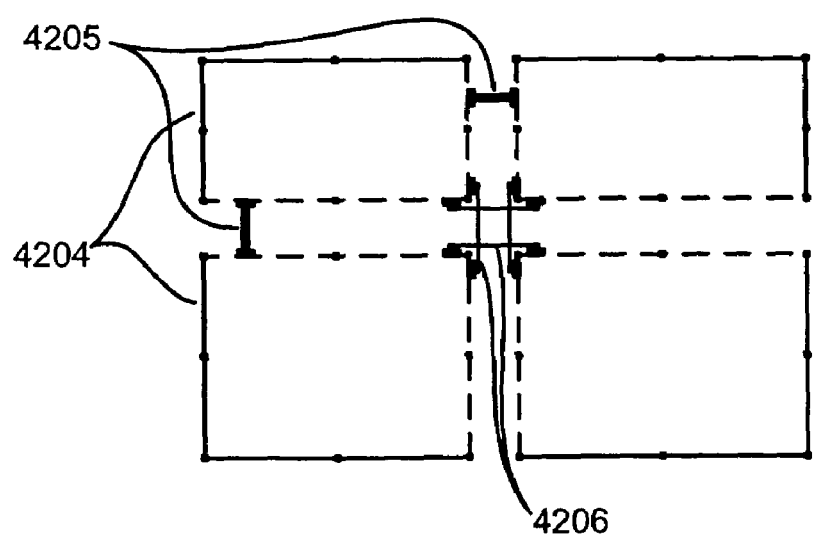
Figure 42C:
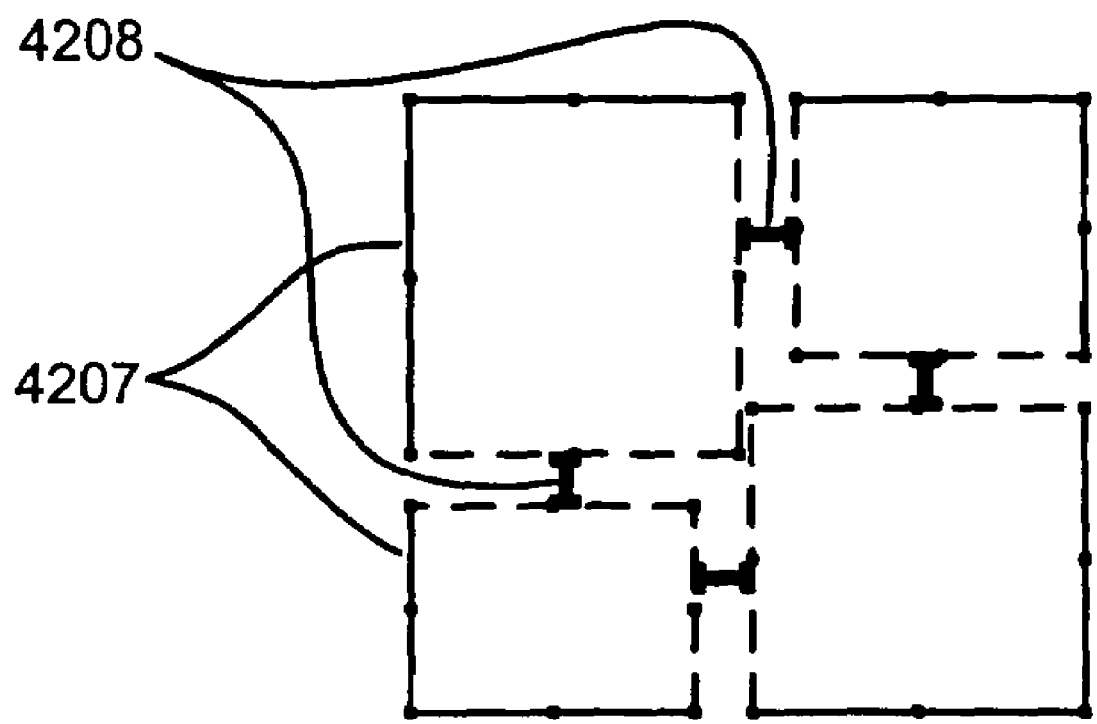

FIGS. 42A-42C show some methods of constructing tables using a graph-based layout mechanism as described in section 18. A table is defined as a rectangular area which is divided into cells, each cell optionally holding some contents such as text or an image.

FIG. 42A shows one method of defining a table. Guides 4203 are used to define column and row positions. Containers 4201 are placed between the guides to act as cells in the table where contents may be placed. Struts 4202 are attached between the guides 4203 and the corresponding adjacent edges of the containers 4201 to define margins between the contents of adjacent cells. Such struts may have any required length, including a length of zero if the cells are intended to be flush against each other.

The guides may be unfixed (they may be floating guides) so that the contents of each cell may push them, thus allowing the row and column sizes to adjust to accommodate different-sized contents. Alternatively, the guides may be fixed to the page to restrict the columns or rows to a certain size or location. Floating guides can also be used to control column and row sizes by placing struts between the guides. This allows the entire table to move on the page (since the guides are not fixed to the page) but the sizes of columns and rows may nevertheless be controlled by this technique.

Note that the outer edges of the containers in this table are fixed to the page. This might not be necessary. An alternative better method might be to also use guides to define the outermost boundary of the table and place struts between those guides and the outer edges of the containers, to allow those edges to move together.

FIG. 42B shows an alternative method of defining a table. In this example, guides are not used. Instead, struts 4205 are attached directly between the edges of adjacent containers 4204, to specify the margin size of columns and rows. Such margin-specifying struts 4205 are only needed between the top-most and left-most containers. Other containers within the table are linked to these constraints using zero-length struts 4206.

In the example given in FIG. 42B, the bottom edges of the upper row of containers are linked by a zero-height strut 4206 so that their bottom edges are aligned exactly with each other. Similarly the top edges of the lower row of containers are linked by a zero-height strut so that they are aligned. Together, this means only one vertical strut 4205 is needed to define and control the margin size between those two rows. In practice this may be quite useful as it means changes to a table's margins can only involve changing one strut's preferred or actual distance, rather than changing many struts as the example in FIG. 42A might require. A similar logic holds for the zero-width struts 4206 shown linking the right edges of the left-most column and also linking the left edges of the right-most column.

As in FIG. 42A, the example in FIG. 42B also has the outer edges of the table fixed to the page. Instead of fixing the location and size of the table this way, it is possible to use zero-length struts to align all of the outer edges of the containers, just as the inner edges are aligned. This allows the table to be moved wherever needed on a page without needing to change the location of many fixed outer edges one by one. This approach may be made using the layout method described in Section 18.3.

A third alternative may use guides to define the outer edges of a table, and zero-length struts to align the inner edges of the table. There are many other viable combinations of guides and struts which achieve similar results.

Note that some method of aligning the inner edges of a table is needed to form the traditional notion of a table. FIG. 42C shows what can happen if neither guides nor struts are used to align inner edges. Containers 4207 are again being used as table cells, and struts 4208 are used to define the distances between adjacent containers. Notice, however, that this example lacks a way to keep diagonally opposite containers from overlapping, because the inner edges of columns and rows are not kept apart.

This might lead to interesting and viable arrangements of containers and contents, and the layout method described in Section 18.3 and later is capable of producing such arrangements (not all prior art examples of layout methods can). For the traditional notion of a table, however, the examples shown in FIGS. 42A and 42B are better suited to achieve well-aligned columns and rows.

INDUSTRIAL APPLICABILITY

The arrangements described are applicable to the computer and data processing industries and particularly to situations where large numbers of documents having essentially the same format and layout are to be reproduced with varying data. Examples of this include the generation of correspondence for a large number of persons all of whom have different names and addresses and other personal details. Another example could be for the generation of advertising brochures relating to different holiday destinations each of being characterized by unique content including text and images but by which all brochures are generated according to a common layout indicative of the brand or get-up of the organization conducting the advertising. Many other examples also apply.

The foregoing describes only some embodiments of the present invention, and modifications and/or changes can be made thereto without departing from the scope and spirit of the invention, the embodiments being illustrative and not restrictive.

I claim:

1. A method of laying out objects forming part of a template intended for a variable data document, said objects each having a rectangular boundary in two-dimensional space, said method comprising the steps of:
    setting a link between at least two objects for defining cooperative movement thereof, wherein said setting step comprises detecting an operation to modify a position of at least one edge of at least one said object;
    allotting variable input data to each object; and
    performing a dynamic layout for determining a size and a position of each object allotted in said allotting step based on the link setting set in said setting step, wherein said performing step comprises:
    (i) identifying rules of association, distinct from said links between edges of said objects having a corresponding orientation to said one edge;
    (ii) modifying a position of at least said edge while observing said rules of association between all of said correspondingly oriented edges; and
    (iii) minimizing an objective function derived from the rules of association between the correspondingly oriented edges to thereby balance a layout of the objects in at least the dimension of modification,
    wherein, in said dynamic layout step, the size and the position of each object is determined by the effect that each object, to which variable data is input, pushes against the set link.

2. A method according to claim 1 wherein said observing of said rules comprises maintaining a first sub-set of said rules while ignoring a second sub-set of said rules.

3. A method according to claim 2 wherein said first sub-set of said rules comprises at least one minimum offset rule, and non-negative and fixed offset rules.

4. A method according to claim 2 wherein said objective function is derived from said second sub-set of rules.

5. A method according to claim 4 wherein said second sub-set of said rules comprises at least one of preferred offset rules and minimize offset rules.

6. A method according to claim 1 wherein said modifying comprises modifying positions of plural ones of said correspondingly oriented and associated edges while maintaining positions of remaining ones of said correspondingly oriented and associated edges.

7. A method according to claim 1 wherein the rules comprise:
    at least one constraint that expressly defines an association between a pair of edges;
    a layout desirability rule that defines a desirable relationship between two edges and which acts to balance a relationship between the edges while maintaining the express constraint;
    and the objective function is derived from the desirability rule and is minimized while respecting the constraints.

8. A method according to claim 7 wherein a constraint applied to a boundary associated with said one edge comprises a fixed centre-line rule applicable to said boundary whereby the other correspondingly oriented edge of said boundary is modified by a corresponding distance in an opposite direction to that of said one edge to thereby maintain the centre-line fixed.

9. A method according to claim 7 wherein said constraint between any two said edges is one of:
    (i) a fixed distance;
    (ii) a variable distance having a predetermined minimum;
    (iii) a variable distance having a predetermined maximum; and
    (iv) a variable distance having a predetermined maximum and a predetermined minimum.

10. A method of laying out objects forming part of a template intended for a variable data document, said objects each having a rectangular boundary in two-dimensional space, said method comprising the steps of:
    setting a link between at least two objects for defining cooperative movement thereof;
    allotting variable input data to each object; and
    performing a dynamic layout for determining a size and a position of each object allotted in said allotting step based on the link setting set in said setting step, comprising:
    (a) identifying a group of edges that can be moved to reduce an objective function associated with a set of rules defining relationships between said edges;
    (b) moving the edges within said group by a distance so as not to infringe said set of rules; and
    (c) repeating steps (a) and (b) for a further group of said edges until step (a) fails to identify a suitable group of said edges,
    wherein, in said dynamic layout step, the size and the position of each object is determined by the effect that each object, to which variable data is input, pushes against the set link.

11. A method according to claim 10 wherein step (a) comprises the sub-steps of:
   (aa) identifying all available groups of edges;
   (ab) testing the groups to identify a sub-set of said groups that reduce the objective function; and
   (ac) selecting one group of edges from said sub-set.

12. A method according to claim 11 wherein step (ab) comprises testing whether a moving of each said group reduces the objective function.

13. A method according to claim 11 wherein step (ac) comprises selecting a first of said groups tested in step (ab) which reduces said objective function.

14. A method according to claim 10 wherein step (a) and step (b) are each separately performed upon groups of correspondingly oriented edges.

15. A method according to claim 14 wherein steps (a) and (b) are performed for a first group of horizontally oriented edges and steps (a) and (b) are performed for a second group of vertically oriented edges.

16. A method according to claim 10 wherein step (b) comprises moving the group of said edges each by an equal distance in the same direction to reduce said objective function whilst respecting said set of rules between said edges.

17. A method according to claim 10 wherein step (b) comprises moving pairs of opposed edges in opposite directions.

18. A method according to claim 17 wherein said opposed edges comprise a pair of edges having a common rule specifying a like separation from a common mark in said layout.

19. A method according to claim 10 wherein said group of edges comprises one of:
   (i) vertical edges dependent upon positions of horizontal edges associated by at least one said rule; and
   (ii) horizontal edges dependent upon positions of vertical edges associated by at least one said rule.

20. A method according to claim 19 wherein an increase in the objective function in one orientation is countered by a decrease in the objective function in the other orientation thereby providing a reduction in the cumulative objective function.

21. A method according to claim 20 wherein the contributions to said cumulative objective function are related to a change of variable data content placed in an object formed by corresponding said edges.

22. A method according to claim 21 wherein said change comprises one of a change to a block of text, and a change in an aspect ratio of an image.

23. A method of laying out objects forming part of a template intended for a variable data document, said objects each having a rectangular boundary in two-dimensional space, said method comprising the steps of:
   setting a link between at least two objects for defining cooperative movement thereof, said setting comprising:
   (a) selecting an edge of an object of said layout to move and unfixing a position of said edge; and
   (b) adding constraints to said selected edge and correspondingly oriented edges of objects in said layout; and
   allotting variable input data to each object; and
   performing a dynamic layout for determining a size and a position of each object allotted in said allotting step based on the link setting set in said setting step, said performing step comprising:
   (c) modifying the position of said selected edge;
   (d) fixing the modified position of said selected edge;
   (e) removing said constraints from said selected edges and said correspondingly oriented edges; and
   (f) recalculating said layout,
   wherein, in said dynamic layout step, the size and the position of each object is determined by the effect that each object, to which variable data is input, pushes against the set link.

24. A method according to claim 23 wherein step (c) comprises the sub-steps of:
   (ca) noting an initial layout of said edges and rules of association between said edges;
   (cb) detecting an intended modification of one said edge in a direction perpendicular to the orientation of said edges and calculating a desired distance of modification;
   (cc) detecting a current set of edges required to move the intended desired distance;
   (cd) calculating a move distance for the current set of edges, said move distance being the smaller of a remaining desired distance and the maximum allowed distance provided by the rules;
   (ce) modifying the set of current edges by the move distance and calculating a remaining desired distance; and
   (cf) repeating steps (cc) to (ce) until the desired distance is zero or no more edges are able to move due to impending breach of the corresponding rules of association.

25. A method according to claim 24 wherein step (c) is terminated when the set of current edges include an origin mark.

26. A method of laying out objects forming part of a template intended for a variable data document, said objects each having a rectangular boundary in two-dimensional space, said method comprising the steps of:
   setting a link between at least two objects for defining cooperative movement thereof;
   allotting variable input data to each object; and
   performing a dynamic layout for determining a size and a position of each object allotted in said allotting step based on the link setting set in said setting step,
   (a) determining a difference between a current width of said object and a desired width of said object;
   (b) removing constraints on the width of said object whilst adding constraints according to a relationship between said object and other objects in said layout influenced by the width of said object;
   (c) modifying one of the right or left edge of said object whilst respecting said added constraints;
   (d) determining from said difference and a present width of said object a remaining change required;
   (e) modifying the other of the right or left edge of said object whilst respecting said added constraints;
   (f) fixing the modified width of the object;
   (g) removing said added constraints; and
   (h) recalculating said layout
   wherein, in said dynamic layout step, the size and the position of each object is determined by the effect that each object, to which variable data in input, pushes against the set link.

27. A method according to claim 26 wherein step (c) and step (e) comprise modifying at least one further left or right edge of one said other container.

28. A method of laying out objects forming part of a template intended for a variable data document, said objects each having a rectangular boundary in two-dimensional space, said method comprising the steps of:
   setting a link between at least two objects for defining cooperative movement thereof;
   allotting variable input data to each object; and performing a dynamic layout for determining a size and a position of each object allotted in said allotting step based on the link setting set in said setting step, wherein said performing step comprises:
  (a) identifying text content to be placed in at least one object of said layout;
  (b) manipulating said text content to calculate a set of fixed sizes for said object to accommodate said text content; and
  (c) subject to rules of association between objects of said layout and modifications to said layout, selecting one of said fixed sizes from said set for said object in said layout,
  wherein, in said dynamic layout step, the size and position of each object is determined by the effect that each object, to which variable data is input, pushes against the set link.

29. A method according to claim 28 wherein step (b) comprises the sub-steps of:
  (ba) laying out words of said text content spaced apart horizontally on a single line;
  (bb) establishing a bounding box surrounding each of said words;
  (bc) accumulating the bounding boxes to establish one said fixed size; and
  (bd) modifying an arrangement of said words across at least one further line and accumulating said bounding boxes to establish a further said fixed size.

30. A method according to claim 29 further comprising the step of:
  (be) modifying an arrangement of said words within said lines and accumulating said bounding boxes to establish another said fixed size.

31. A method according to claim 30 further comprising repeating at least one of step (bd) and step (be) to establish a yet further fixed size.

32. A method according to claim 29 wherein said modifying comprises hyphenating a word to form separate parts thereof each having a corresponding bounding box arranged on different adjacent ones of said lines of said text.

33. A computer readable medium having a computer program recorded thereon and adapted to make a computer execute a procedure to lay out objects forming part of a template intended for a variable data document, said objects each having a rectangular boundary in two-dimensional space, said program comprising:
  code for setting a link between at least two objects for defining cooperative movement thereof, wherein said setting of a link comprises detecting an operation to modify a position of at least one edge of at least one said object;
  code for allotting variable input data to each object; and
  code for performing a dynamic layout for determining a size and a position of each object allotted in said allotting step based on the link setting set in said setting step, wherein said performing of a dynamic layout comprises:
    (i) identifying rules of association, distinct from said links between edges of said objects having a corresponding orientation to said one edge;
    (ii) modifying a position of at least said edge while observing said rules of association between all said correspondingly oriented edges; and
    (iii) minimizing an objective function derived from the rules of association between the correspondingly oriented edges to thereby balance a layout of the objects in at least the dimension of modification,
  wherein, in said dynamic layout step, the size and the position of each object is determined by the effect that each object, to which variable data is input, pushes each against the set link.

34. Computer apparatus for laying out objects forming part of a template intended for a variable data document, said objects each having a rectangular boundary in two-dimensional space, said apparatus comprising:
  means for setting a link between at least two objects for defining cooperative movement thereof, by detecting an operation to modify a position of at least one edge of at least one said object;
  means for allotting variable input data to each object; and
  means for performing a dynamic layout for determining a size and a position of each object allotted in said allotting step based on the link setting set in said setting step, wherein said performing means operates by:
    (i) identifying rules of association, distinct from said links between edges of said objects having a corresponding orientation to said one edge;
    (ii) modifying a position of at least said edge while observing said rules of association between all said correspondingly oriented edges; and
    (iii) minimizing an objective function derived from the rules of association between the correspondingly oriented edges to thereby balance a layout of the objects in at least the dimension of modification,
  wherein, in said dynamic layout step, the size and the position of each object is determined by the effect that the each object, to which variable data is input, pushes each against the set link.

* * * * *